(12) United States Patent
Sasaki

(10) Patent No.: US 6,525,905 B1
(45) Date of Patent: Feb. 25, 2003

(54) THIN FILM MAGNETIC HEAD HAVING A NON-MAGNETIC BODY AND METHOD OF MANUFACTURING THE SAME

(75) Inventor: Yoshitaka Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 130 days.

(21) Appl. No.: 09/659,709

(22) Filed: Sep. 11, 2000

(30) Foreign Application Priority Data

Sep. 14, 1999 (JP) .......................................... 11-260675

(51) Int. Cl.[7] ............................. G11B 5/147; G11B 5/17
(52) U.S. Cl. ........................................ 360/126; 360/123
(58) Field of Search ................................ 360/126, 317, 360/119, 123

(56) References Cited

U.S. PATENT DOCUMENTS

| | | | | | |
|---|---|---|---|---|---|
| 5,734,536 A | * | 3/1998 | Shouji et al. | ................ | 360/126 |
| 5,793,578 A | * | 8/1998 | Heim et al. | ................. | 360/126 |
| 6,018,862 A | * | 2/2000 | Stageberg et al. | ........ | 29/603.14 |
| 6,104,576 A | * | 8/2000 | Santini | ........................ | 360/126 |
| 6,130,805 A | * | 10/2000 | Sasaki et al. | ................ | 360/126 |
| 6,163,436 A | * | 12/2000 | Sasaki et al. | ................ | 360/126 |
| 6,285,532 B1 | * | 9/2001 | Sasaki | ......................... | 360/317 |
| 6,317,288 B1 | * | 11/2001 | Sasaki | ......................... | 360/126 |

\* cited by examiner

*Primary Examiner*—Jefferson Evans
(74) *Attorney, Agent, or Firm*—Oliff & Berridge, PLC.

(57) ABSTRACT

A thin-film magnetic head and a method of manufacturing the same are provided capable of achieving accurate control of a magnetic pole width and sufficient overwrite characteristics even with a reduced magnetic pole width. A first non-magnetic body and a second non-magnetic body are disposed on and under a flat surface including an upper surface or a lower surface of a write gap layer, respectively. The first non-magnetic body has a wedge-shaped cross section taken along a surface perpendicular to both of the flat surface and a track surface (air bearing surface), with a tip facing the track surface (air bearing surface) side. Since a photolithography process is performed on a gentle slope of the first non-magnetic body, effects of light reflected from an underlying layer can be reduced, whereby a product with excellent processing accuracy can be obtained. Further, the first and second non-magnetic bodies can suppress leakage of magnetic flux between the two magnetic layers facing each other with the write gap layer in between.

8 Claims, 30 Drawing Sheets

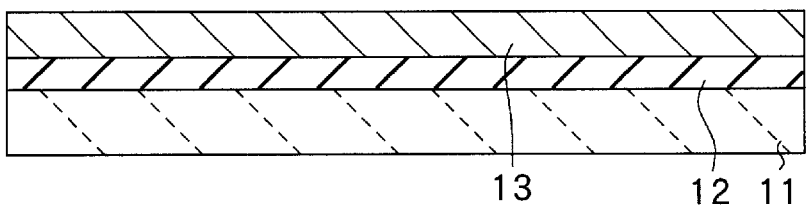
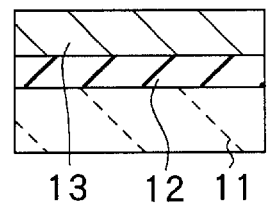
FIG.17A  FIG.17B
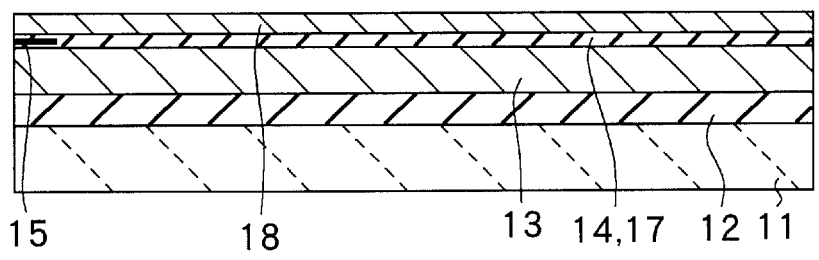
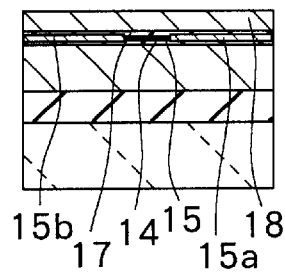
FIG.18A  FIG.18B
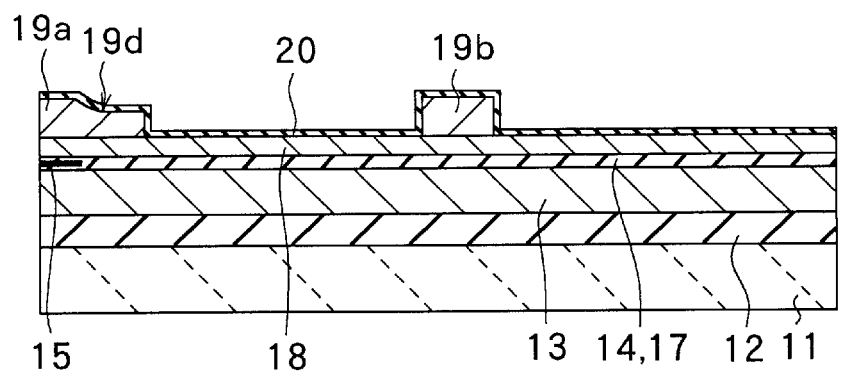
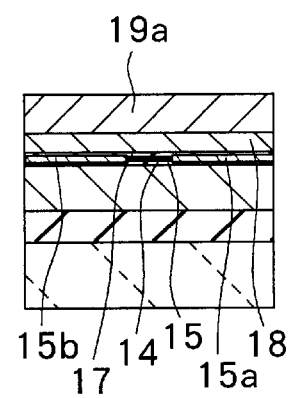
FIG.19A  FIG.19B
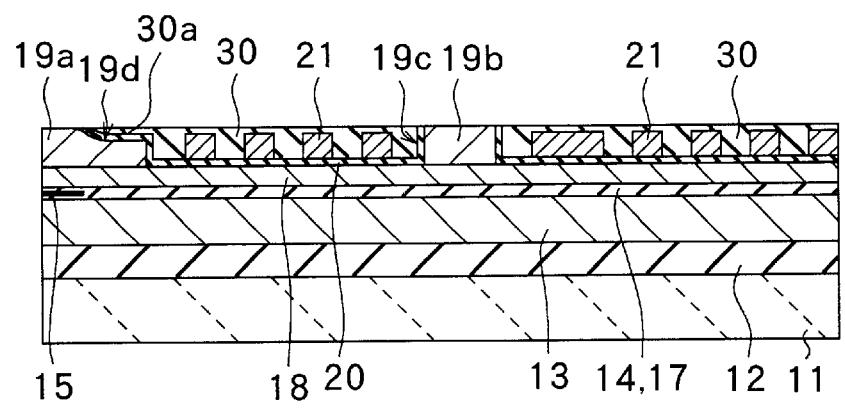
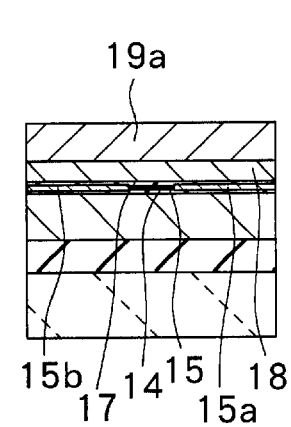
FIG.20A  FIG.20B

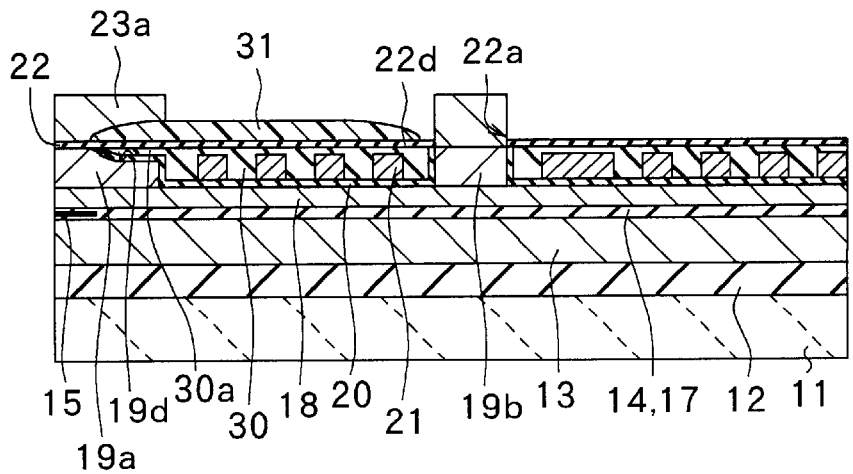
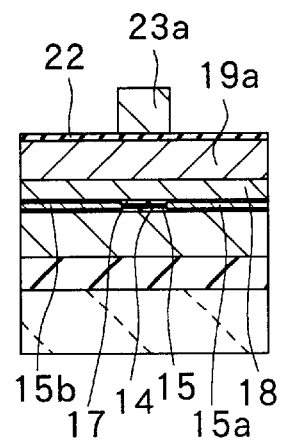
FIG.21A  FIG.21B
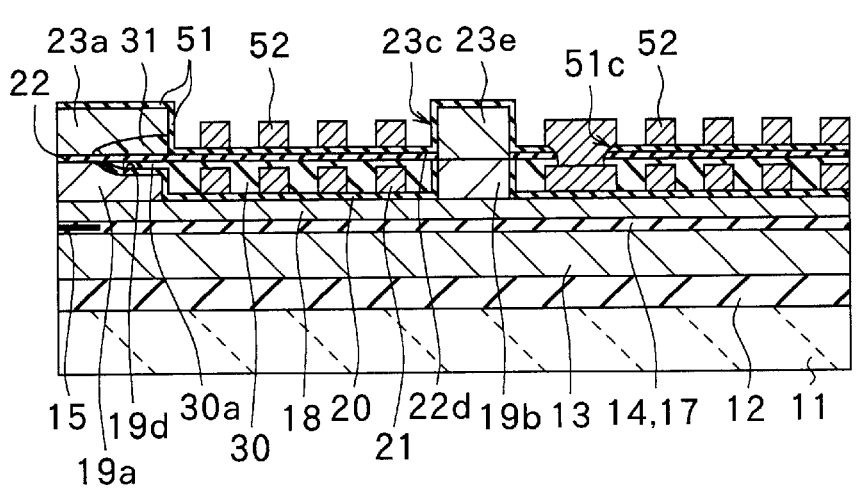
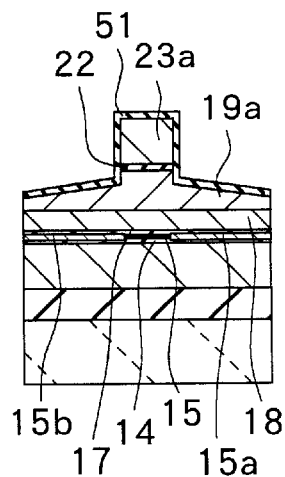
FIG.22A  FIG.22B

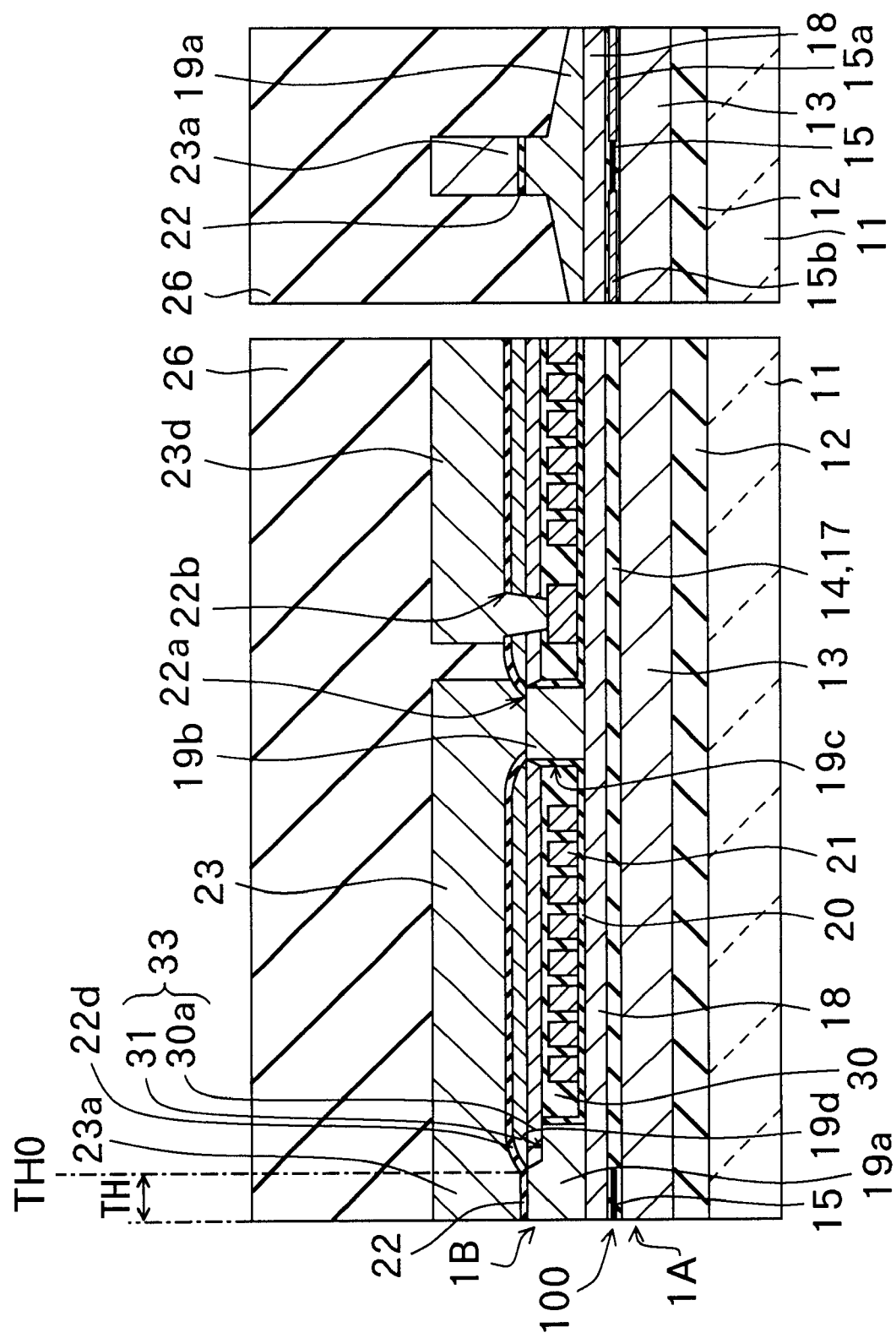

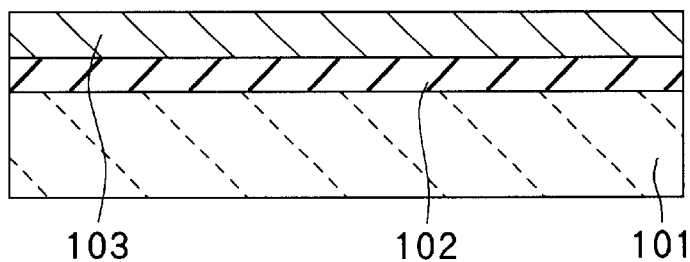
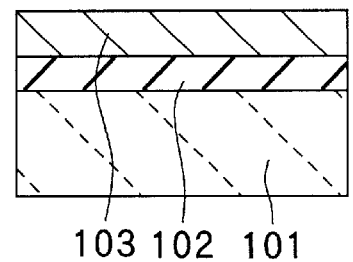
FIG.42A
RELATED ART
FIG.42B
RELATED ART
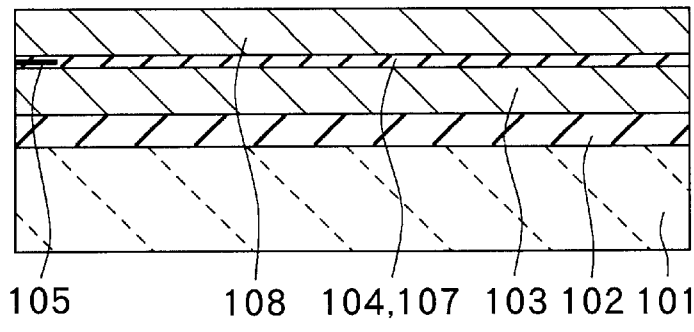
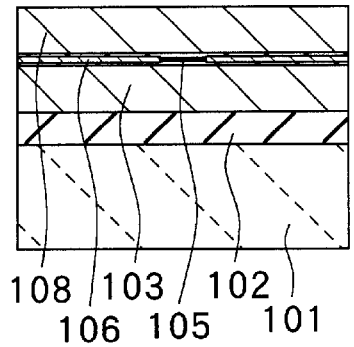
FIG.43A
RELATED ART
FIG.43B
RELATED ART
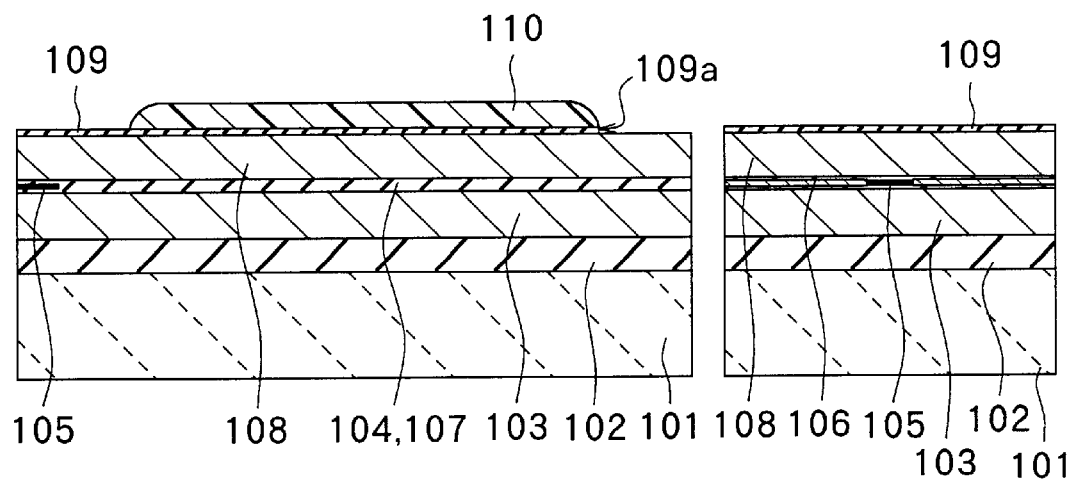
FIG.44A
RELATED ART
FIG.44B
RELATED ART

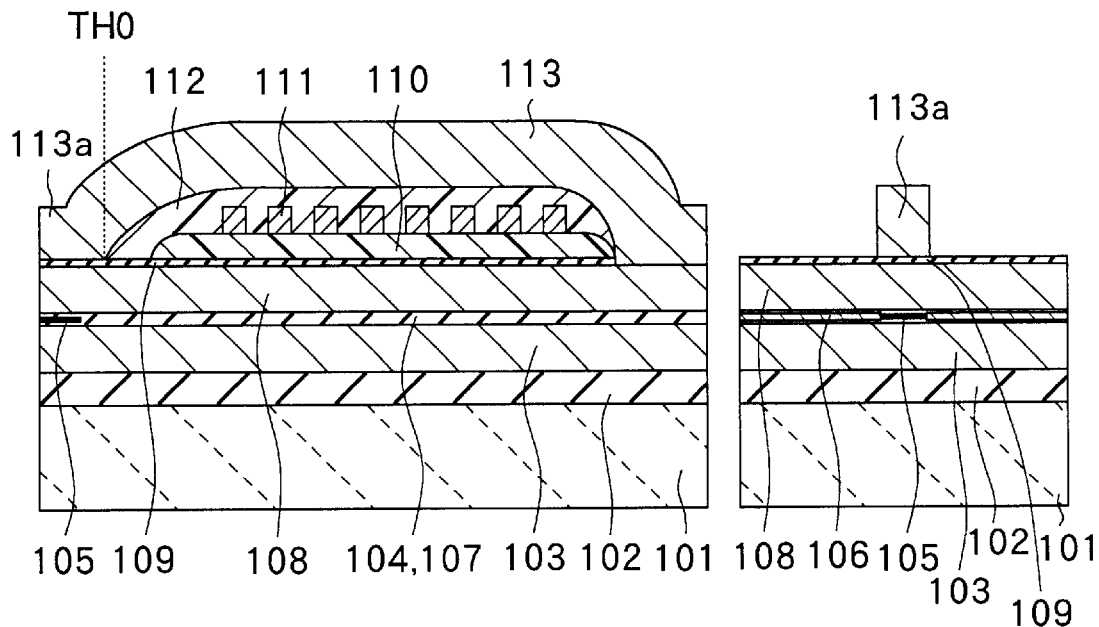
FIG.47A
RELATED ART
FIG.47B
RELATED ART
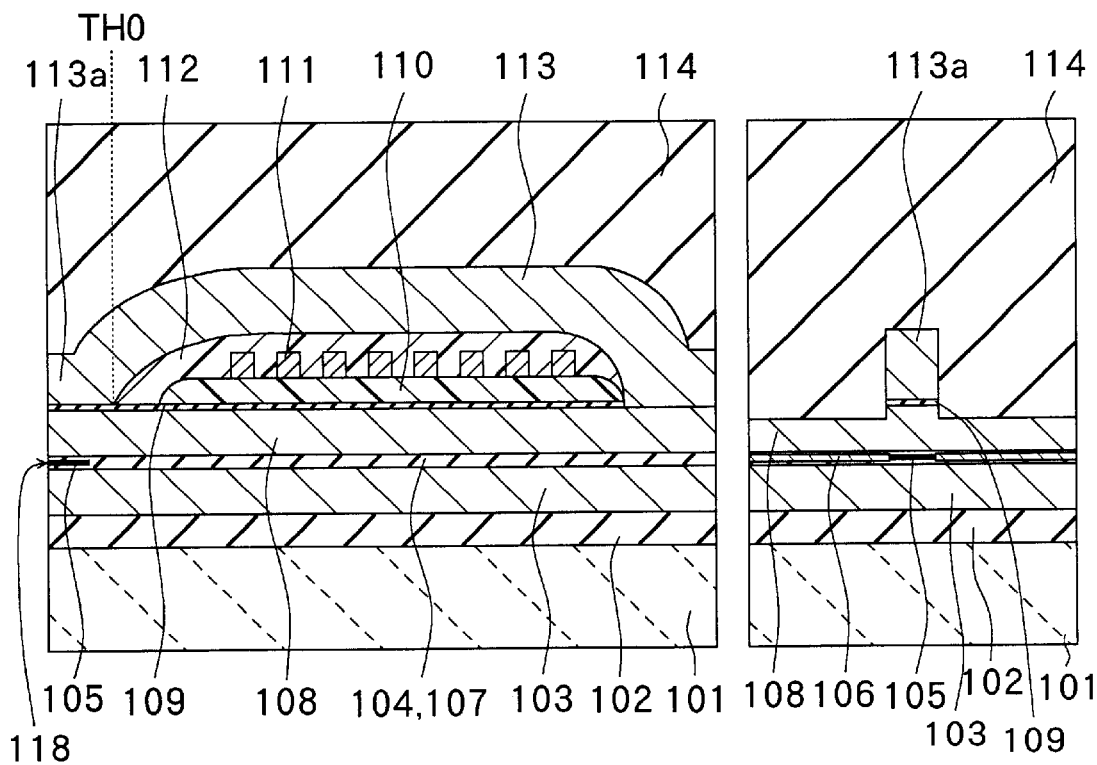
FIG.48A
RELATED ART
FIG.48B
RELATED ART

THIN FILM MAGNETIC HEAD HAVING A NON-MAGNETIC BODY AND METHOD OF MANUFACTURING THE SAME

BACKGROUND OF THE INVENTION

1. Field of the Invention

The present invention relates to a thin-film magnetic head having at least an inductive-type magnetic transducer for writing and to a method of manufacturing the same.

2. Description of the Related Art

In recent years, improvements in the performance of a thin-film magnetic head are sought since a surface recording density of a hard disk device has been improved. A composite thin-film magnetic head having a structure, in which a recording head having an inductive-type magnetic transducer for writing and a reproducing head having a magnetoresistive (hereinafter referred to as MR) element for reading are stacked, is widely used as the thin-film magnetic head.

A factor that determines the performance of the recording head is accuracy in processing a throat height (TH). The throat height is a length (height) of a portion (magnetic pole portion) between an air bearing surface and an edge of an insulating layer which electrically isolates a thin-film coil. The air bearing surface, here, is a surface of the thin-film magnetic head facing a magnetic recording medium, and is also called a track surface. A reduction in the throat height is desired in order to improve the recording head performance. The throat height is controlled by an amount of polishing in processing the air bearing surface.

In order to improve the performance of the thin-film magnetic head, the above recording head and the reproducing head must be formed in a good balance.

A method of manufacturing a composite thin-film magnetic head is described with reference to FIGS. 42A and 42B to FIGS. 48A and 48B as an example of the thin-film magnetic head of the art related to the present invention. FIG. 49 is a plan view of the composite thin-film magnetic head of the art related to the present invention. FIG. 42A to 48A each illustrate a manufacturing step taken along the line XLVIIIA—XLVIIIA in FIG. 49, while FIG. 42B to 48B each illustrate a manufacturing step taken along the line XLVIIIB—XLVIIIB in FIG. 49.

First, as shown in FIG. 42A and FIG. 42B, an insulating layer 102 made of, for example, alumina (aluminum oxide: $Al_2O_3$) of about 5 $\mu$m in thickness is formed on a substrate 101 made of, for example, Altic, i.e., aluminum oxide and titanium carbide ($Al_2O_3$ with TiC). A bottom shield layer 103 for a reproducing head is formed of, for example, permalloy (NiFe) on the insulating layer 102.

As shown in FIGS. 43A and 43B, a shield gap film 104 is formed on the bottom shield layer 103 by depositing, for example, alumina in thickness of 35 nm to 60 nm. An MR film 105 of tens of nanometers in thickness for making up the MR element for reproduction is formed on the shield gap film 104, and a desired shape is obtained through photolithography with high precision. Next, a pair of lead terminal layers 106 are formed by a lift-off method on both sides of the MR film 105. A shield gap film 107 is formed on the shield gap film 104, the MR film 105, and the lead terminal layers 106, so that the MR film 105 and the lead terminal layers 106 are buried between the shield gap films 104 and 107. Further, as shown in FIG. 43A and FIG. 43B, a top-shield-cum-bottom pole (or a bottom magnetic layer; hereinafter referred to simply as a bottom pole) 108 having a thickness of 2.5 $\mu$m to 3.5 $\mu$m and made of a magnetic material, such as permalloy, used for both reproduction and recording heads, is formed on the shield gap film 107.

As shown in FIG. 44A and FIG. 44B, a write gap layer 109 made of, for example, an alumina film and having a thickness of 200 nm to 250 nm is formed on the bottom pole 108. The write gap layer 109 is patterned through photolithography, to thereby form an opening 109a for magnetically connecting the bottom pole 108 and a top pole (or a top magnetic layer; hereinafter referred to simply as a top pole) 113 to be formed thereon in a later step. A photoresist film 110 as a first layer of photoresist films of 1.0 $\mu$m to 1.5 $\mu$m in thickness is formed on the write gap layer 109, and the photoresist film 110 is then processed to a prescribed pattern through high-precision photolithography. The purpose of providing the photoresist film 110 is to improve insulation capability between the bottom pole 108 and a thin-film coil 111 to be formed on the photoresist film 110 in a later step.

As shown in FIG. 45A, the thin-film coil 111 for an inductive recording head made of, copper (Cu) and having a thickness of 1.5 $\mu$m to 2.0 $\mu$m is selectively formed on the photoresist film 110 by, for example, electroplating.

Next, as shown in FIG. 46A, a photoresist film 112 of, for example, 1.0 $\mu$m to 1.5 $\mu$m in thickness is formed on the thin-film coil 111, and the photoresist film 112 as a second layer of photoresist films is patterned to a prescribed shape through photolithography with high precision. The photoresist film 112 is subjected to a predetermined heat treatment, so as to planarize the surface and improve insulation capability between the thin-film coil 111 and the top pole 113 which will be formed on the photoresist film 112 in a later step. This kind of photoresist film 112 can achieve surface planarization regardless of the surface irregularity of the underlayer, and can also provide a very gentle slope at the edge (peripheral area) of the photoresist film 112 by performing heat treatment after patterning to gradually change the thickness of the film.

An end (or edge) of the second photoresist film 112 shown on the left hand side in FIG. 46A corresponds to the reference position for determining the throat height (TH), i.e. the throat height zero (TH0) position. As shown in this figure, a side surface of the photoresist film 112 located on the above edge side can effectively determine an apex angle. The apex angle is an angle θ between the tangent line to an end surface of the photoresist film 112 on the track surface (air bearing surface) 100 side and an upper surface of the top pole 113 to be formed in a later step (or the surface of the substrate 101).

The apex angle (angle θ) formed by the gentle slope of the second photoresist film 112 can be reduced to about 25 degrees to 35 degrees by setting the distance between the throat height zero (TH0) position and the position of the side surface of the outermost periphery portion of the thin-film coil 111 to, for example, 10 $\mu$m. In other words, when the bottom pole 108, the write gap layer 109, and the top pole 113 are patterned through photolithography to define the recording track width in a later step, a relatively small apex angle allows such patterning to be performed on planarized regions, so that patterning accuracy can be improved and therefore the narrower track can be realized.

As shown in FIG. 47A, a top yoke-cum-top pole 113 of 2.0 $\mu$m to 3.0 $\mu$m in thickness is formed of a magnetic material for the recording head, such as permalloy, on the photoresist film 112. The top pole 113 has, for example, such a plan shape as shown in FIG. 49, which will be described hereinafter. As shown in FIG. 49, the top pole 113 has a top pole tip portion 113a having a width corresponding to the track width on the track surface (air bearing surface) 100 side. As shown in FIG. 47A and FIG. 47B, the top pole tip portion 113a of the top pole 113 faces part of the bottom pole 108 located on the track surface (air bearing surface) 100 side with the write gap layer 109 in between. The top pole 113 has contact with the bottom pole 108 through the opening 109a, magnetically coupled thereto.

As shown in FIG. 48B, the write gap layer 109 and the bottom pole 108 are partially etched by about 0.3 μm to 0.4 μm by ion milling etching using the top pole tip portion 113a of the top pole 113 as a mask. By etching as far as the bottom pole 108 to form a trim structure, the effective writing track width can be made small, to thereby prevent divergence of magnetic flux at the bottom pole 108 during data writing operation.

As shown in FIG. 48A and FIG. 48B, an overcoat layer 114 is formed of, for example, alumina on the top pole 113. The thin-film magnetic head is completed after the track surface (air bearing surface) 118 of the recording head and reproducing head is formed by applying machine grinding with a slider.

The thin-film magnetic head of this type is expected to have the surface recording density of as high as 10 gigabits to 20 gigabits per square inch, and to be used in a high frequency band of 300 MHz to 500 MHz in the near future. Therefore, how to ensure an optimum magnetic volume in the vicinity of the throat height (TH) zero position is becoming an important task. Naturally, the overwrite characteristics can be improved if a large magnetic volume can be obtained in the vicinity of the throat height (TH) zero position.

As shown in FIG. 46A and FIG. 49, the throat height (TH) zero position is effectively determined by the second photoresist film 112. The photoresist film 112 is provided with a very gentle slope, which cannot be obtained by, for example, patterning an alminum film, a silicon oxide film or a silicon nitride film each formed through sputtering. Therefore the top pole 113 can also be formed on the photoresist film 112 in a gently-sloped shape in the vicinity of the throat height (TH) zero position, along the surface shape of the photoresist film 112. As shown in FIG. 49, the width of the pole is gradually reduced from the top pole 113 on the thin-film coil 111 toward the top pole tip portion 113a (the throat height (TH) zero position) on the write gap layer 109, so that magnetic volume can be gradually reduced and the magnetic flux can be converged in an efficient manner. Additionally, by gradually varying the distance between the top pole 113 and the write gap layer 109 as described above, the magnetic flux in the top pole 113 can be converged even more smoothly.

In addition, since the second photoresist film 112 can be formed with a very gently sloped surface to thereby reduce the apex angle, processing accuracy in photolithography forming the trim structure can be improved, to thereby achieve a narrow track width.

However, in contrast to the advantage of providing the second photoresist film 112 with a very gently sloped surface, the thickness of the film is made extremely thin in the vicinity of the throat height (TH) zero position. As a result, magnetic flux is often leaked between the top pole 113 and the bottom pole 108 in the area where the photoresist film 112 has a small thickness (in the vicinity of the throat height (TH) zero position).

SUMMARY OF THE INVENTION

The present invention has been conceived in view of the above-described problems, and effectively resolves the problems caused by employing a non-magnetic body such as the above-described second photoresist film 112 having a very gentle slope. More specifically, it is a first object of the present invention to provide a thin-film magnetic head and a method of manufacturing the same that allow an optimum control of magnetic flux flowing in the vicinity of the throat height zero (TH0) position and effective prevention of magnetic flux leakage between the top pole and the bottom pole in the vicinity of the throat height zero (TH0) position.

It is a second object of the present invention to provide a thin-film magnetic head and a method of manufacturing the same that achieve the above first object and allow improvement in overwrite performance.

It is a third object of the present invention to provide a thin-film magnetic head and a method of manufacturing the same that allow at least one of the first and second objects to be achieved with a simple structure or by a simple manufacturing method.

It is a fourth object of the present invention to provide a thin-film magnetic head and a method of manufacturing the same that allow reduction in manufacturing steps and achievement of at least one of the first, second, and third objects.

A thin-film magnetic head of the invention includes a first insulating layer as a write gap layer, a non-magnetic body provided adjacent to a surface of the first insulating layer in an area close to an air-bearing surface that faces a recording medium and having a wedge-shaped cross section that is taken along a surface perpendicular to both a surface along which the first insulating layer extends and the air-bearing surface, the wedge-shaped cross section directing its tip to the air-bearing surface, a bottom magnetic layer and a top magnetic layer facing each other on a side close to the air-bearing surface, sandwiching the first insulating layer therebetween and magnetically coupled to each other on a side far from the air-bearing surface, the bottom magnetic layer including a bottom pole provided so as to be exposed to the air-bearing surface and to face the first insulating layer, a bottom pole tip portion provided in an area between the bottom pole and the first insulating layer on the side close to the air-bearing surface, the bottom pole tip portion being exposed to the air-bearing surface and adjacent to both the bottom pole and the first insulating layer, and a bottom magnetic connection portion provided adjacent to the bottom pole in the area between the bottom pole and the first insulating layer on the side far from the air-bearing surface, and the top magnetic layer including, a top pole provided so as to be recessed from the air-bearing surface and to face the first insulating layer, a top pole tip portion provided in an area between the top pole and the first insulating layer on the side close to the air-bearing surface, the top pole tip portion being exposed to the air-bearing surface and adjacent to both the top pole and the first insulating layer, the top pole tip portion facing the bottom pole tip portion sandwiching the first insulating layer therebetween and extending over the non-magnetic body, and a top magnetic connection portion provided so as to magnetically couple the top pole to the bottom magnetic connection portion, a first thin-film coil buried with a second insulating layer in an area enclosed by the first insulating layer and the bottom magnetic layer, and a second thin-film coil buried with a third insulating layer in an area enclosed by the first insulating layer, the non-magnetic body and the top magnetic layer, wherein the top pole tip portion and the third insulating layer constitute a flat plane and the top pole is provided on the flat plane and a concave portion is provided close to the second insulating layer in the bottom pole tip portion and a part of the second insulating layer is buried in the concave portion adjacent to the first insulating layer.

The present invention also provides a method of manufacturing a thin-film magnetic head including the steps of forming a first insulating layer as a write gap layer, forming a non-magnetic body in an area close to an air-bearing surface that faces a recording medium in a manner that the non-magnetic body is provided adjacent to a surface of the first insulating layer and has a wedge-shaped cross section that is taken along a surface perpendicular to both a surface along which the first insulating layer extends and the air-bearing surface, the wedge-shaped cross section directing its tip to the air-bearing surface, forming a bottom magnetic layer and a top magnetic layer so as to face each other on a side close to the air-bearing surface, sandwiching the first insulating layer therebetween and to be magnetically coupled to each other on a side far from the air-bearing surface, the bottom magnetic layer including, a bottom pole provided so as to be exposed to the air-bearing surface and to face the first insulating layer, a bottom pole tip portion provided in an area between the bottom pole and the first insulating layer on the side close to the air-bearing surface, the bottom pole tip portion being exposed to the air-bearing surface and adjacent to both the bottom pole and the first insulting layer, and a bottom magnetic connection portion provided adjacent to the bottom pole in the area between the bottom pole and the first insulating layer on the side far from the air-bearing surface, and the top magnetic layer including, a top pole provided so as to be recessed from the air-bearing surface and to face the first insulating layer, a top pole tip portion provided in an area between the top pole and the first insulting layer on the side close to the air-bearing surface, the top pole tip portion being exposed to the air-bearing surface and adjacent to both the top pole and the first insulating layer, the top pole tip portion facing the bottom pole tip portion sandwiching the first insulating layer therebetween and extending over the non-magnetic body, and a top magnetic connection portion provided so as to magnetically couple the top pole to the bottom magnetic connection portion, burying a first thin-film coil with a second insulating layer in an area enclosed by the first insulating layer and the bottom magnetic layer, and burying a second thin-film coil with a third insulating layer in an area enclosed by the first insulating layer, the non-magnetic body and the top magnetic layer, wherein the top pole tip portion and the third insulating layer constitute a flat plane and the top pole is formed on the flat plane and a concave portion is provided close to the second insulating layer in the bottom pole tip portion and a part of the second insulating layer is buried in the concave portion adjacent to the first insulating layer.

In the thin-film magnetic head of the invention, the non-magnetic body, provided adjacent to a surface of the first insulating layer in an area close to an air-bearing surface that faces a recording medium, can suppress leakage of magnetic flux between the two magnetic layers facing each other with the write gap layer in between. The non-magnetic body has a wedge-shaped cross section taken along a surface perpendicular to both of the above flat surface and the recording-medium-facing surface, with its tip facing the recording-medium facing surface side. In addition, the non-magnetic body has a surface in the form of a gentle slope having a gradually increasing thickness.

In the thin-film magnetic head and the method of manufacturing the same of the invention, the non-magnetic body is preferably formed of any of the photoresist film, an organic spin-on-glass film, and an inorganic spin-on-glass film having a gentle slope.

In the thin-film magnetic head and the method of manufacturing the same of the invention, the second insulating layer is preferably formed of any of the photoresist film, an organic spin-on-glass film, a silicon oxide film, a silicon nitride film, and an alumina film.

In the thin-film magnetic head and the method of manufacturing the same of the invention, the non-magnetic body and second insulating layer may be formed as separate bodies by separate steps.

In the thin-film magnetic head and the method of manufacturing the same of the invention, the first and second non-magnetic bodies may be formed by the same step.

In the thin-film magnetic head and the method of manufacturing the same of the invention, the second non-magnetic body may be simultaneously formed by the step of forming the insulating layer.

Other and further objects, features and advantages of the invention will appear more fully from the following description.

BRIEF DESCRIPTION OF THE DRAWINGS

FIG. 17A and FIG. 17B are cross sectional views illustrating a manufacturing step of the thin-film magnetic head for use in description of a manufacturing method of the second embodiment of the present invention, taken along the line perpendicular to, and parallel to, a track surface (air bearing surface), respectively.

FIG. 18A and FIG. 18B are cross sectional views illustrating a step of manufacturing the thin-film magnetic head following the step shown in FIG. 17A and FIG. 17B FIG. 19A and FIG. 19B are cross sectional views illustrating a step of manufacturing the thin-film magnetic head following the step shown in FIG. 18A and FIG. 18B.

FIG. 20A and FIG. 20B are cross sectional views illustrating a step of manufacturing the thin-film magnetic head following the step shown in FIG. 19A and FIG. 19B.

FIG. 21A and FIG. 21B are cross sectional views illustrating a step of manufacturing the thin-film magnetic head following the step shown in FIG. 20A and FIG. 20B.

FIG. 22A and FIG. 22B are cross sectional views illustrating a step of manufacturing the thin-film magnetic head following the step shown in FIG. 21A and FIG. 21B.

FIG. 30A and FIG. 30B are cross sectional views illustrating an important part of a thin-film magnetic head of a fourth embodiment of the present invention, taken along the line XXXA—XXXA and the line XXXB—XXXB in FIG. 31, respectively.

FIG. 42A and FIG. 42B are cross sectional views illustrating a manufacturing step for use in description of a method of manufacturing a thin-film magnetic head according to the related art.

FIG. 43A and FIG. 43B are cross sectional views of a step following the step shown in FIG. 42A and FIG. 42B.

FIG. 44A and FIG. 44B are cross sectional views of a step following the step shown in FIG. 43A and FIG. 43B.

FIG. 48A and FIG. 48B are cross sectional views of a step following the step shown in FIG. 47A and FIG. 47B.

DETAILED DESCRIPTION OF THE PREFERRED EMBODIMENTS

Preferred embodiments of the invention will now be described in detail with reference to the accompanying drawings.

[First Embodiment]

Figures 1A, 1B:
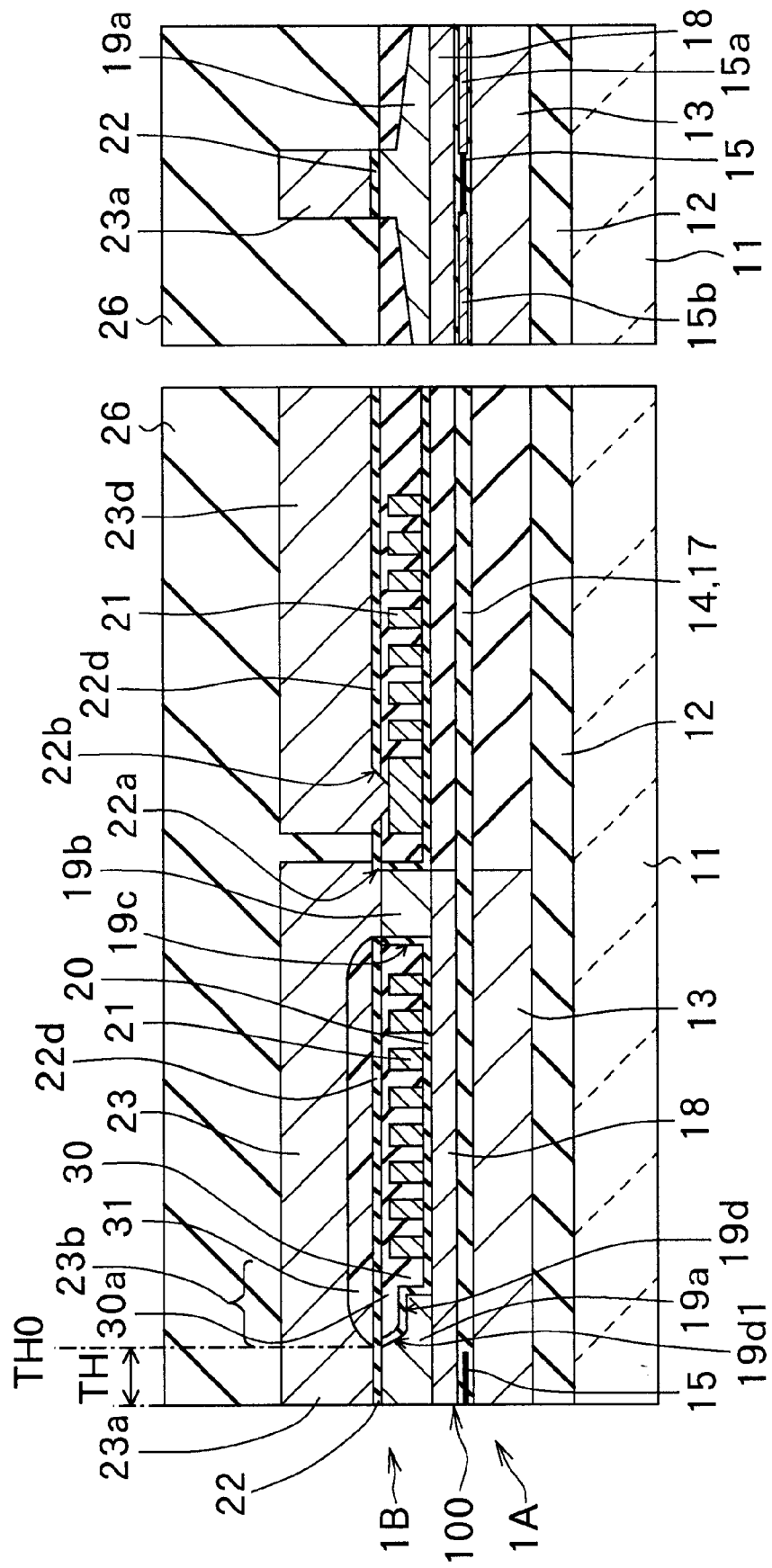
FIG. 1A and FIG. 1B are cross sectional views illustrating an important part of a thin-film magnetic head of a first embodiment of the present invention, taken along the line IA—IA and the line IB—IB in FIG. 2, respectively.
Figure 2:
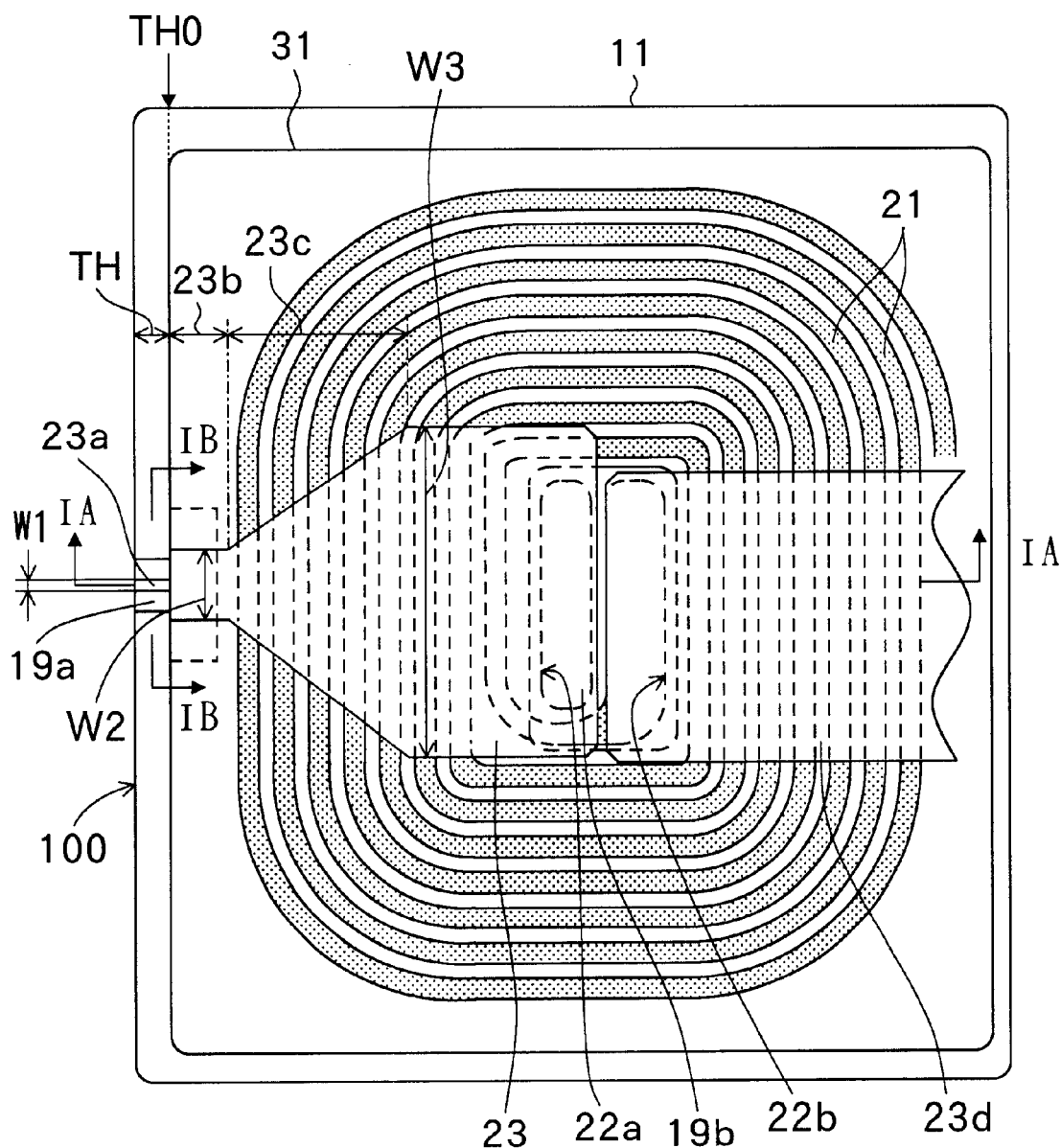
FIG. 2 is a plan view illustrating a recording head portion of the thin-film magnetic head of the first embodiment of the invention.

A first embodiment of the invention relates to an example where the present invention is applied to a composite thin-film magnetic head (hereinafter referred to simply as a thin-film magnetic head) having both a reproducing head and a recording head with a thin-film coil formed as a single layer for generation of magnetic flux. FIG. 1A and FIG. 1B are cross sectional views illustrating an important part of the thin-film magnetic head according to the first embodiment of the invention, and FIG. 2 is a plan view illustrating the recording head portion of the thin-film magnetic head according to the first embodiment of the invention. More specifically, FIG. 1A is a cross sectional view of the important part of the head taken along the line IA—IA perpendicular to the track surface (air bearing surface) 100 in FIG. 2, while FIG. 1B is a cross sectional view of the important part of the head taken along the line IB—IB parallel to the track surface (air bearing surface) 100 in FIG. 2. As shown in FIGS. 1A and 1B, the thin-film magnetic head of the first embodiment of the invention includes a reading head portion with magnetoresistive effect for reproduction (hereinafter referred to simply as a reproducing head portion) 1A, and an inductive recording head portion for recording (hereinafter referred to simply as a recording head portion) 1B, with the recording head portion 1B disposed on the reproducing head portion 1A.

As shown in FIG. 1A and FIG. 1B, the reproducing head portion 1A includes an insulating layer 12 formed of, for example, alumina (aluminum oxide: $Al_2O_3$) on a substrate 11 formed of, for example, Altic, i.e., aluminum oxide and titanium carbide ($Al_2O_3$ with TiC), a bottom shield layer 13 formed of, for example, iron silicide aluminum (FeAlSi), a shield gap layer 14 formed of, for example, alumina, and a magnetoresistive film (hereinafter referred to simply as an MR film) 15 in a predetermined pattern, stacked in this order. Further, in the reproducing head portion 1A, a pair of lead terminal layers 15a and 15b are formed of a material, such as tantalum (Ta), tungsten (W), or the like, which does not diffuse into the MR film, on the shield gap layer 14. The lead terminal layer 15a is electrically connected to one end of the MR film 15, while the lead terminal layer 15b is electrically connected to the other end of the MR film 15. A material of the MR film 15 can be selected from a variety of materials with magnetoresistive effect, such as permalloy, an alloy of nickel (Ni) and cobalt (Co), and the like. A shield gap layer 17 of, for example, alumina is disposed on the MR film 15 and the lead terminal layers 15a and 15b. In other words, the MR film 15 and the lead terminal layers 15a and 15b are buried between the shield gap layers 14 and 17. The MR film 15 is not limited to the above example, and may be formed of any magnetoresistive film exhibiting magnetoresistive effect, such as an AMR film, a GMR film having a non-magnetic layer between a free layer (magnetic layer) and a fixed layer (magnetic layer), a TMR film, or the like.

As shown in FIG. 1A and FIG. 1B, the recording head portion 1B includes a bottom magnetic layer having a bottom pole 18 and the bottom pole tip portion 19a magnetically coupled to each other, a top magnetic layer having a top pole 23 and a top pole tip portion 23a magnetically coupled to each other, and a thin-film coil 21 formed as a single layer for generating magnetic flux. Part of the bottom pole tip portion 19a on the track surface (air bearing surface) 100 side facing a magnetic recording medium, and the top pole tip portion 23a are both located adjacent to a write gap layer 22, and facing each other with the write gap layer 22 in between. In part of the top pole 23, a first non-magnetic body 31 is formed adjacent to the write gap layer 22. In part of the bottom pole tip portion 19a, a second non-magnetic body 30a is formed adjacent to the write gap layer 22 and facing part of the first non-magnetic body 31 with the write gap layer 22 in between.

The bottom pole 18 also functions as a top shield layer for the MR film 15. In the thin-film magnetic head of the first embodiment of the invention, the bottom pole 18 and the bottom pole tip portion 19a are magnetically coupled to each other; the top pole tip portion 19a is formed on the bottom pole 18, so that the top pole tip portion 19a and the bottom pole 18 are provided as separate magnetic layers. Further in the thin-film magnetic head of the first embodiment of the invention, the top pole tip portion 23a and the top pole 23 are magnetically coupled to each other, and formed :integrally as a single magnetic layer. The bottom pole 18 and the top pole 23 are magnetically coupled to each other through a magnetic connection portion 19b, which is formed of the same magnetic layer as the bottom pole tip portion 19a.

Specifically, it is practical to form each of these components, namely, the bottom pole 18, the bottom pole tip portion 19a, the magnetic connection portion 19b, the top pole tip portion 23a, and the top pole 23, of, for example, a material with high saturation magnetic flux density (Hi-Bs material), such as permalloy (including 50 weight-% Ni and 50weight-% Fe, or 80 weight-% Ni and 20 weight-% Fe), FeN, FeZrNP, CoFeN, or the like.

The recording head portion 1B has a trim structure in which surfaces of the top pole tip portion 23a, the write gap layer 22, and the bottom pole tip portion 19a are partially cut together to match a predetermined track width, to thereby suppress an increase in effective writing track width, i.e. divergence of magnetic flux at the bottom pole tip portion 19a in writing magnetic data.

The thin-film coil 21 is disposed between the bottom pole tip portion 19a and the magnetic connection portion 19b on the bottom pole 18, and in a region located on the right-hand side of the magnetic connection portion 19b when viewed as FIG. 1A and FIG. 2. As shown in FIG. 2, the thin-film coil 21 has a spiral planar shape winding around the magnetic connection portion 19b a plurality of times with the magnetic connection portion 19b being the center. As shown in FIG. 1A, the thin-film coil 21 is formed on an insulating layer 20 provided on the bottom pole 18, and is buried in an insulating layer 30 having a planarized surface to level with the top surfaces of the bottom pole tip portion 19a and the magnetic connection portion 19b. By thus burying the thin-film coil 21 in a concave portion formed between the bottom pole tip portion 19a and the magnetic connection portion 19b, a difference in level at the apex portion can be reduced. The thin-film coil 21 is electrically connected to a coil connection wiring 23d through a connection hole 22b. The coil connection wiring 23d is formed of the same layer as the top pole 23 in the thin-film magnetic head of the first embodiment of the invention.

The write gap layer 22 is formed on the bottom pole tip portion 19a. On the side of the write gap layer 22 far from the track surface (air bearing surface) 100 side, a non-magnetic layer 22d is formed for magnetically separating the bottom pole 18 and the top pole 23 from each other. The write gap layer 22 and the non-magnetic layer 22d are formed as the same layer. The bottom pole tip portion 19a and the top pole tip portion 23a are magnetically coupled via the bottom pole 18, the magnetic connection portion 19b, and the top pole 23 positioned in between through an opening 22a formed in the write gap layer 22 on the magnetic connection portion 19b.

As shown in FIG. 2, the top pole 23 includes the top pole tip portion 23a, an overwrite improvement portion 23b, and a magnetic flux convergence portion 23c disposed in this order from the end on the track surface (air bearing surface) 100 side to the other end. The overwrite improvement portion 23b has a width W2 greater than a track width W1 of the top pole tip portion 23a, and smaller than a maximum width W3 of the top pole 23. The position where the top pole tip portion 23a and the overwrite improvement portion 23b are coupled corresponds to the throat height zero (TH0) position. In such a configuration, the length (height) of the top pole tip portion 23a from the track surface (air bearing surface) 100 corresponds to the throat height (TH). The magnetic flux convergence portion 23c has a width gradually narrowed from the maximum width W3 of the top pole 23 to the width W2 of the overwrite improvement portion 23b as it approaches the track surface (air bearing surface) 100. The magnetic flux generated by the thin-film coil 21 is gradually converged as it propagates from the magnetic flux convergence portion 23c through the overwrite improvement portion 23b to the top pole tip portion 23a.

As shown in FIG. 1A and FIG. 2, in the first embodiment of the invention, the first non-magnetic body 31 is disposed on the top pole 23 side of the write gap layer 22 provided between the bottom pole tip portion 19a and the top pole tip portion 23a. The first non-magnetic body 31 is formed as the underlayer of the top pole 23, and magnetically separates the bottom pole 18 and the top pole 23 from each other. The first non-magnetic body 31 has a wedge-shaped cross section on the track surface (air bearing surface) 100 side with a tip directed toward the track surface (air bearing surface) 100. The first non-magnetic body 31 is provided with a gentle slope, and has a thickness gradually increasing from the throat height zero (TH0) position toward the thin-film coil 21, and the apex angle can be reduced to the value as small as being in the range of 15 degrees to 30 degrees. In the first embodiment of the invention, the end of the first non-magnetic body 31 located on the track surface (air bearing surface) 100 side is designed to determine the throat height zero (TH0) position. The gentle slope of the first non-magnetic body 31 is preferably provided at least in the region of the overwrite improvement portion 23b.

In the first embodiment of the invention, the first non-magnetic body 31 is formed of, for example, a photoresist film. The method of manufacturing this film will be described in detail hereinafter. By applying a heat treatment (reflow or baking) to the photoresist film at a predetermined temperature, the periphery portion of the film can be provided with a gently sloped surface having a gradually changed height. The central portion of the photoresist film can be provided with a planarized surface having substantially no difference in height. The first non-magnetic body 31 can be practically formed of either an organic spin-on-glass film or an inorganic spin-on-glass film, other than the photoresist film.

The second non-magnetic body 30a is disposed on the bottom pole 18 side of the write gap layer 22 located between the bottom pole tip portion 19a and the top pole tip portion 23a. The second nonmagnetic body 30a is disposed filling in a concave portion 19d formed at a surface portion of the bottom pole tip portion 19a from the throat height zero (TH0) position or the vicinity thereof toward the thin-film coil 21. The concave portion 19d has a depth shallower than the depth of a concave portion 19c for disposing the thin-film coil 21 therein. More specifically, the concave portion 19d is provided with the depth at least sufficient for preventing leakage of magnetic flux between the bottom pole 18 and the top pole 23 in the vicinity of the throat height zero (TH0) position.

While, in the first embodiment of the invention, magnetic flux leakage between the bottom pole tip portion 19a and the top pole 23 in the vicinity of the throat height zero (TH0) position is prevented by stacked layers of the second non-magnetic body 30a and the insulating layer 20 formed along the surface of the concave portion 19d, basically only the second non-magnetic body 30a is required for this purpose.

The second non-magnetic body 30a is formed in the concave portion 19c integrally with, and as the same layer as, the insulating layer 30 for burying the thin-film coil 21. In the first embodiment of the invention, the second non-magnetic body 30a (and the insulating layer 30) are formed of, for example, an alumina film having a planarized surface. Either a silicon oxide film or a silicon nitride film can be practically used for forming the second non-magnetic body 30a, other than the photoresist film, the organic spin-on-glass film, and the inorganic spin-on-glass film, having a gentle slope similarly to the first non-magnetic body 31. The insulating layer 20, which is formed on the surface of the concave portion 19d of the bottom pole tip portion 19a, on the surface of the bottom pole 18, and the like, may be practically formed of, for example, an alumina film.

Since the concave portion 19d used for disposing therein the second non-magnetic body 30a is formed on the surface of the bottom pole tip portion 19a opposing to the first non-magnetic body 31 in the thickness direction, magnetic flux flowing from the bottom pole 18 to the bottom pole tip portion 19a is gradually converged because the cross sectional area of the magnetic path is gradually reduced. Therefore, the concave portion 19d used for disposing therein the second non-magnetic body 30a can achieve flux control, to thereby improve the overwrite characteristics and non-linear transition shift (NLTS).

An overcoat layer 26 is formed on the surfaces of the top pole tip portion 23a, the top pole 23, and the coil connection wiring 23d. The overcoat layer 26 is provided for the purpose of protecting the thin-film magnetic head.

The thin-film magnetic head of the first embodiment of the invention can read out information from a magnetic recording medium using the magnetoresistive effect of the MR film 15 in the reproducing head portion 1A, and can write information into the magnetic recording medium by generating a signal magnetic field at the external region from the very tip of the top pole tip portion 23a or the bottom pole tip portion 19a in the recording head portion 1B.

A method of manufacturing the thin-film magnetic head of the first embodiment of the invention will next be described. FIG. 3A to FIG. 6B are cross sectional views illustrating the steps of manufacturing the thin-film magnetic head for describing the manufacturing method. FIG. 3A, FIG. 4A, FIG. 5A, and FIG. 6A are cross sectional views illustrating the manufacturing steps taken along the line IA—IA in FIG. 2, while FIG. 3B, FIG. 4B, FIG. 5B, and FIG. 6B are cross sectional views illustrating the manufacturing steps taken along the line IB—IB in FIG. 2. FIG. 7 to FIG. 10 are perspective views illustrating an important part of the thin-film magnetic head at given manufacturing steps.

Figures 3A, 3B:
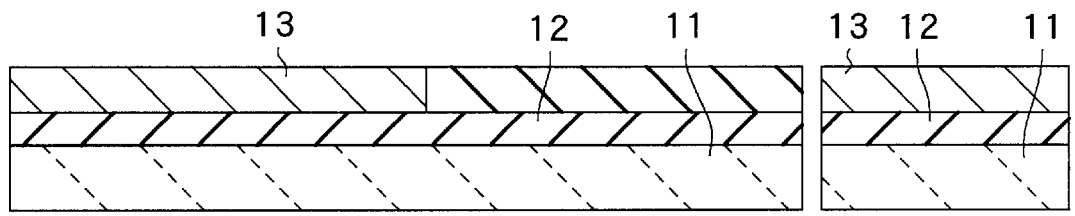
FIG. 3A and FIG. 3B are cross sectional views illustrating a manufacturing step of the thin-film magnetic head for use in description of a manufacturing method of the first embodiment of the present invention, taken along the line perpendicular to, and parallel to, a track surface (air bearing surface), respectively.

First, as shown in FIG. 3A and FIG. 3B, the substrate 11 of, for example, Altic is prepared, and on this substrate 11 the insulating layer 12 of alumina having a thickness of about 3 μm to 5 μm is formed through, for example, sputtering. Using a photoresist mask formed on the insulating layer 12, a layer of permalloy of about 3 μm in thickness is selectively formed by plating. The photoresist mask is then removed, and the bottom shield layer 13 for the reproducing head is formed. An alumina film (no reference numerals indicated) of about 4 μm to 6 μm in thickness is formed by, for example, sputtering or chemical vapor deposition (CVD), and the surface of this alumina film is planarized by chemical and mechanical polishing (CMP) until the surface becomes level with the surface of the bottom shield layer 13. As a result, the alumina film is embedded around the bottom shield layer 13.

Figures 4A, 4B:
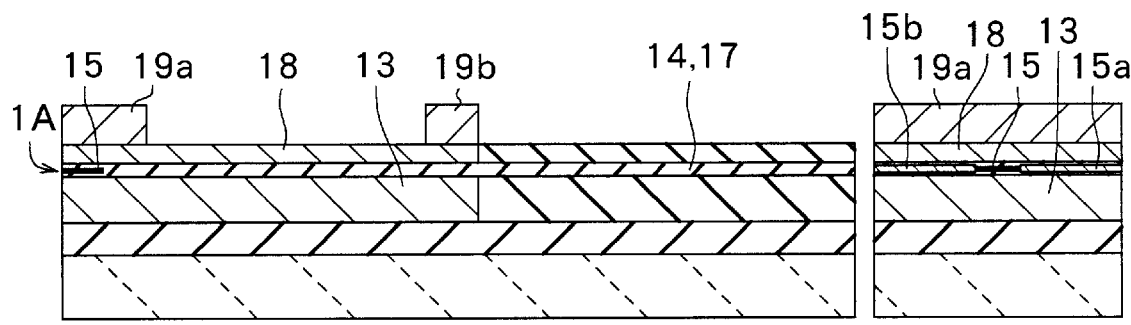
FIG. 4A and FIG. 4B are cross sectional views illustrating a step of manufacturing the thin-film magnetic head following the step shown in FIG. 3A and FIG. 5B.

As shown in FIG. 4A and FIG. 4B, a layer of, for example, alumina is deposited in thickness of 100 nm to 200 nm on the bottom shield layer 13 through sputtering, to thereby form the shield gap layer 14. The MR film 15 constituting the MR element and the like for reproduction is formed in thickness of tens of nanometers on the shield gap layer 14, and then the MR film 15 is patterned to a desired shape through high-precision photolithography. The lead terminal layers 15a and 15b for the MR film 15 are formed by, for example, a lift-off method. The shield gap layer 17 is formed over the entire surface of the substrate including the surfaces of the shield gap layer 14, the MR film 15, and the lead terminal layers 15a and 15b, whereby the MR film 15, and the lead terminal layers 15a and 15b are buried between the shield gap layers 14 and 17. The bottom pole 18 of about 1.0 μm to 1.5 μm in thickness is formed of, for example, permalloy on the shield gap layer 17. The bottom pole 18 also serves as a top shield layer for the reproducing head portion 1A, and formation of the bottom pole 18 virtually completes the reproducing head portion 1A. An alumina film (no reference numeral indicated) is formed by, for example, sputtering or CVD, and the surface of this alumina film is planarized by CMP so as to level with that of the bottom pole 18. Consequently, the alumina film is embedded around the bottom pole 18.

Figure 7:
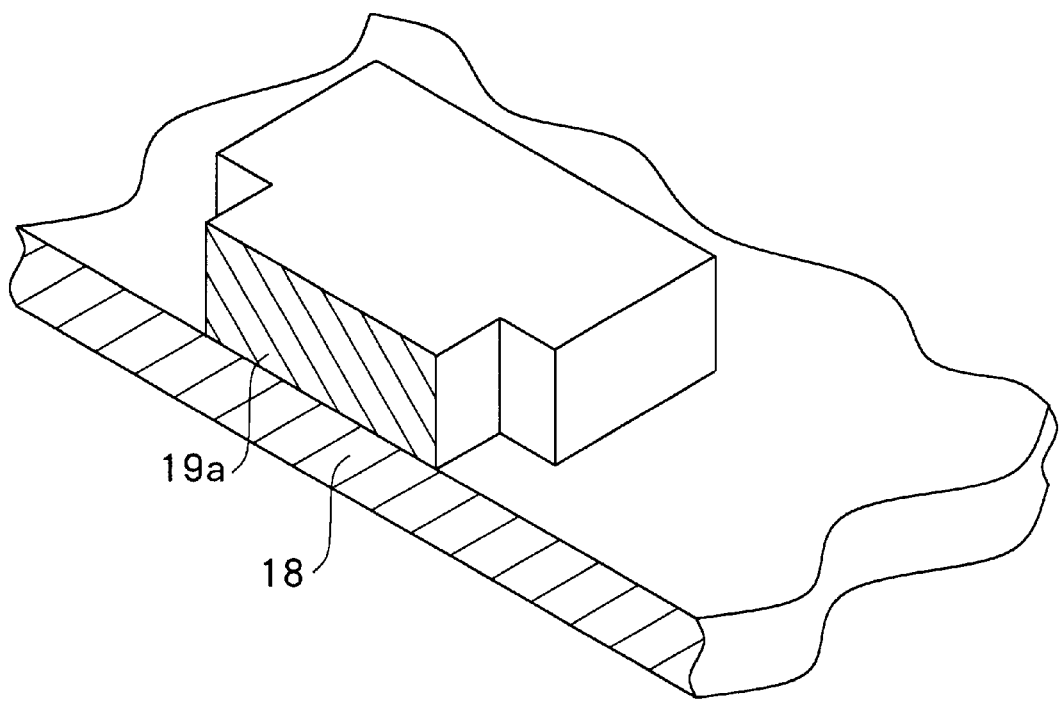
FIG. 7 is a perspective view illustrating an important part of the thin-film magnetic head of the first embodiment of the invention at a given manufacturing step.

As shown in FIG. 4A and FIG. 4B, the bottom pole tip portion 19a and the magnetic connection portion 19b are formed in thickness of about 1.5 μm to 2.0 μm on the bottom pole 18. The bottom pole tip portion 19a and the magnetic connection portion 19b may be formed of plated films of permalloy or the like, as described above, or formed of FeN, FeZrNP, CoFeN, or the like, by sputtering and patterned to a predetermined shape through ion milling or the like. The bottom pole tip portion 19a has a planar shape such as the one shown in FIG. 2. As shown in FIG. 2 and FIG. 7, the bottom pole tip portion 19a has a T-shaped plane having a small width on the track surface (air bearing surface) 100 side and a greater width on the magnetic connection portion 19b side. By providing the bottom pole tip portion 19a with such a T-shaped plane, magnetic flux flowing from the magnetic connection portion 19b side toward the track surface (air bearing surface) 100 side can be gradually converged, so that a thin-film magnetic head which excels in both flux rise time and NLTS can be achieved.

Figures 5A, 5B:
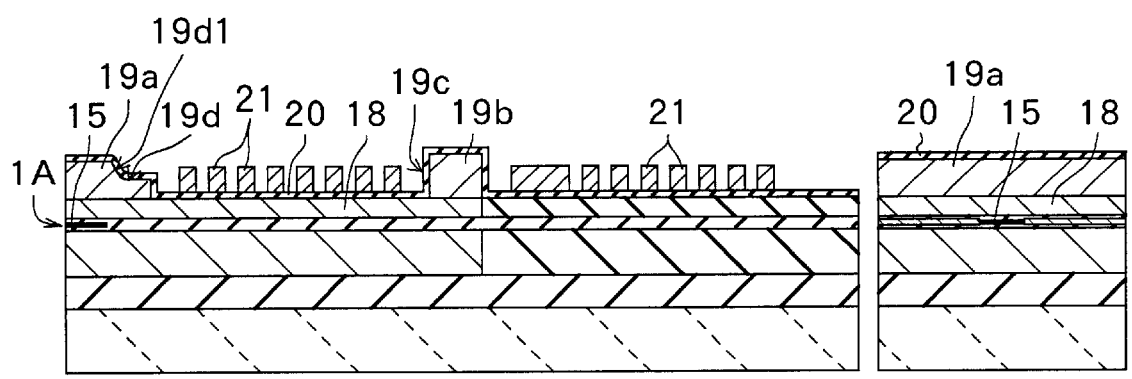
FIG. 5A and FIG. 5B are cross sectional views illustrating a step of manufacturing the thin-film magnetic head following the step shown in FIG. 4A and FIG. 4B.
Figure 8:
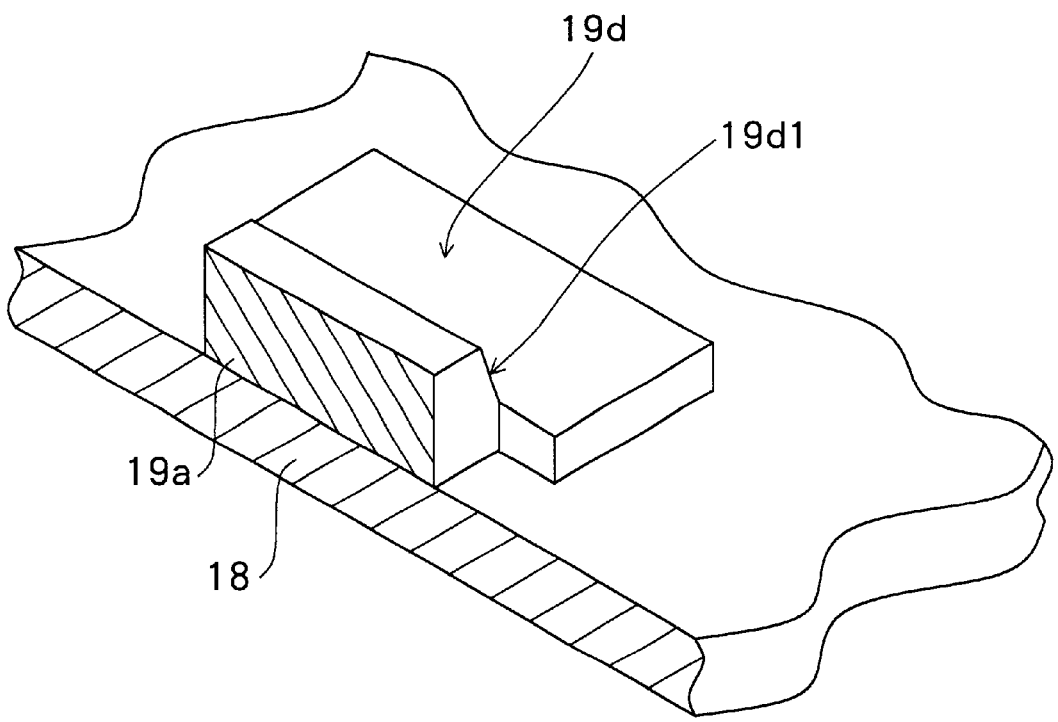
FIG. 8 is a perspective view illustrating the important part of the thin-film magnetic head at a given manufacturing step following the step shown in FIG. 7.

As shown in FIG. 5A and FIG. 8, the concave portion 19d is formed on the surface of the bottom pole tip portion 19a from the throat height zero (TH0) position toward the magnetic connection portion 19b for the sake of forming the second non-magnetic body 30a. The concave portion 19d can be formed by ion milling under a reactive ion etching (RIE) method using an unillustrated mask formed through photolithography. The concave portion 19d is formed of, for example, about 0.3 μm to 1.0 μm in depth sufficient for preventing magnetic leakage. The concave portion 19d preferably has a slope 19d1 at its inner wall formed as a result of a slightly large amount of side etching to achieve flux control. As shown in the figures, the insulating layer 20 of about 0.3 μm to 0.5 μm in thickness is formed of an insulating material, such as alumina, by sputtering or CVD over the entire surface. The insulating layer 20 can be formed along the surface of the concave portion 19d of the bottom pole tip portion 19a.

As shown in FIG. 5A, the thin-film coil 21 for generating magnetic flux is formed of, for example, copper (Cu) by, for example, electrolytic plating on the insulating layer 20 provided in the concave portion 19c between the bottom pole tip portion 19a and the magnetic connection portion 19b, and on the insulating layer 20 located at the outer peripheral portion on the right side of the magnetic connection portion 19b when viewed as FIG. 2. The thin-film coil 21 has a thickness of, for example, 1.0 μm to 2.0 μm, and a coil pitch of 1.2 μm to 2.0 μm.

Figures 6A, 6B:
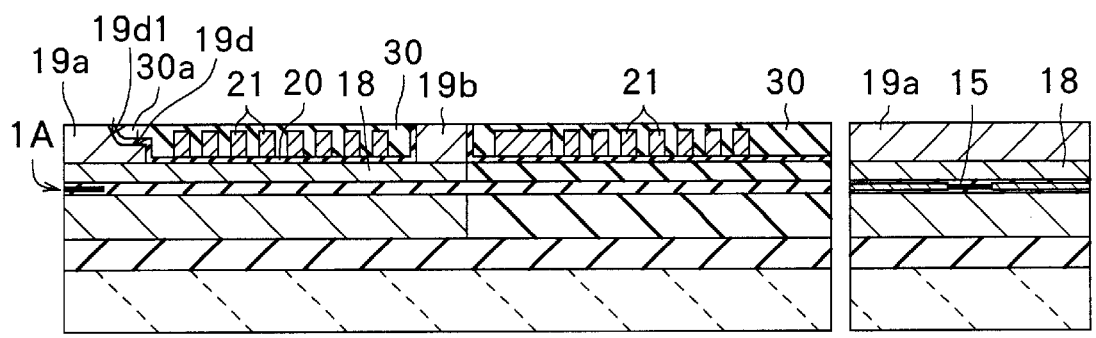
FIG. 6A and FIG. 6B are cross sectional views illustrating a step of manufacturing the thin-film magnetic head following the step shown in FIG. 5A and FIG. 5B.

As shown in FIG. 6A, the insulating layer 30 having a thickness of 3.0 μm to 4.0 μm is formed of an insulating material, such as alumina, over the entire surface of the substrate including the thin-film coil 21 by sputtering. By the same step as this step of forming the insulating layer 30, the second non-magnetic body 30a can be formed filling in the concave portion 19d of the bottom pole tip portion 19a. The surfaces of the insulating layer 30 and the second non-magnetic body 30a are planarized by, for example, CMP until the surfaces of the bottom pole tip portion 19a and the magnetic connection portion 19b are exposed. It should be noted that, in the thin-film magnetic head of the first embodiment of the invention, a spin-on-glass film may be first applied on the thin-film coil 21 as a gap filling material and then the insulating layer 30 of an alumina film and the second non-magnetic body 30a may be formed by the same step, followed by planarization of the surfaces of the insulating layer 30 and the second non-magnetic body 30a by CMP.

As shown in FIG. 1A and FIG. 1B, the write gap layer 22 is formed on the bottom pole tip portion 19a, and the non-magnetic layer 22d is formed over the rest of the surface. The write gap layer 22 and the non-magnetic layer 22d are formed of, for example, alumina as the same layer by CVD in thickness of 0.15 μm to 0.3 μm. The write gap layer 22 and the non-magnetic layer 22d produced by the CVD method are so dense that generation of pin holes is decreased, to thereby further prevent magnetic leakage. As the material of the write gap layer 22 and the non-magnetic layer 22d, non-magnetic materials, such as aluminum nitride (AlN), silicon oxide ($SiO_2$) based material, silicon nitride ($Si_3N_4$) based material, tantalum (Ta), titanium-tungsten (TiW), and titanium nitride (TiN), may be practically used other than alumina. The films may not be necessarily formed by CVD, and may be formed by, for example, sputtering. The portions of the non-magnetic layer 22d located on the magnetic connection portion 19b and a predetermined portion on the thin-film coil 21 are then removed by patterning, to thereby form the opening 22a for magnetically connecting the magnetic connection portion 19b and the top pole 23 to be formed in a later step, and the connection hole 22b for electrically connecting the thin-film coil 21 and the coil connection wiring 23d to be formed in a later step.

As shown in FIG. 1A, the first non-magnetic body 31 is formed on the non-magnetic layer 22d. In the first embodiment of the invention, the first non-magnetic body 31 can be formed by, for example, a rotational application of a photoresist film, followed by light exposure, development, patterning to a predetermined shape, and reflow at a temperature in the range of 200° C. to 300° C. It should be noted that a "predetermined shape" is the shape corresponding to the region of the top pole 23 excluding the opening 22a and the region where the top pole tip portion 23a will be formed in a later step. As the photoresist film is subjected to the reflow process, the first non-magnetic body 31 can be provided with the central portion having a planarized surface and the peripheral portion having a gentle slope with a gradual change in height. More specifically, the first non-magnetic body 31 has a gentle slope at least from the throat height zero (TH0) position toward the thin-film coil 21, and the apex angle formed by such a gentle slope can be reduced to as small as 15 degrees to 30 degrees. Further, in the first embodiment of the invention, the throat height zero (TH0) position is determined in effect by the respective one ends of the first non-magnetic body 31 and the second non-magnetic body 30a on the track surface (air bearing surface) 100 side. As a non-magnetic material for providing a gentle slope through a reflow at a temperature in the range of 200° C. to 300° C., an organic spin-on-glass film or an inorganic spin-on-glass film may similarly be used to form the first non-magnetic body 31.

The top pole 23 is next formed to cover the surface of the first non-magnetic body. The top pole 23 has a planar shape such as that shown in FIG. 2. The coil connection wiring 23d is formed simultaneously. The top pole tip portion 23a, the top pole 23, and the coil connection wiring 23d can be practically formed of permalloy (including 80 weight-% Ni and 20 weight-% Fe, or 45 weight-% Ni and 55 weight-% Fe), which is a material with high saturation magnetic flux density, by, for example, plating. For the top pole tip portion 23a and the like, a material such as FeN, FeZrNP, CoFeN, or the like formed by, for example, sputtering can be practically used, and such a magnetic film can be patterned through, for example, ion milling. Further, the top pole tip portion 23a, the top pole 23, and the coil connection wiring 23d can be each formed of a composite film having multiple layers of an inorganic insulating film and a magnetic film, such as permalloy, repeatedly stacked so as to improve high frequency characteristics. Especially, as the top pole 23 is formed on the surface of the first non-magnetic body 31 having a gentle slope in the vicinity of the throat height zero (TH0) position, effects of light reflected from the apex angle portion can be reduced, to thereby improve processing accuracy of the photoresist mask for forming the top pole tip portion 23a and the top pole 23 by photolithography. In other words, at least the processing accuracy (patterning accuracy) of the top pole tip portion 23a can be improved, and therefore a track width in the order of submicrons can be achieved.

Figure 9:
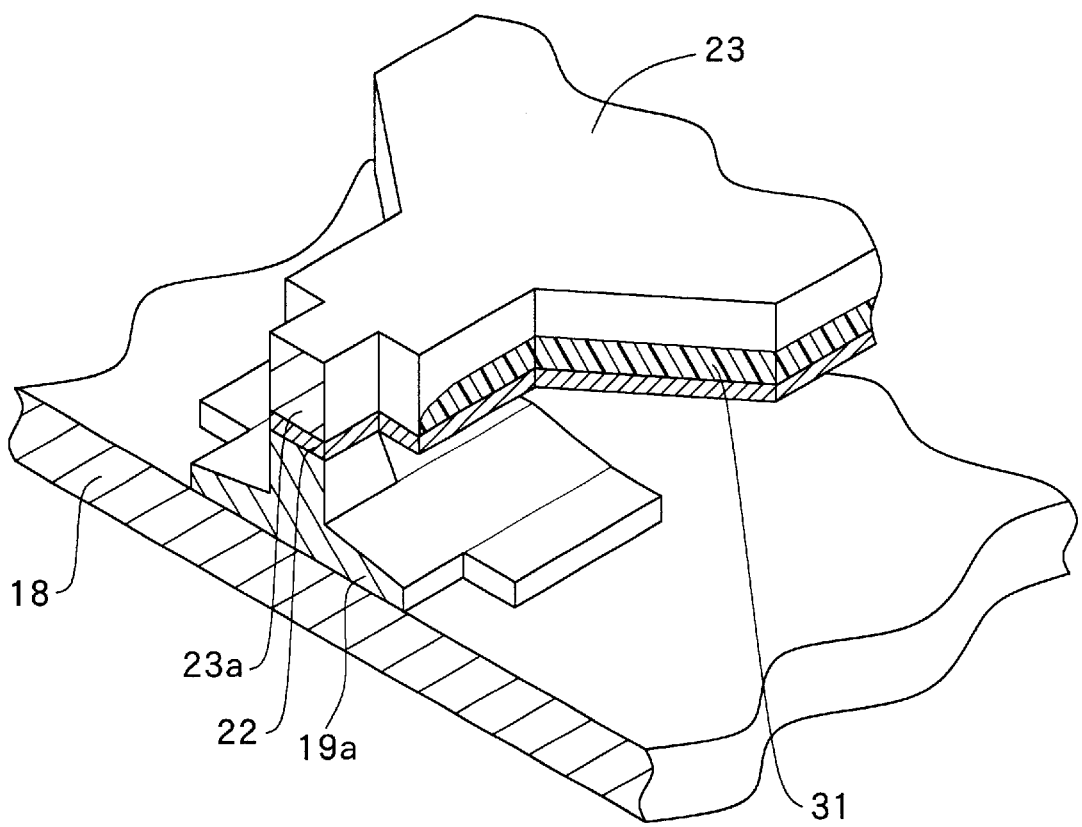
FIG. 9 is a perspective view illustrating the important part of the thin-film magnetic head at a given manufacturing step following the step shown in FIG. 8.

As shown in FIG. 1B and FIG. 9 for example, an ion milling process under an RIE method using a chlorine type gas ($Cl_2$, $CF_4$, $BCl_2$, $SF_6$, or the like) is performed with the top pole tip portion 23a as an etching mask, to thereby etch parts of the write gap layer 22 and the bottom pole tip portion 19a located in the vicinity thereof by about 0.3 μm to 0.6 μm in a self-aligned manner and form a trim structure.

Figure 10:
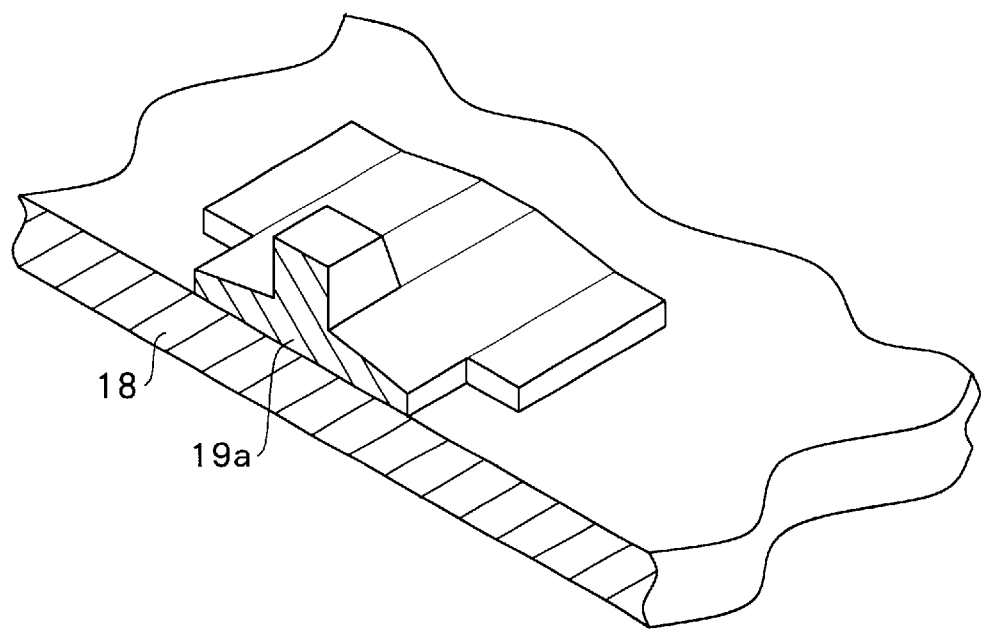
FIG. 10 is a perspective view illustrating the important part of the thin-film magnetic head at a given manufacturing step following the step shown in FIG. 9.

In FIG. 9, the insulating layers 20 and 30, the thin-film coil 21, and the like are not illustrated. For the sake of easy understanding of the shape of the bottom pole tip portion 19a, FIG. 10 shows the state where the write gap layer 22, the top pole tip portion 23a, the top pole 23, and the like, are removed from the head shown in FIG. 9. The recording head portion 1B with the trim structure is completed when the above step is finished.

Finally, as shown in FIG. 1A, FIG. 1B, and FIG. 2, the overcoat layer 26 of about 20 μm to 40 μm in thickness is formed of alumina by, for example, sputtering over the entire surface. Thereafter, a machining process with a slider is performed to form the track surface (air bearing surface) 100 of the reproducing head portion 1A and the recording head portion 1B, to thereby complete the thin-film magnetic head of the first embodiment of the invention.

According to the thin-film magnetic head and the method of manufacturing the same of the above-described first embodiment of the invention, the first non-magnetic body has a wedge-shaped cross section with its tip facing the track surface (air bearing surface) 100, and therefore the thickness of the first non-magnetic body gradually increases from the throat height zero (TH0) position. As a result, the top pole 23 can be formed along the gentle slope of the first non-magnetic body 31, and can be provided with a gradually changed height, so that magnetic volume can be efficiently converged. Further, because the second non-magnetic body 30a facing the first non-magnetic body 31 is provided in the vicinity of the throat height zero (TH0) position, the effective thickness of the non-magnetic body can be increased, and magnetic leakage between the magnetic layers of the bottom pole 18 and the top pole 23 can be prevented. Especially in forming the trim structure by patterning the top pole tip portion 23a, the write gap layer 22, and the bottom pole tip portion 19a, the processing accuracy of the patterning mask for the top pole tip portion 23a can be improved because the layer on the first non-magnetic body 31 can be planarized along the gentle slope thereof, and therefore the processing accuracy of the write gap layer 22 and the bottom pole tip portion 19a formed by using the top pole tip portion 23a as a patterning mask can be improved. As a result, a narrow track width can be realized.

Further, according to the thin-film magnetic head and the method of manufacturing the same of the first embodiment of the invention, the first non-magnetic body 31 is formed of a photoresist film, an organic spin-on-glass film, or an inorganic spin-on-glass film, and is subjected to a reflow process at a relatively low temperature, making it possible to easily obtain a gradually sloped surface of the first non-magnetic body 31.

Further, according to the thin-film magnetic head and the method of manufacturing the same of the first embodiment of the invention, the second non-magnetic body 30a is disposed filling in the concave portion 19d provided at the bottom pole tip portion 19a, and therefore the thickness of the second non-magnetic body 30a can be absorbed by the concave portion 19d, to thereby obtain a relatively flat surface of the second non-magnetic body 30a. Especially by forming the second non-magnetic body 30a integrally with the insulating layer 30 for burying the thin-film coil 21, the second non-magnetic body 30a can be formed simultaneously with the insulating layer 30, and the structure of the thin-film magnetic head can be simplified. Further, because the second non-magnetic body 30a and the insulating layer 30 for burying the thin-film coil 21 are formed by the same step, the second non-magnetic body 30a can be formed simultaneously with the insulating layer 30, to thereby reduce the number of steps for manufacturing the thin-film magnetic head.

Figures 11A, 11B:
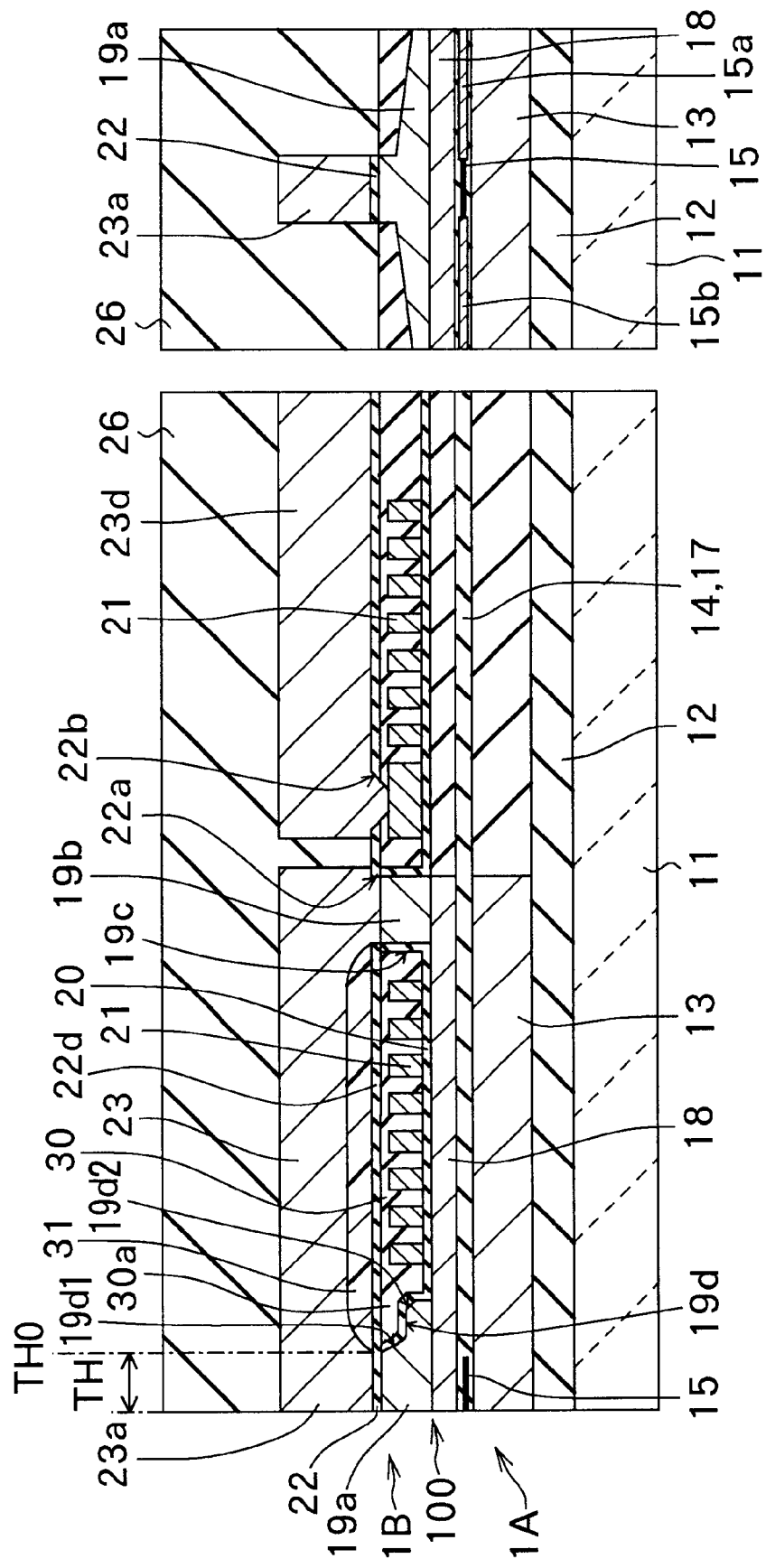
FIG. 11A and FIG. 11B are cross sectional views illustrating an important part of a thin-film magnetic head according to a variation of the first embodiment of the present invention, taken along the line perpendicular to, and parallel to, the track surface (air bearing surface), respectively.

The cross section of the bottom pole tip portion 19a in the above embodiment is not limited to that shown in FIG. 1A and 1B, and the bottom pole tip portion 19a may have a cross section such as that shown in FIG. 11A and 11B. FIG. 11A and FIG. 11B are cross sectional views illustrating an important part of a thin-film magnetic head according to a variation of the above embodiment, and correspond to the cross sectional views of FIG. 1A and FIG. 1B illustrating an important part thereof. In FIG. 11A and FIG. 11B, the components of the thin-film magnetic head identical to those shown in FIG. 1A and FIG. 1B are indicated by the identical numerals, and the descriptions are appropriately omitted except for he varied parts.

As shown in FIG. 11A, the thin-film magnetic head according to the variation includes the slope 19d1 at an inner wall of the concave portion 19d formed at the top pole tip portion 19a, and also a chamfered portion 19d2 at the corner of the bottom surface of the concave portion 19d and the side surface of the concave portion 19c for disposing the thin-film coil 21. Both the slope 19d1 and the chamfered portion 19d2 are provided so that an area of the cross section of the bottom pole tip portion 19a gradually decreases from the bottom pole 18 side (lower side) toward the write gap layer 22 side (upper side), to thereby gradually converge magnetic flux flowing in this direction and therefore reduce magnetic saturation. Similarly to the thin-film magnetic head of the first embodiment of the invention, the second non-magnetic body 30a is formed on the surfaces of the concave portion 19d, the slope 19d1, and the chamfered portion 19d2 of the bottom pole tip portion 19a with the insulating layer 20 interposed therebetween. Of course, the first non-magnetic body 31 is disposed on the second non-magnetic body 30a with the write gap layer 22 in between.

Figure 12A:
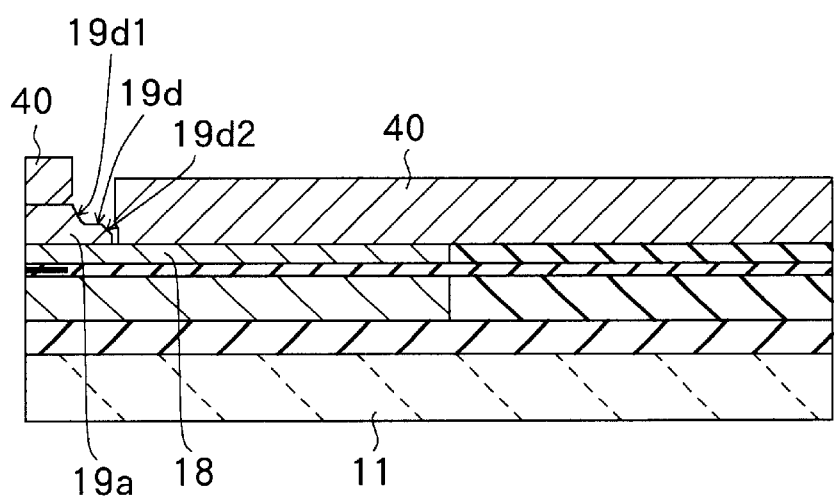
FIG. 12A and FIG. 12B are cross sectional views illustrating a manufacturing step for use in description of the method of manufacturing the thin-film magnetic head according to the variation of the first embodiment of the invention, taken along the line perpendicular to, and parallel to, the track surface (air bearing surface), respectively.
Figure 12B:
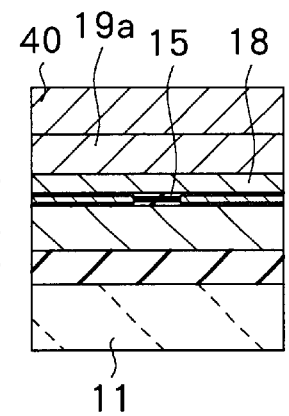

FIG. 12A and FIG. 12B are cross sectional views of an important part of the thin-film magnetic head according to the variation shown in FIG. 11A and FIG. 11B illustrating the step of forming the bottom pole tip portion 19a. In FIG. 12A and FIG. 12B, the manufacturing steps up to the step of forming the concave portion 19d at the bottom pole tip portion 19a are the same as the corresponding steps in the above-described embodiment up to the step shown in FIG. 5A and FIG. 5B, and therefore description thereof will not be repeated. In the method of manufacturing the thin-film magnetic head of this variation, as shown in FIG. 12A and FIG. 12B, after the concave portion 19d is formed at the bottom pole tip portion 19a, a photoresist mask 40 is formed having an opening for exposing the inner wall and the bottom surface of the concave portion 19d. Using the photoresist mask 40, an ion milling etching process under an RIE method is performed from the direction of, for example, 45 degrees, to remove part of the bottom pole tip portion 19a, whereby the slope 19d1 and the chamfered portion 19d2 are formed as shown in FIG. 12A. The steps after forming the bottom pole tip portion 19a are the same as those in the above-described embodiment.

According to the thin-film magnetic head and the method of manufacturing the same of this variation, the concave portion 19d is formed at the bottom pole tip portion 19a, and the slope 19d1 and the chamfered portion 19d2 are further formed at this concave portion 19d. As a result, an area of the cross section of the bottom pole tip portion 19a can be gradually varied in the direction where magnetic flux flows, so that flux control can be achieved.

Figures 13A, 13B:
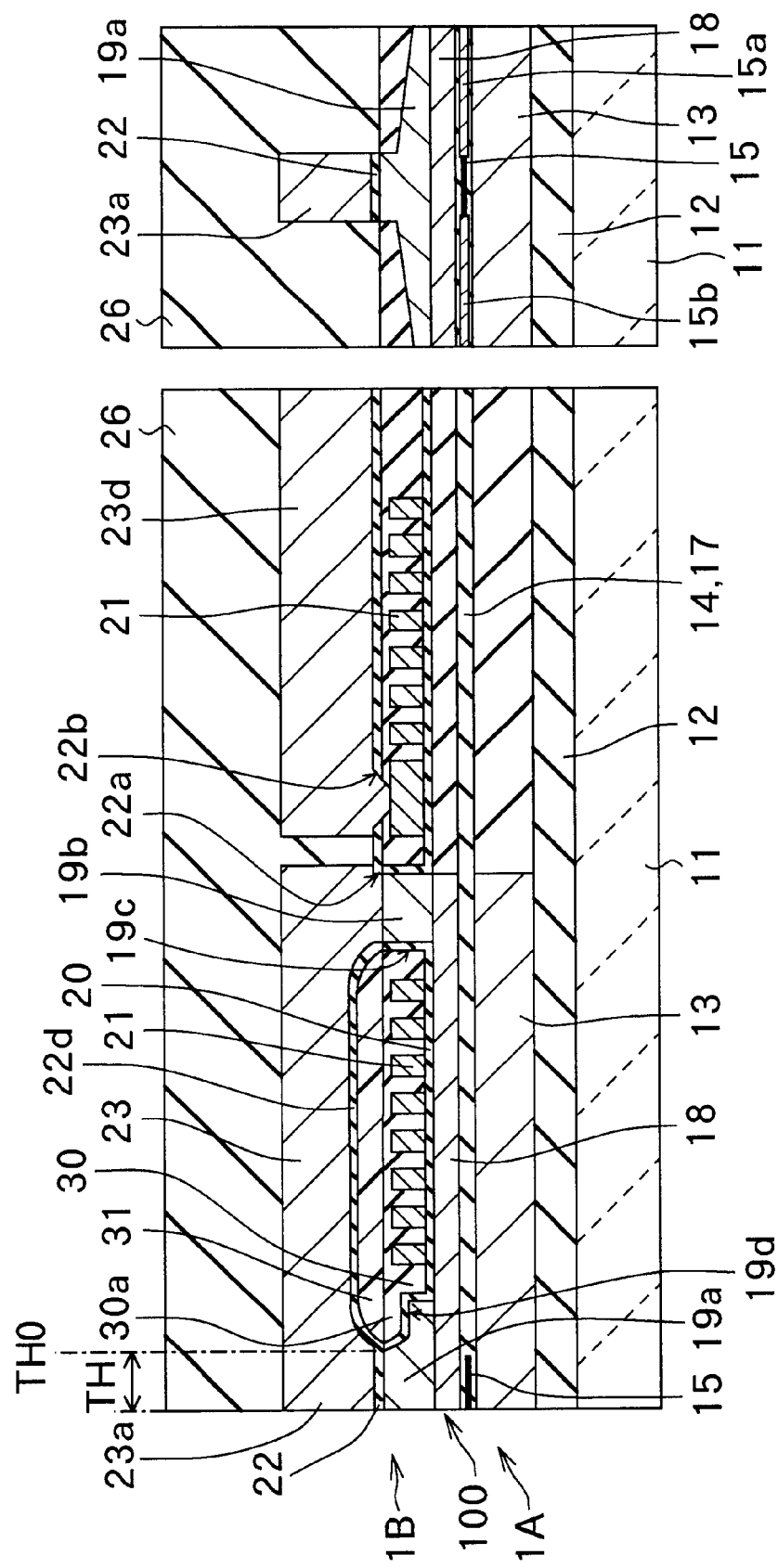
FIG. 13A and FIG. 13B are cross sectional views illustrating an important part of a thin-film magnetic head according to another variation of the first embodiment of the invention, taken along the line perpendicular to, and parallel to, the track surface (air bearing surface), respectively.

While the write gap layer 22 and the non-magnetic layer 22d are first formed on the flat insulating layer 30 and then the first non-magnetic body 31 is formed on the non-magnetic layer 22d as shown in FIG. 1A in the thin-film magnetic head and the method of manufacturing the same of the above embodiment, the present invention is not limited thereto. For example, as shown in FIG. 13A, the first non-magnetic body 31 may first be formed on the flat insulating layer 30, followed by formation of the non-magnetic layer 22d covering the surface of the first non-magnetic body and formation of the write gap layer 22 at the same time. In such a case as well, the same effects as those of the head shown in FIG. 1A and FIG. 1B can be obtained.

Figure 14:
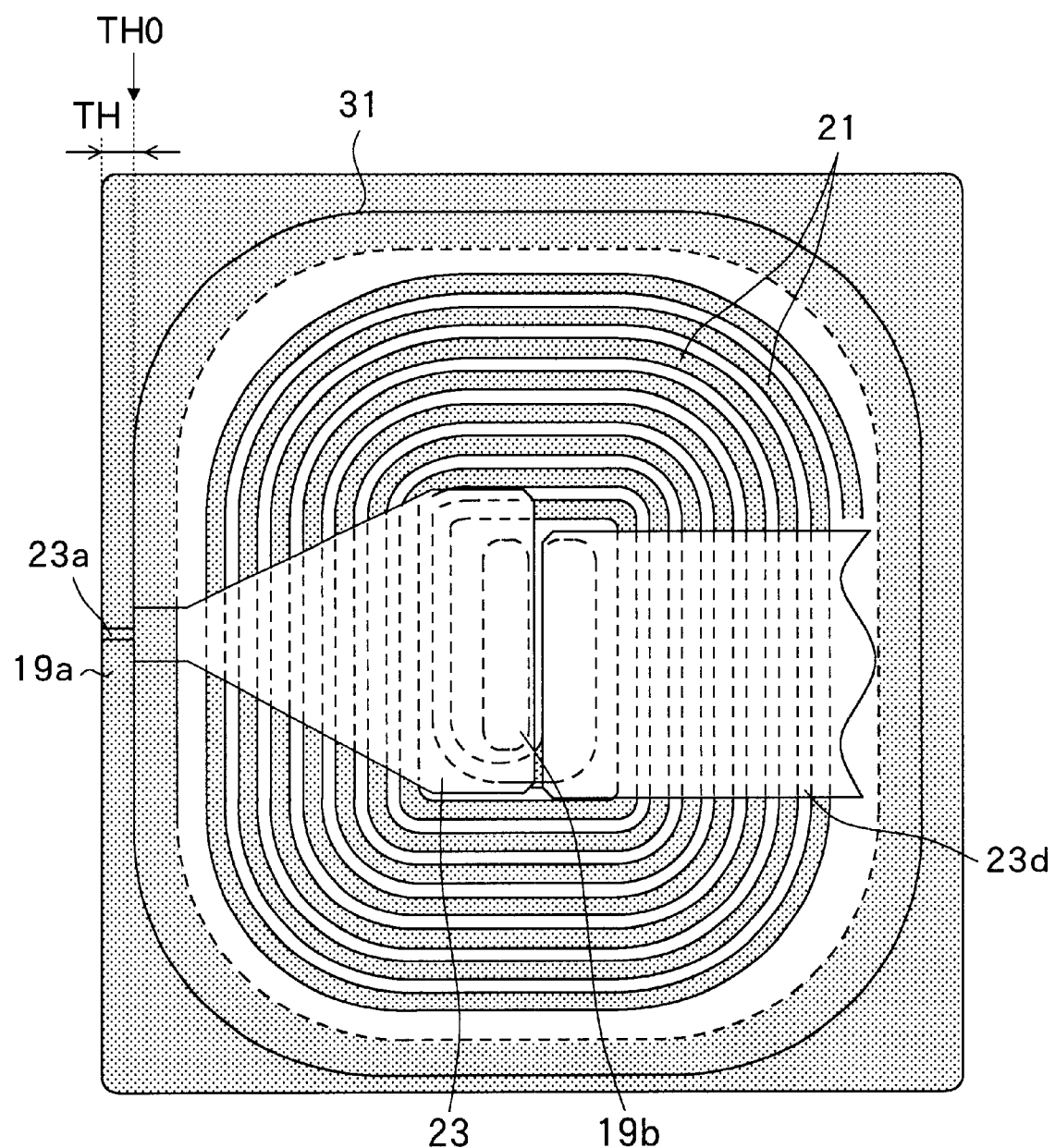
FIG. 14 is a plan view illustrating a recording head portion of a thin-film magnetic head according to still another variation of the first embodiment of the present invention.

The planar shape of the bottom pole tip portion 19a is not limited to that shown in FIG. 2, and may be expanded as desired in the peripheral region of the area where the thin-film coil 21 is disposed as, for example, shown in FIG. 14. In such a case as well, the same effects as those of the head shown in FIG. 1A and FIG. 1B can be obtained.

[Second Embodiment]

Figures 15A, 15B:
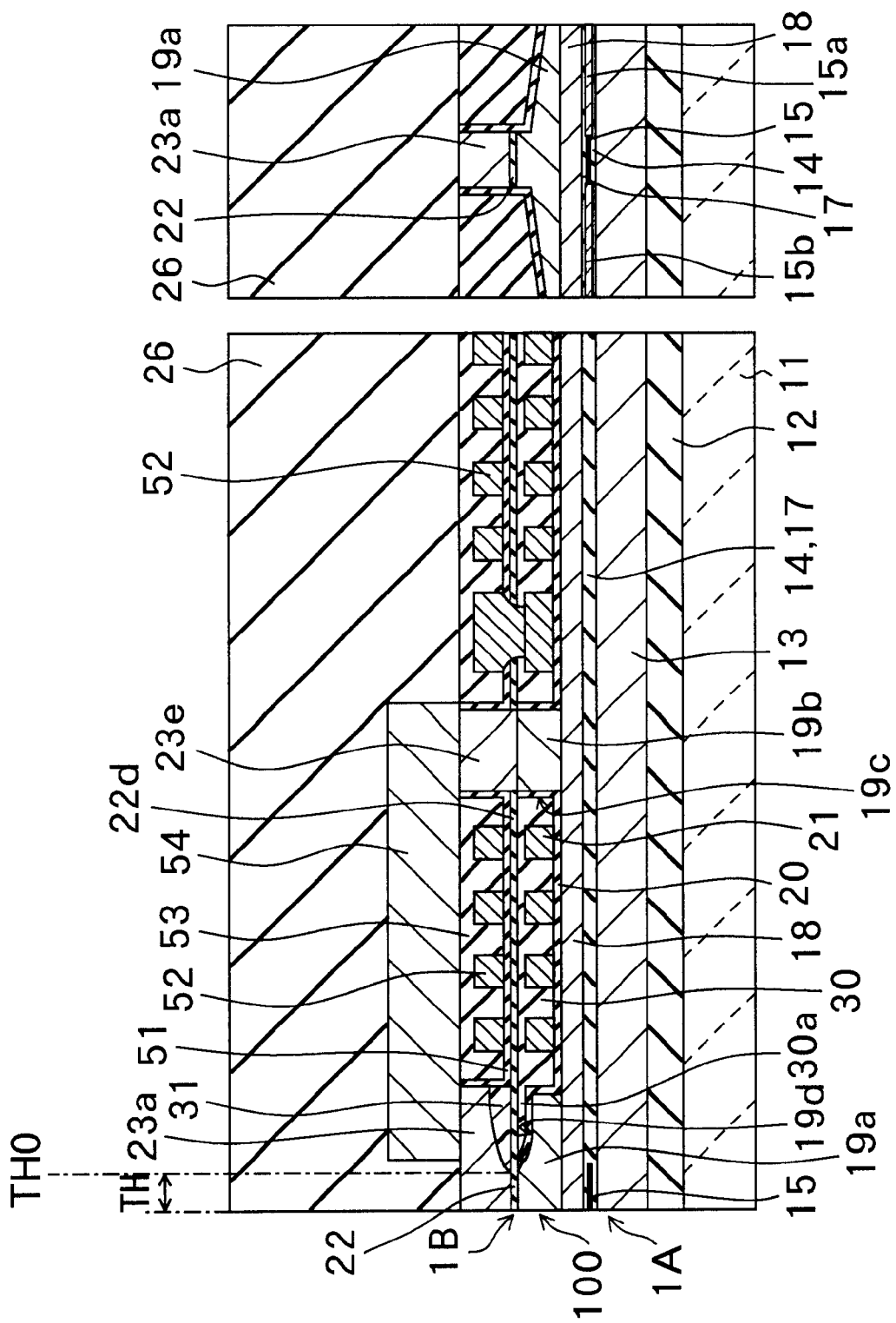
FIG. 15A and FIG. 15B are cross sectional views illustrating an important part of a thin-film magnetic head of a second embodiment of the present invention, taken along the line XVA—XVA and the line XVB—XVB in FIG. 16, respectively.
Figure 16:
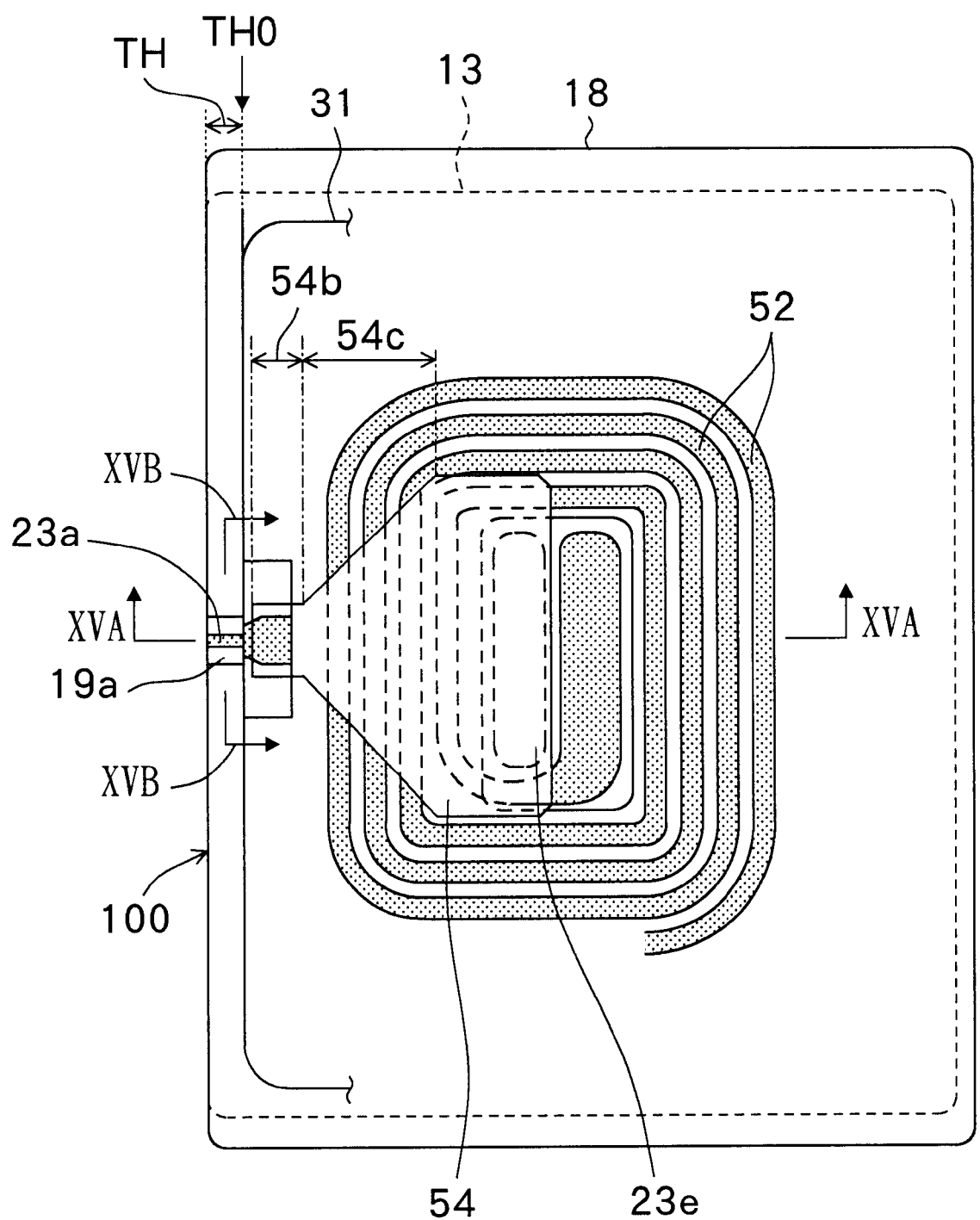
FIG. 16 is a plan view illustrating a recording head portion of the thin-film magnetic head of the second embodiment of the invention.

A second embodiment of the invention relates to an example where the thin-film coils provided in plural layers and the top pole tip portion 23a and the top pole 23 are formed of separate magnetic layers in the thin-film magnetic head of the first embodiment of the invention. FIG. 15A and FIG. 15B are cross sectional views illustrating an important part of a thin-film magnetic head according to the second embodiment of the invention, and FIG. 16 is a plan view illustrating the recording head portion of the thin-film magnetic head according to the second embodiment of the invention. More specifically, FIG. 15A is a cross sectional view of the important part of the head taken along the line XVA—XVA in FIG. 16 perpendicular to the track surface (air bearing surface) 100, while FIG. 15B is a cross sectional view of the important part of the head taken along the line XVB—XVB in FIG. 16 parallel to the track surface (air bearing surface) 100.

As shown in FIG. 15A, FIG. 15B, and FIG. 16, in the thin-film magnetic head of the second embodiment of the invention, the recording head portion 1B includes a bottom magnetic layer having a bottom pole 18 and a bottom pole tip portion 19a magnetically coupled to each other, a top magnetic layer having a top pole 54 and a top pole tip portion 23a magnetically coupled to each other, and dual layers of a thin-film coil 21 and a thin-film coil 52 for generating magnetic flux. Parts of the bottom pole tip portion 19a and the top pole tip portion 23a located adjacent to a write gap layer 22 face each other with the write gap layer 22 in between. In part of the top pole tip portion 23a, a first non-magnetic body 31 is formed adjacent to a non-magnetic layer 22d. In part of the bottom pole tip portion 19a, a second non-magnetic body 30a is formed adjacent to the non-magnetic layer 22d and facing the first non-magnetic body 31 with the non-magnetic layer 22d in between. The bottom pole 18, the bottom pole tip portion 19a, the thin-film coil 21 as a first layer of coils, the write gap layer 22, and the non-magnetic layer 22d have the same structure as those in the thin-film magnetic head of the first embodiment of the invention, and therefore description thereof will not be repeated.

As shown in FIG. 15A, FIG. 15B, and FIG. 16, the top pole tip portion 23a is disposed only on the side of an unillustrated magnetic recording medium, and part of the top pole 54 on the track surface (air bearing surface) 100 side is disposed to be magnetically connected to the top pole tip portion 23a. Part of the top pole 54 on the side far from the track surface (air bearing surface) 100 side is magnetically connected to the bottom pole 18 through magnetic connection portions 23e and 19b. In other words, the top pole tip portion 23a and the top pole 54 are formed of different magnetic layers. The top pole tip portion 23a and the magnetic connection portion 23e are formed of the same magnetic layer. As shown in FIG. 16, an overwrite improvement portion 54b and a magnetic flux convergence portion 54c are disposed at the top pole 54 in this order from the track surface (air bearing surface) 100 to the other end of the top pole 54.

The thin-film coil 52 as a second layer of coils is disposed on an insulating layer 51 located on the non-magnetic layer 22d between the top pole tip portion 23a and the magnetic connection portion 23e, and on the right side of the magnetic connection portion 23e when viewed as FIG. 15A and FIG. 16. As shown in FIG. 16, the thin-film coil 52 has the same planar shape as the first thin-film coil 21, and is formed as a spiral shape winding around the magnetic connection portion 23e a plurality of times with the magnetic connection portion 23e as the center. The thin-film coil 52 is buried in an insulating layer 53 having a surface planarized to level with the upper surfaces of the top pole tip portion 23a and the magnetic connection portion 23e. By thus burying the thin-film coil 52 in the concave portion formed between the top pole tip portion 23a and the magnetic connection portion 23e, the surface of the underlayer the top pole 54 can be planarized.

As shown in FIG. 15A and FIG. 16, in the second embodiment of the invention, the first non-magnetic body 31 is disposed on the top pole 54 side of the write gap layer 22 located between the bottom pole tip portion 19a and the top pole tip portion 23a. The first non-magnetic body 31 is disposed only in part of the top pole tip portion 23a, and formed as a layer underlying the top pole tip portion 23a. The first non-magnetic body has a wedge-shaped cross section with the tip facing the track surface (air bearing surface) 100. The first non-magnetic body 31 also serves to magnetically separate the bottom pole tip portion 19a and the top pole tip portion 23a from each other. The first non-magnetic body 31 has a gentle slope with its thickness gradually increasing from the throat height zero (TH0) position toward the thin-film coils 21 and 52, and the apex angle (angle θ) can be reduced to the value as small as being in the range of 15 degrees to 30 degrees. Similarly to the thin-film magnetic head of the first embodiment of the invention, one end of the first non-magnetic body 31 located on the magnetic recording medium side determines the throat height zero (TH0) position in the second embodiment of the invention as well. Preferably, the gentle slope of the first non-magnetic body 31 is disposed under the top pole tip portion 23a at least in a region overlapping the overwrite improvement portion 54b. The first non-magnetic body 31 may be practically formed of any of a photoresist film, an organic spin-on-glass film, and an inorganic spin-on-glass film.

The second non-magnetic body 30a is disposed on the bottom pole 18 side of the write gap layer 22 provided between the bottom pole tip portion 19a and the top pole tip portion 23a. The second non-magnetic body 30a is disposed filling in the concave portion 19d formed on the surface of the bottom pole tip portion 19b from the throat height zero (TH0) position or the vicinity thereof toward the thin-film coils 21 and 52. The concave portion 19d has a depth shallower than the concave portion 19c for disposing the thin-film coil 21 therein. More specifically, the concave portion 19d is provided with the depth at least sufficient to prevent leakage of magnetic flux between the bottom pole 18 and the top pole 54 in the vicinity of the throat height zero (TH0) position. While leakage of magnetic flux between the bottom pole tip portion 19a and the top pole tip portion 23a in the vicinity of the throat height zero (TH0) position is prevented by stacked layers of the second non-magnetic body 30a and the insulating layer 20 formed along the surface of the concave portion 19d in the second embodiment of the invention, basically it can be prevented only by the second non-magnetic body 30a.

The second non-magnetic body 30a is formed integrally with, and as the same layer as, the insulating layer 30 for burying the thin-film coil 21 in the concave portion 19c. In the second embodiment of the invention, a film of, alumina is used for forming the second non-magnetic body 30a (and the insulating layer 30), and the surface of the film is planarized. The second non-magnetic body 30a can be practically formed of either a silicon oxide film or a silicon nitride film, other than the photoresist film, the organic spin-on-glass film, and the inorganic spin-on-glass film, having a gentle slope similarly to the first non-magnetic body 31. The insulating layer 20 formed on the surface of the concave portion 19d of the bottom pole tip portion 19a, the surface of the bottom pole 18, and the like, may be practically formed of, for example, an alumina film.

A method of manufacturing a thin-film magnetic head of the second embodiment of the invention will next be described. FIG. 17A to FIG. 22B are cross sectional views illustrating the steps of manufacturing the thin-film magnetic head for describing the manufacturing method. FIG. 17A, FIG. 18A, FIG. 19A, FIG. 20A, FIG. 21A, and FIG. 22A are cross sectional views of the head at the manufacturing steps taken along the line XVA—XVA in FIG. 16, while FIG. 17B, FIG. 18B, FIG. 19B, FIG. 20B, FIG. 21B, and FIG. 22B are cross sectional views of the head at the manufacturing steps taken along the line XVB—XVB in FIG. 16.

First, as shown in FIG. 17A and FIG. 17B, the substrate 11 of, for example, Altic is prepared, and on this substrate 11 the insulating layer 12 of alumina having a thickness of about 3 μm to 5 μm is formed through, for example, sputtering. Using a photoresist mask formed on the insulating layer 12, a film of permalloy of about 3 μm in thickness is selectively formed by plating. The photoresist mask is then removed, and the bottom shield layer 13 for the reproducing head is formed as shown in FIG. 17A and FIG. 17B. Though unillustrated, an alumina film of about 4 μm to 6 μm in thickness is formed by, for example, sputtering or CVD, and the surface of this alumina film is planarized by CMP until the surface becomes level with the surface of the bottom shield layer 13. As a result, the alumina film is embedded around the bottom shield layer 13.

As shown in FIG. 18A and FIG. 18B, a film of, for example, alumina is deposited in thickness of 100 nm to 200 nm on the bottom shield layer 13 through sputtering, to thereby form the shield gap layer 14. The MR film 15 constituting the MR element and the like for reproduction is formed in thickness of tens of nanometers on the shield gap layer 14, and then the MR film 15 is patterned to a desired shape through high precision photolithography. The lead terminal layers 15a and 15b for the MR film 15 are formed by, for example, a lift-off method. The shield gap layer 17 is formed over the entire surface of the substrate including the surfaces of the shield gap layer 14, the MR film 15, and the lead terminal layers 15a and 15b, whereby the MR film 15, and the lead terminal layers 16a and 15b are buried between the shield gap layers 14 and 17. The bottom pole 18 of about 1.0 μm to 2.0 μm in thickness is formed of, for example, permalloy on the shield gap layer 17 as shown in FIG. 18A and FIG. 18B. The bottom pole 18 also serves as a top shield layer for the reproducing head portion 1A, and formation of the bottom pole 18 virtually completes the reproducing head portion 1A. Though unillustrated, an alumina film (indicated by no reference numeral) is formed by, for example, sputtering or CVD, and the surface of the alumina film is planarized by CMP so as to level with that of the bottom pole 18. Consequently, the alumina film is embedded around the bottom pole 18.

As shown in FIG. 19A and FIG. 19B, the bottom pole tip portion 19a and the magnetic connection portion 19b are formed in thickness of about 1.5 $\mu$m to 2.0 $\mu$m on the bottom pole 18. The bottom pole tip portion 19a and the bottom connection portion 19b may be formed of plated films of permalloy or the like, as described above, or formed of FeN, FeZrNP, CoFeN, or the like, by sputtering and patterned to a predetermined shape through ion milling or the like.

As shown in FIG. 19A, the concave portion 19d is formed on the surface of the bottom pole tip portion 19a from the throat height zero (TH0) position toward the magnetic connection portion 19b for the sake of forming the second non-magnetic body 30a. The concave portion 19d can be formed by ion milling under an RIE method using an unillustrated mask formed through photolithography. The concave portion 19d is formed of, for example, about 0.3 $\mu$m to 1.0 $\mu$m in depth sufficient for preventing magnetic leakage. The concave portion 19d preferably has an inner wall formed as a slope resulting from a slightly large amount of side etching to achieve flux control. As shown in FIG. 19A, the insulating layer 20 of about 0.3 $\mu$i m to 0.5 $\mu$m in thickness is formed of an insulating material, such as alumina, by sputtering or CVD over the entire surface. The insulating layer 20 can be formed along the surface of the concave portion 19d of the bottom pole tip portion 19a.

As shown in FIG. 20A, the thin-film coil 21 for generating magnetic flux is formed of, for example, copper (Cu) by, for example, electrolytic plating on the insulating layer 20 provided in the concave portion 19c between the bottom pole tip portion 19a and the magnetic connection portion 19b, and on the insulating layer 20 located at the outer peripheral portion on the right side of the magnetic connection portion 19b when viewed as FIG. 19A. The thin-film coil 21 has a thickness of, for example, 1.0 $\mu$m to 2.0 $\mu$m, and a coil pitch of 1.2 $\mu$m to 2.0 $\mu$m.

As shown in FIG. 20A, the insulating layer 30 having a thickness of 3.0 $\mu$m to 4.0 $\mu$m is formed of an insulating material, such as alumina, over the entire surface of the substrate including the thin-film coil 21 by sputtering. By the same step as the step of forming this insulating layer 30, the second non-magnetic body 30a can be formed filling in the concave portion 19d of the bottom pole tip portion 19a. As shown in FIG. 20A, the surfaces of the insulating layer 30 and the second non-magnetic body 30a are planarized by, for example, CMP until the surfaces of the bottom pole tip portion 19a and the magnetic connection portion 19b are exposed. It should be noted that, in the thin-film magnetic head of the second embodiment of the invention, a spin-on-glass film may be first applied on the thin-film coil 21 as a gap filling material and then the insulating layer 30 of an alumina film and the second non-magnetic body 30a may be formed by the same step, followed by planarization of the surfaces of the insulating layer 30 and the second non-magnetic body 30a by CMP.

As shown in FIG. 21A and FIG. 21B, the write gap layer 22 is formed on the bottom pole tip portion 19a, and the non-magnetic layer 22d is formed over the rest of the surface. The write gap layer 22 and the non-magnetic layer 22d are formed of, for example, alumina as the same layer by CVD in thickness of 0.15 $\mu$m to 0.25 $\mu$m. The write gap layer 22 and the non-magnetic layer 22d produced by the CVD method are so dense that generation of pin holes can be decreased, to thereby further prevent magnetic leakage. As the material of the write gap layer 22 and the non-magnetic layer 22d, non-magnetic materials, such as aluminum nitride, silicon oxide type, silicon nitride type, tantalum, titanium-tungsten, and titanium nitride, may be practically used other than alumina. The films may not be necessarily formed by CVD, and may be formed by, for example, sputtering. The portion of the non-magnetic layer 22d located on the magnetic connection portion 19b is then patterned, to thereby form the opening 22a for magnetically connecting the magnetic connection portion 19b and the magnetic connection portion 23e to be formed on the magnetic connection portion 19b in a later step.

As shown in FIG. 21A, the first non-magnetic body 31 is formed on the non-magnetic layer 22d. In the second embodiment of the invention, the first non-magnetic body 31 can be formed by a rotational application of a photoresist film, followed by light exposure, development, patterning to a predetermined shape, and reflow at a temperature in the range of 200° C. to 300° C., similarly to the first embodiment of the invention. As the photoresist film is subjected to the reflow process, the first non-magnetic body 31 can be provided with the central portion having a planarized surface and the peripheral portion having a gentle slope with a gradually changed height. More specifically, the first non-magnetic body 31 has a gentle slope at least from the throat height zero (TH0) position toward the thin-film coil 21, and the apex angle formed by such a gentle slope can be reduced to the value as small as 15 degrees to 30 degrees. As a material for forming the first non-magnetic body 31, an organic spin-on-glass film or an inorganic spin-on-glass film may be practically used to provide a gentle slope through a reflow.

As shown in FIG. 21A and FIG. 21B, the top pole tip portion 23a is formed on the write gap layer 22 located on the bottom pole tip portion 19a, and on the first non-magnetic body 31, and the magnetic connection portion 23e is formed on the magnetic connection portion 19b through the opening 22a. The top pole tip portion 23a has a planar shape such as that shown in, for example, FIG. 16. As shown in FIG. 16, the top pole tip portion 23a has a portion with the width corresponding to the track width on the track surface (air bearing surface) 100 side. The top pole tip portion 23a and the magnetic connection portion 23e can be practically formed of permalloy (including 80 weight-% Ni and 20 weight-% Fe, or 45 weight-% Ni and 55 weight-% Fe), which is a material with high saturation magnetic flux density, in thickness of, for example, 3.0 $\mu$m by, for example, plating. For the top pole tip portion 23a and the like, a material such as FeN, FeZrNP, CoFeN or the like formed by, for example, sputtering can be practically used, and such a magnetic film can be patterned through, for example, ion milling. Part of the first non-magnetic body 31 is simultaneously removed by this patterning, leaving only the portion of the first non-magnetic body 31 overlapping the top pole tip portion 23a. In other words, the first non-magnetic body 31 is formed only under the top pole tip portion 23a, more specifically, in a region of the top pole tip portion 23a extending from the throat height zero (TH0) position toward the thin-film coil 21. As the top pole tip portion 23a is formed on the gently sloped surface of the first non-magnetic body 31 in the vicinity of the throat height zero (TH0) position, effects of light reflected from the apex angle portion can be reduced, to thereby improve processing accuracy of the photoresist mask for forming the top pole tip portion 23a by photolithography. In other words, at least the processing accuracy (patterning accuracy) of the top pole tip portion 23a can be improved, whereby a track width in the order of submicrons can be achieved.

(10) As shown in FIG. 22B, an ion milling process under an RIE method using a chlorine type gas ($Cl_2$, $CF_4$, $BCl_2$, $SF_6$, or the like) is performed using the portion of the top pole tip portion 23a with the width corresponding to the track width as an etching mask, to thereby partially etch the write gap layer 22 and the bottom pole tip portion 19a located in the vicinity thereof by about 0.3 µm to 0.6 µm in a self-aligned manner and form a trim structure.

(11) As shown in FIG. 22A and FIG. 22B, the insulating layer 51 having a thickness of 0.3 µm to 0.5 µm is formed of an insulating material, such as alumina, over the entire surface by sputtering or CVD. The non-magnetic layer 22d is patterned to form an opening 51c for connecting the thin-film coil 21 and the thin-film coil 52 to be formed in a later step. The thin-film coil 52 for generating magnetic flux is formed of, for example, copper (Cu) by, for example, electrolytic plating on the insulating layer 51 provided in the concave portion 23c between the top pole tip portion 23a and the magnetic connection portion 23e, and on the insulating layer 51 located at the outer peripheral portion on the right side of the magnetic connection portion 23e when viewed as FIG. 22A. Similarly to the thin-film coil 21, the thin-film coil 52 has a thickness of, for example, 1.0 µm to 2.0 µm, and a coil pitch of 1.2 µm to 2.0 µm. The thin-film coil 52 is formed to overlap the thin-film coil 21.

(12) As shown in FIG. 15A and FIG. 15B, the insulating layer 53 having a thickness of 3.0 µm to 4.0 µm is formed of an insulating material, such as alumina, by sputtering over the entire surface. The surface of the insulating layer 53 is then planarized by, for example, CMP to expose the surfaces of the top pole tip portion 23a and the magnetic connection portion 23e. In the thin-film magnetic head of the second embodiment of the invention, a spin-on-glass film may be first applied on the thin-film coil 52 as a gap filling material and then the insulating layer 53 of an alumina film may be formed, followed by planarization of the surface of the insulating layer 53 by CMP.

(13) The top pole 54 magnetically connected to part of the top pole tip portion 23a and the magnetic connection portion 23e is formed on the insulating layer 53. The top pole 54 has a planar shape such as that shown in, for example, FIG. 16. The top pole 54 can be practically formed of permalloy (including 80 weight-% Ni and 20 weight-% Fe, or 45 weight-% Ni and 55 weight-% Fe), which is a material with high saturation magnetic flux density, in thickness of, for example, 2.0 µm to 3.0 µm by, for example, plating. For the top pole 54, a material such as FeN, FeZrNP, CoFeN, or the like formed by sputtering can be practically used, and such a magnetic film can be patterned through, for example, argon ion milling. Formation of the top pole 54 completes the recording head portion 1B.

(14) Finally, as shown in FIG. 15A, FIG. 15B, and FIG. 16 described above, the overcoat layer 26 of about 20 µm to 40 µm in thickness is formed of alumina by, for example, sputtering over the entire surface of the substrate including the top pole 54. Thereafter, a machining process with a slider is performed to form the track surface (air bearing surface) 100 of the reproducing head portion 1A and the recording head portion 1B, to thereby complete the thin-film magnetic head of the second embodiment of the invention.

According to the thin-film magnetic head and the method of manufacturing the same of the second embodiment of the invention described above, the effects similar to those of the thin-film magnetic head and the method of manufacturing the same of the first embodiment of the invention can be obtained, and, because the thin-film coils 21 and 52 are provided as dual layers, the lengths of the bottom pole 18 and the top pole 54 can be reduced, to thereby decrease the overall magnetic path length. As a result, magnetic flux loss in the magnetic path of the thin-film magnetic head can be reduced, so that recording characteristics can be improved, and the magnetic path length in the direction perpendicular to the track surface (air bearing surface) 100 can be reduced, to thereby reduce the overall size of the head.

Figure 23A:
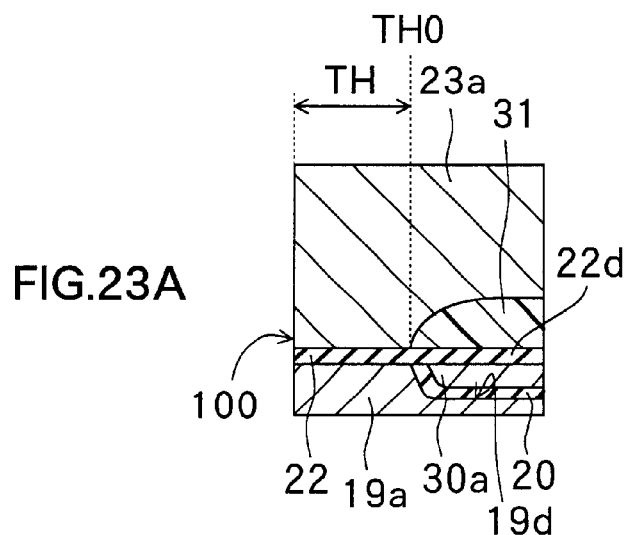
FIG. 23A is an enlarged cross sectional view illustrating an important part of the thin-film magnetic head of the second embodiment of the invention.
Figure 23B:
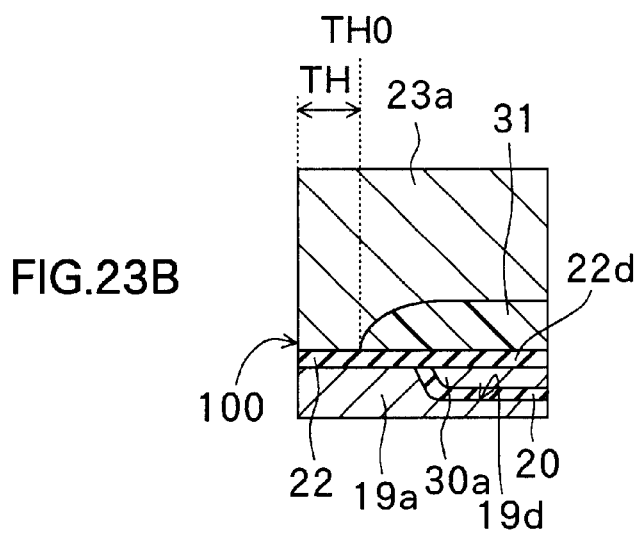
FIG. 23B is an enlarged cross sectional view illustrating an important part of the thin-film magnetic head of a variation of the second embodiment of the invention.
Figure 23C:
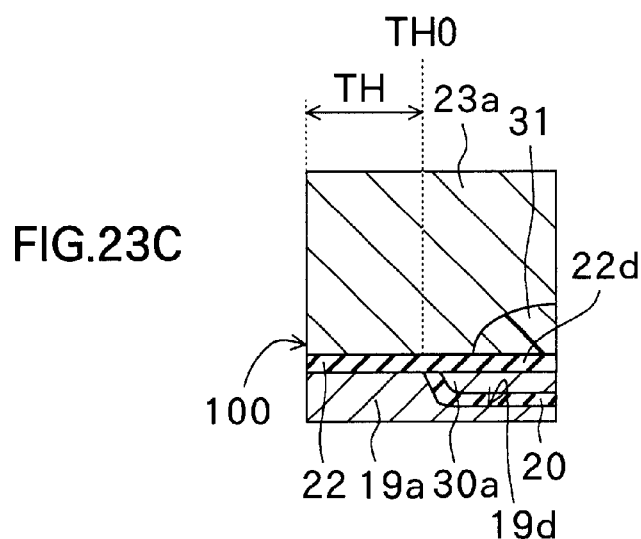
FIG. 23C is an enlarged cross sectional view illustrating an important part of the thin-film magnetic head of another variation of the second embodiment of the invention.

The ends of the first non-magnetic body 31 and the insulating layer 20 located on the track surface (air bearing surface) 100 side may not be in line with each other as shown in FIG. 15A in the above-described second embodiment, and, for example, one of these ends may protrude toward the track surface (air bearing surface) 100 as shown in FIG. 23B and FIG. 23C. FIG. 23A, FIG. 23B, and FIG. 23C are enlarged cross sectional views illustrating an important part of the thin-film magnetic head of this embodiment, expressing the positional relationship between the first non-magnetic body 31 and the insulating layer 20. FIG. 23A shows the case where the ends of the first non-magnetic body 31 and the insulating layer 20 are in line with each other, FIG. 23B shows the case where the end of the first non-magnetic body 31 protrudes, and FIG. 23C shows the case where the end of the insulating layer 20 protrudes. In FIG. 23A, both ends of the first non-magnetic body 31 and the insulating layer 20 determine the throat height zero (TH0) position. On the other hand, in FIG. 23B, the throat height zero (TH0) position is always determined by the end of the first non-magnetic body 31 even if misalignment occurs during manufacture, and therefore variation in position of the throat height zero (TH0) position can be decreased. The same applies to the case shown in FIG. 23C where the throat height zero (TH0) position is determined by the end of the insulating layer 20. The amount of protrusion of the end of either the first non-magnetic body 31 or the insulating layer 20 in the above cases is preferably set in the range of, for example, 0.1 µm to 0.5 µm with respect to the other end. The structures shown in FIG. 23B and FIG. 23C also provide the effects similar to the structure shown in FIG. 23A.

[Third Embodiment]

Figures 24A, 24B:
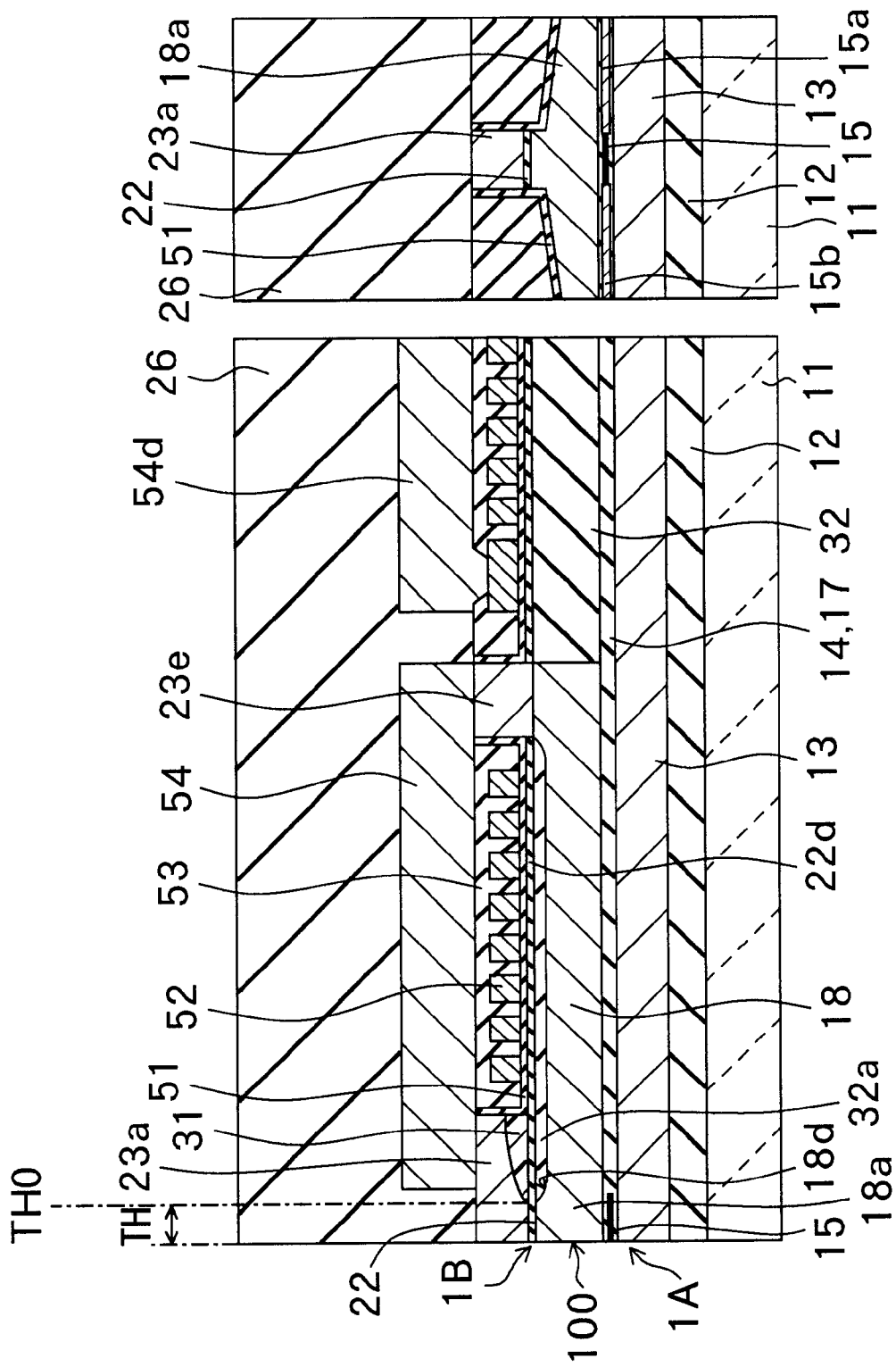
FIG. 24A and FIG. 24B are cross sectional views illustrating an important part of a thin-film magnetic head of a third embodiment of the present invention, taken along the line perpendicular to, and parallel to, a track surface (air bearing surface), respectively.

A third embodiment of the invention relates to an example where the thin-film coil is formed as a single layer and the bottom pole tip portion 19a and the bottom pole 18 are formed of the same magnetic layer in the thin-film magnetic head of the second embodiment of the invention. FIG. 24A and FIG. 24B are cross sectional views illustrating an important part of the thin-film magnetic head according to the third embodiment of the invention. More specifically, FIG. 24A is a cross sectional view of the important part of the head taken along the line perpendicular to the track surface (air bearing surface) 100, while FIG. 24B is a cross sectional view of the important part of the head taken along the line parallel to the track surface (air bearing surface) 100.

As shown in FIG. 24A and FIG. 24B, in the thin-film magnetic head of the third embodiment of the invention, the recording head portion 1B includes a bottom magnetic layer having a bottom pole 18 and a bottom pole tip portion 18a magnetically coupled to each other, a top magnetic layer having a top pole 54 and a top pole tip portion 23a magnetically coupled to each other, and a thin-film coil 52 formed as a single layer for generating magnetic flux. Part of the top pole tip portion 23a located adjacent to a write gap layer 22 and the bottom pole tip portion 18a face each other with the write gap layer 22 in between. In part of the top pole tip portion 23a, a first non-magnetic body 31 is formed adjacent to a non-magnetic layer 22d. In part of the bottom pole 18, a second non-magnetic body 32a is formed adjacent to the non-magnetic layer 22d. The top pole 54, the top pole tip portion 23a, the thin-film coil 52, the write gap layer 22, and the non-magnetic layer 22d of this embodiment have the same structure as those in the thin-film magnetic head of the second embodiment of the invention, and therefore description thereof will not be repeated.

The bottom pole tip portion 18a and the bottom pole 18 are integrally formed of the same magnetic layer. In other words, part of the bottom pole 18 located on the track surface (air bearing surface) 100 side, more precisely part of the region extending from the throat height zero (TH0) position to the track surface (air bearing surface) 100, is used as the bottom pole tip portion 18a. The bottom pole 18 is magnetically connected to the top pole 54 with a magnetic connection portion 23e, formed of the same layer as the top pole tip portion 23a, in between.

The thin-film coil 52 is disposed on an insulating layer 51 on the non-magnetic layer 22d, located between the top pole tip portion 23a and the magnetic connection portion 23e and on the right side of the magnetic connection portion 23e when viewed as FIG. 24A. The thin-film coil 52 is buried in an insulating layer 53 having a surface planarized to level with the upper surfaces of the top pole tip portion 23a and the magnetic connection portion 23e. By thus burying the thin-film coil 52 in the concave portion formed between the top pole tip portion 23a and the magnetic connection portion 23e, the surface of the underlayer of the top pole 54 can be planarized.

As shown in FIG. 24A, in the third embodiment of the invention, the first non-magnetic body 31 is disposed on the top pole 54 side of the write gap layer 22 located between the bottom pole tip portion 18a and the top pole tip portion 23a. The first non-magnetic body 31 is disposed only in part of the top pole tip portion 23a, and formed as a underlayer of the top pole tip portion 23a. The first non-magnetic body has a wedge-shaped cross section at the track surface (air bearing surface) 100 side with the tip facing the track surface (air bearing surface) 100. The first non-magnetic body 31 has a gentle slope with its thickness gradually increasing from the throat height zero (TH0) position toward the thin-film coil 52, and the apex angle can be reduced to the value as small as being in the range of 15 degrees to 30 degrees. One end of the first non-magnetic body 31 located on the track surface (air bearing surface) 100 side determines the throat height zero (TH0) position. The first non-magnetic body 31 can be practically formed of any of a photoresist film, an organic spin-on-glass film, and an inorganic spin-on-glass film.

The second non-magnetic body 32a is disposed on the bottom pole 18 side of the write gap layer 22 located between the bottom pole tip portion 18a and the top pole tip portion 23a. The second non-magnetic body 32a is disposed filling in the concave portion 18d formed on the surface of the bottom pole 18 from the throat height zero (TH0) position or the vicinity thereof toward the thin-film coil 52. The concave portion 18d has a depth at least sufficient to prevent leakage of magnetic flux between the bottom pole 18 and the top pole 23 in the vicinity of the throat height zero (TH0) position. In the third embodiment of the invention, only the second non-magnetic body 32a is disposed between the bottom pole 18 and the non-magnetic body 22d, and leakage of magnetic flux is prevented by this single layer of the second non-magnetic body 32a.

The second non-magnetic body 32a is formed integrally with, and as the same layer as, an insulating layer 32 for embedding the bottom pole 18 and having a planarized surface to level with the surface of the bottom pole 18 in the third embodiment of the invention. The second non-magnetic body 32a and the insulating layer 32 are formed of, for example, an alumina film, having a surface planarized by CMP. The second non-magnetic body 32a can be practically formed of either a silicon oxide film or a silicon nitride film, other than a photoresist film, an organic spin-on-glass film, and an inorganic spin-on-glass film, having a gentle slope similarly to the first non-magnetic body 31.

A method of manufacturing a thin-film magnetic head of the third embodiment of the invention will next be described. FIGS. 25A and 25B to FIGS. 29A and 29B are cross sectional views illustrating the steps of manufacturing the thin-film magnetic head for describing the manufacturing method. FIG. 25A to 29A are cross sectional views of the head at the manufacturing steps taken along the line perpendicular to the track surface (air bearing surface) 100, while FIG. 25B to 29B are cross sectional views of the head at the manufacturing steps taken along the line parallel to the track surface (air bearing surface) 100.

Figures 25A, 25B:
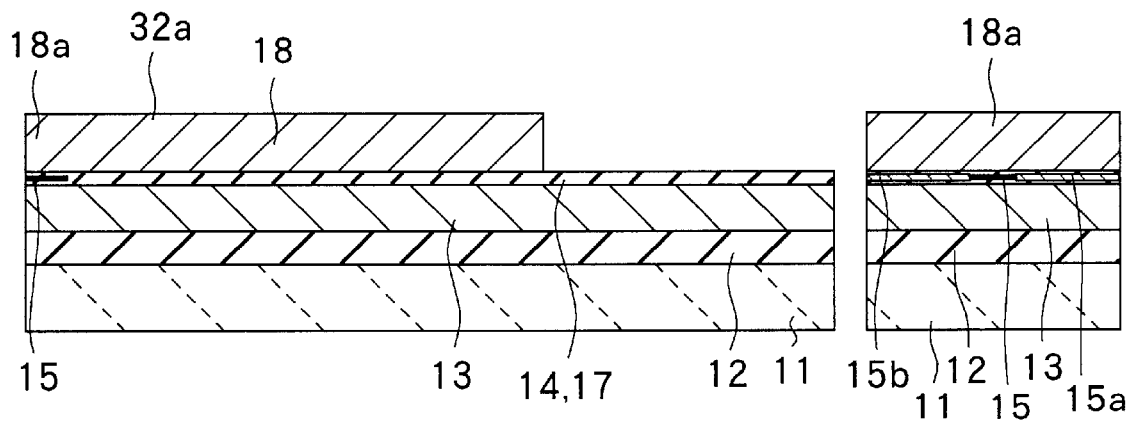
FIG. 25A and FIG. 25B are cross sectional views illustrating a manufacturing step of the thin-film magnetic head for use in description of a manufacturing method of the third embodiment of the present invention, taken along the line perpendicular to, and parallel to, a track surface (air bearing surface), respectively.

In FIG. 25A and FIG. 25B, the steps up to the step of forming the shield gap layer 17 are the same as the corresponding steps of the above-described second embodiment shown in FIG. 18A and FIG. 18B, and therefore description thereof will not be repeated. According to the method of manufacturing a thin-film magnetic head of this embodiment, after the shield gap layer 17 is formed, the bottom pole 18 having a thickness of about 2.0 μm to 4.0 μm is formed of, for example, permalloy on the shield gap layer 17 by plating, as shown in FIG. 25A. As described in connection with the thin-film magnetic head of the first embodiment of the invention, the bottom pole 18 can be practically formed of a magnetic material, such as FeN, FeZrNP, or the like, and such a magnetic material can be formed by sputtering. The bottom pole 18 also serves as a top shield layer for the reproducing head portion 1A, and formation of the bottom pole 18 as the top shield layer virtually completes the reproducing head portion 1A.

Figures 26A, 26B:
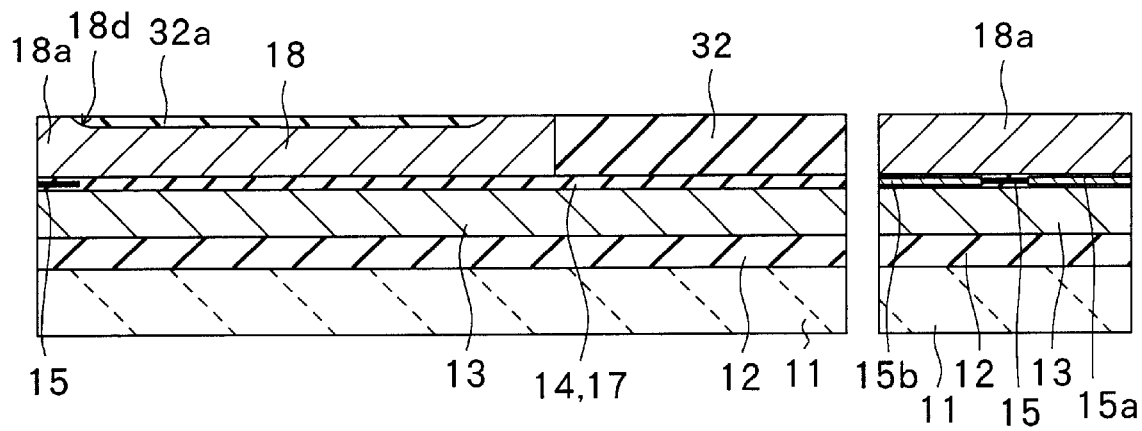
FIG. 26A and FIG. 26B are cross sectional views illustrating a step of manufacturing the thin-film magnetic head following the step shown in FIG. 25A and FIG. 25B FIG. 27A and FIG. 27B are cross sectional views illustrating a step of manufacturing the thin-film magnetic head following the step shown in FIG. 26A and FIG. 26B.

As shown in FIG. 26A, the concave portion 18d is formed for providing the second non-magnetic body 32a on the surface of the bottom pole 18. The concave portion 18d is not formed either at the bottom pole tip portion 18a of the bottom pole 18 located on the track surface (air bearing surface) 100 side or at the connection portion (no reference numerals indicated) located on the other side and connecting to the top pole 54 to be formed in a later step. The concave portion 18d is formed by, for example, ion milling, and has a depth of, for example, about 0.5 μm to 1.5 μm. The inner wall of the concave portion 18d is preferably formed as a slope, so as to achieve flux control. The insulating layer 32 having a thickness of 0.5 μm to 1.5 μm is formed of alumina by, for example, sputtering or CVD. This insulating layer 32 is also formed in the concave portion 18d. The surface of the insulating layer 32 is then planarized by CMP to level with the surface of the bottom pole tip portion 18a. Consequently, as shown in FIG. 26A, the insulating layer 32 is embedded around the bottom pole 18, and the second non-magnetic body 32a is formed in the concave portion 18d on the surface of the bottom pole 18. Thus, the second non-magnetic body 32a can be formed by the same step as the insulating layer 32. Due to slight overpolishing by CMP, the depth of the concave portion 18d, i.e. the thickness of the second non-magnetic body 32a, reaches about 0.3 μm to 1.0 μm in the end.

Figures 27A, 27B:
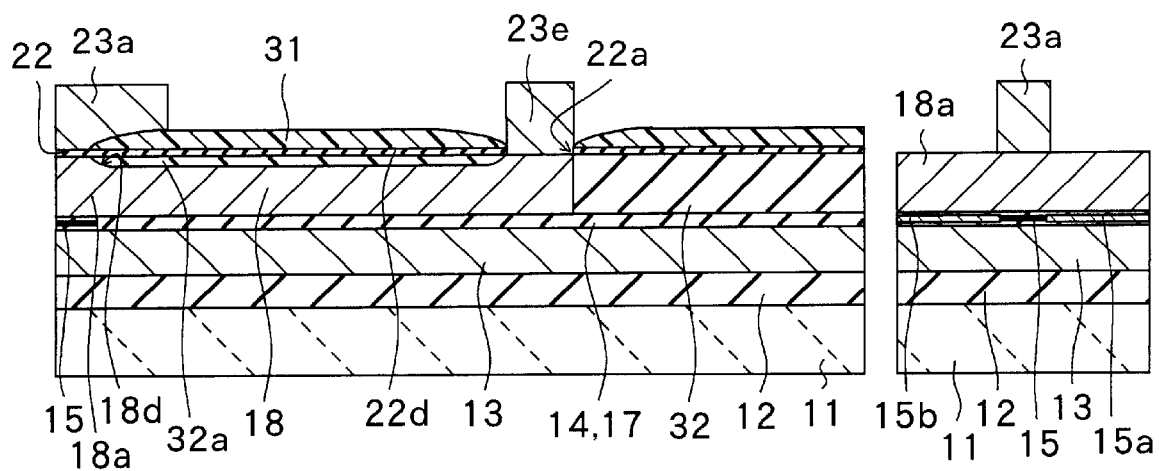

As shown in FIG. 27A, the write gap layer 22 is formed on the bottom pole tip portion 19a, and the non-magnetic layer 22d is formed over the rest of the surface. The write gap layer 22 and the non-magnetic layer 22d are formed of, for example, alumina as the same layer by CVD in thickness of 0.15 μm to 0.3 μm. The write gap layer 22 and the non-magnetic layer 22d produced by the CVD method are so dense that generation of pin holes can be decreased, to thereby further prevent magnetic leakage. As the material of the write gap layer 22 and the non-magnetic layer 22d, non-magnetic materials, such as aluminum nitride (AlN), silicon oxide ($SiO_2$) type, silicon nitride ($Si_3N_4$) type, tantalum (Ta), titanium-tungsten (TiW), and titanium nitride (TiN), may be practically used, other than alumina. The films may not be necessarily formed by CVD, and may be formed by, for example, sputtering. The portion of the non-magnetic layer 22d located in a region where the magnetic connection portion 23e will be formed in a later step is then patterned, to thereby form the opening 22a for magnetically connecting the bottom pole 18 and the magnetic connection portion 23e.

As shown in FIG. 27A, the first non-magnetic body 31 is formed on the non-magnetic layer 22d. In the third embodiment of the invention, the first non-magnetic body 31 can be formed by, for example, a rotational application of a photoresist film, followed by light exposure, development, patterning to a predetermined shape, and baking at a temperature in the range of 100° C. to 150° C. As the photoresist film is subjected to the baking process, the first non-magnetic body 31 can be provided with the central portion having a planarized surface and the peripheral portion having a gentle slope with a gradually changed height. More specifically, the first non-magnetic body 31 has a gentle slope at least from the throat height zero (TH0) position toward the thin-film coil 52, and the apex angle formed by such a gentle slope can be reduced to the value as small as 15 degrees to 30 degrees. Further, in the third embodiment of the invention, the throat height zero (TH0) position is effectively determined by respective one ends of the first non-magnetic body 31 and the above-described second non-magnetic body 32a located on the track surface (air bearing surface) 100 side. As a material for forming the first non-magnetic body 31, an organic spin-on-glass film or an inorganic spin-on-glass film may be used to provide a gentle slope.

The top pole tip portion 23a is formed covering the surface of the part of the first non-magnetic body 31 located on the track surface (air bearing surface) 100 side, and the magnetic connection portion 23e is formed in the opening 22a. The top pole tip portion 23a and the magnetic connection portion 23e can be practically formed of a permalloy film with high saturation magnetic flux density having a thickness of, for example, 2.0 μm to 4.0 μm by plating. For the top pole tip portion 23a and the like, a material such as FeN, FeZrN, FeZrNP, CoFeN, or the like formed by sputtering can be practically used, and such a magnetic film can be patterned through, for example, ion milling. Part of the first non-magnetic body 31 is simultaneously removed by this patterning leaving only the portion of the non-magnetic body 31 overlapping the top pole tip portion 23a. In other words, the first non-magnetic body 31 is formed only under the top pole tip portion 23a, more specifically, in a region of the top pole tip portion 23a extending from the throat height zero (TH0) position toward the thin-film coil 52. As the top pole tip portion 23a is formed on the gently sloped surface of the first non-magnetic body 31 in the vicinity of the throat height zero (TH0) position, effects of light reflected from the apex angle portion can be reduced, to thereby improve processing accuracy of the photoresist mask for forming the top pole tip portion 23a. In other words, at least the processing accuracy (patterning accuracy) of the top pole tip portion 23a can be improved, whereby a track width in the order of submicrons can be achieved.

Figures 28A, 28B:
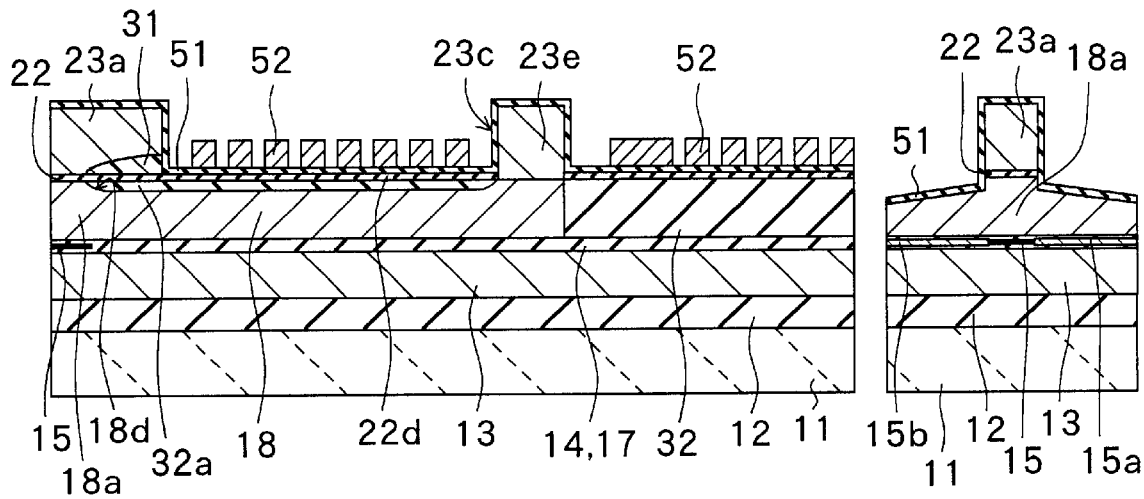
FIG. 28A and FIG. 28B are cross sectional views illustrating a step of manufacturing the thin-film magnetic head following the step shown in FIG. 27A and FIG. 27B.

As shown in FIG. 28B, an ion milling process under an RIE method using a chlorine type gas ($Cl_2$, $CF_4$, $BCl_2$, $SF_6$, or the like) is performed using the portion of the top pole tip portion 23a with the width corresponding to the track width as an etching mask, to thereby partially etch the write gap layer 22 and the bottom pole tip portion 18a located in the vicinity thereof by about 0.3 μm to 0.6 μm in a self-aligned manner and form a trim structure.

As shown in FIG. 28A and FIG. 28B, the insulating layer 51 having a thickness of 0.3 μm to 0.5 μm is formed of an insulating material, such as alumina, over the entire surface by sputtering or CVD. The thin-film coil 52 for generating magnetic flux is formed of, for example, copper by, for example, electrolytic plating on the insulating layer 51 provided in the concave portion 23c between the top pole tip portion 23a and the magnetic connection portion 23e, and on the insulating layer 51 located at the outer peripheral portion on the right side of the magnetic connection portion 23e when viewed as FIG. 28A. The thin-film coil 52 has a thickness of, for example, 1.0 μm to 2.0 μm, and a coil pitch of 1.2 μm to 2.0 μm.

Figures 29A, 29B:
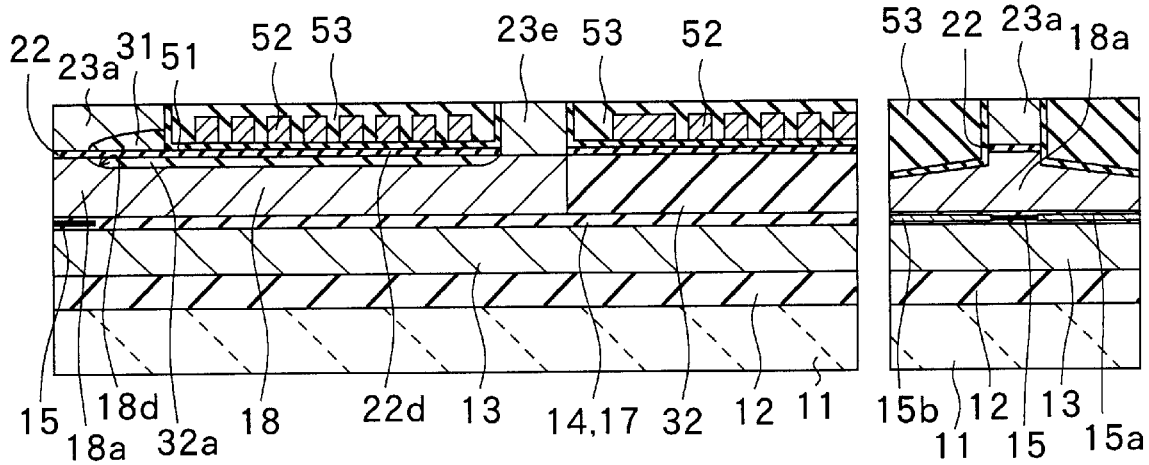
FIG. 29A and FIG. 29B are cross sectional views illustrating a step of manufacturing the thin-film magnetic head following the step shown in FIG. 28A and FIG. 28B.

As shown in FIG. 29A and FIG. 29B, the insulating layer 53 having a thickness of 3.0 μm to 4.0 μm is formed of an insulating material, such as alumina, by sputtering over the entire surface. The surface of the insulating layer 53 is then planarized by, for example, CMP to expose the surfaces of the top pole tip portion 23a and the magnetic connection portion 23e.

As shown in FIG. 24A, the part of the insulating layer 53 located at the portion connecting to the coil connection wiring 54c which will be connected to the thin-film coil 52 in a later step is removed, to thereby form an opening (no reference numeral indicated). In the thin-film magnetic head of the third embodiment of the invention, a spin-on-glass film may first be applied on the thin-film coil 52 as a gap filling material, followed by the formation of the insulating layer 53 of an alumina film and planarization of the surface of the insulating layer 53 by CMP.

As shown in FIG. 24A, the top pole 54 is formed on the insulating layer 53, having a part located in an area close to the track surface (air bearing surface) 100 and magnetically connected to the top pole tip portion 23a, and having another part located on the side far from the track surface (air bearing surface) 100 and magnetically connected to the magnetic connection portion 23e. At the same time, the coil connection wiring 54d is formed. The top pole 54 and the like can be practically formed of permalloy (including 80 weight-% Ni and 20 weight-% Fe), or permalloy (45 weight-% Ni and 55 weight-% Fe), which is a material with high saturation magnetic flux density, in thickness of, for example, 2.0 μm to 3.0 μm by, for example, plating. For the top pole 54 and the like, a material such as FeN, FeZrNP, CoFeN, or the like, formed by sputtering can be practically used, and such a magnetic film can be patterned through, for example, ion milling. Formation of the top pole 54 and the coil connection wiring 54d completes the recording head portion 1B.

Finally, as shown in FIG. 24A and FIG. 24B, the overcoat layer 26 of about 20 μm to 40 μm in thickness is formed of alumina by, for example, sputtering over the entire surface including the top pole 54. Thereafter, a machining process with a slider is performed to form the track surface (air bearing surface) 100 of the reproducing head portion 1A and the recording head portion 1B, to thereby complete the thin-film magnetic head of the third embodiment of the invention.

According to the thin-film magnetic head and the method of manufacturing the same of the third embodiment of the invention described above, the effects similar to those of the thin-film magnetic head and the method of manufacturing the same of the first embodiment of the invention can be obtained, and the top pole tip portion 23a can be formed along the gentle slope of the first non-magnetic body 31 in the vicinity of the throat height zero (TH0) position and can be provided with a gradually changed height, whereby magnetic volume can be efficiently converged. Further, since the second non-magnetic body 32a facing the first non-magnetic body 31 is provided in the vicinity of the throat height zero (TH0) position, the effective thickness of the non-magnetic body can be increased, and therefore magnetic leakage between the bottom pole 18 and the top pole tip portion 23a can be prevented. Especially in patterning the top pole tip portion 23a, the write gap layer 22, and the bottom pole tip portion 18a forming the trim structure, the processing accuracy of the patterning mask for the top pole tip portion 23a can be improved because the layer on the first non-magnetic body 31 can be planarized along the gentle slope thereof, and therefore the processing accuracy of the write gap layer 22 and the bottom pole tip portion 18a formed by using the top pole tip portion 23a as a patterning mask can be improved. As a result, a narrow track width can be realized.

Further, according to the thin-film magnetic head and the method of manufacturing the same of the third embodiment of the invention, the second non-magnetic body 32a is disposed filling in the concave portion 18d provided at the bottom pole 18. Therefore, the thickness of the second non-magnetic body 32a can be absorbed by the concave portion 18d, to thereby obtain a smooth and flat surface of the second non-magnetic body 32a. Especially by forming the second non-magnetic body 32a integrally with the insulating layer 32 for embedding the bottom pole 18, the second non-magnetic body 32a can be formed simultaneously with the insulating layer 32, and the structure of the thin-film magnetic head can be simplified. Further, because the second non-magnetic body 32a and the insulating layer 32 for embedding the bottom pole 18 are formed by the same manufacturing step, the second non-magnetic body 32a can be formed simultaneously with the insulating layer 32, to thereby reduce the number of steps for manufacturing the thin-film magnetic head.

[Fourth Embodiment]

Figure 31:
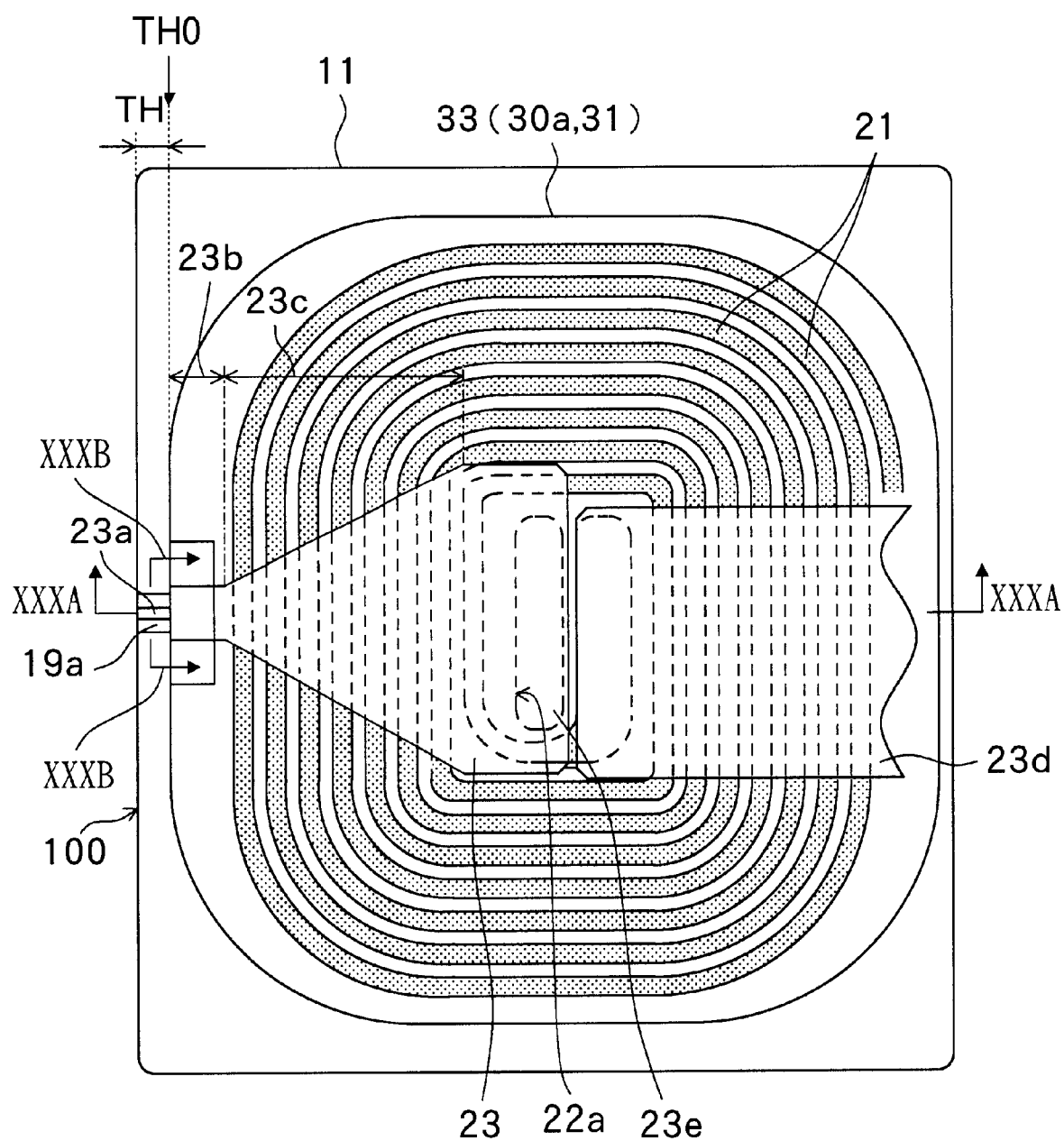
FIG. 31 is a plan view illustrating a recording head portion of the thin-film magnetic head of the fourth embodiment of the invention.

A fourth embodiment of the invention relates to an example where the first non-magnetic body 31 and the second non-magnetic body 30a are integrally formed in the thin-film magnetic head of the first embodiment of the invention. FIG. 30A and FIG. 30B are cross sectional views illustrating an important part of the thin-film magnetic head according to the fourth embodiment of the invention, and FIG. 31 is a plan view illustrating the recording head portion of the thin-film magnetic head according to the fourth embodiment of the invention. More specifically, FIG. 30A is a cross sectional view of the important part of the head taken along the line XXXA—XXXA in FIG. 31 perpendicular to the track surface (air bearing surface) 100, while FIG. 30B is a cross sectional view of the important part of the head taken along the line XXXB—XXXB in FIG. 31 parallel to the track surface (air bearing surface) 100.

As shown in FIG. 30A, FIG. 30B, and FIG. 31, in the thin-film magnetic head of the fourth embodiment of the invention, the recording head portion 1B includes a bottom magnetic layer having a bottom pole 18 and a bottom pole tip portion 19a magnetically coupled to each other, a top magnetic layer having a top pole 23 and a top pole tip portion 23a magnetically coupled to each other, and a thin-film coil 21 formed as a single layer for generating magnetic flux. Part of the bottom pole tip portion 19a located adjacent to a write gap layer 22 and the top pole tip portion 23a face each other with the write gap layer 22 in between. In part of the top pole 23, a first non-magnetic body 31 is formed adjacent to the write gap layer 22. In part of the bottom pole tip portion 19a, a second non-magnetic body 32a is formed. In the thin-film magnetic head of the fourth embodiment of the invention, the first non-magnetic body 31 and the second non-magnetic body 30a are integrally formed of the same non-magnetic material, forming a third non-magnetic body 33.

The first non-magnetic body 31 of the third non-magnetic body 33 is disposed on the top pole 23 side of the write gap layer 22 located between the bottom pole tip portion 19a and the top pole tip portion 23a. The first non-magnetic body 31 is formed as the layer underlying the top pole 23, and serves to magnetically separate the bottom pole 18 and the top pole 23 from each other. The first non-magnetic body has a wedge-shaped cross section on the track surface (air bearing surface) 100 side with the tip facing the track surface (air bearing surface) 100. The first non-magnetic body 31 has a gentle slope with its thickness gradually increasing from the throat height zero (TH0) position toward the thin-film coil 21, and the apex angle (angle θ) can be further reduced from that in the thin-film magnetic head of the first embodiment of the invention to the value as small as 0 degree to 30 degrees. In the thin-film magnetic head of the fourth embodiment of the invention, one end of the first non-magnetic body 31 located on the magnetic recording medium side determines the throat height zero (TH0) position. Preferably, the gentle slope of the first non-magnetic body 31 is disposed at least at an overwrite improvement portion 23b (FIG. 31). The first non-magnetic body 31 can be practically formed of any of a photoresist film, an organic spin-on-glass film, and an inorganic spin-on-glass film.

A non-magnetic layer 22d formed as the same layer as the write gap layer 22 is formed between the first non-magnetic body 31 and the top pole 23, i.e. on the first non-magnetic body 31. As the non-magnetic layer 22d is formed on the first non-magnetic body 31 with a gentle slope in the vicinity of the throat height zero (TH0) position, the surface of the non-magnetic layer 22d can also be formed as a gently sloped surface.

The second non-magnetic body 30a is disposed on the bottom pole 18 side of the write gap layer 22 located between the bottom pole tip portion 19a and the top pole tip portion 23a. Part of the second non-magnetic body 30a located on the track surface (air bearing surface) 100 side has such a depth, from the throat height zero (TH0) position or the vicinity thereof toward the thin-film coil 21, as to be at least sufficient to prevent leakage of magnetic flux between the bottom pole 18 and the top pole 23 in the vicinity of the throat height zero (TH0) position.

As described above, the second non-magnetic body 30a is formed of the same non-magnetic material, such as a photoresist film, as the first non-magnetic body 31, integrally therewith. Therefore, although the second non-magnetic body 30a also determines the throat height zero (TH0) position, no misalignment occurs between the first nonmagnetic body 31 and the second non-magnetic body 30a, so that the throat height zero (TH0) position can be accurately determined. Unlike the first non-magnetic body 31 in the thin-film magnetic head of the first embodiment of the invention, the first non-magnetic body 31 is not formed as an independent non-magnetic layer but as an extended layer of the second non-magnetic body 30a, and therefore the thickness of the first non-magnetic body 31 can be made extremely small. Consequently, the apex angle can be made significantly small.

A method of manufacturing a thin-film magnetic head of the fourth embodiment of the invention will next be described. FIG. 32A to FIG. 36B are cross sectional views illustrating the steps of manufacturing the thin-film magnetic head for describing the manufacturing method. FIG. 32A, FIG. 33A, FIG. 34A, FIG. 35A, and FIG. 36A are cross sectional views of the head at the manufacturing steps taken along the line XXXA—XXXA in FIG. 31, while FIG. 32B, FIG. 33B, FIG. 34B, FIG. 35B, and FIG. 36B are cross sectional views of the head at the manufacturing steps taken along the line XXXB—XXXB in FIG. 31.

Figures 32A, 32B:
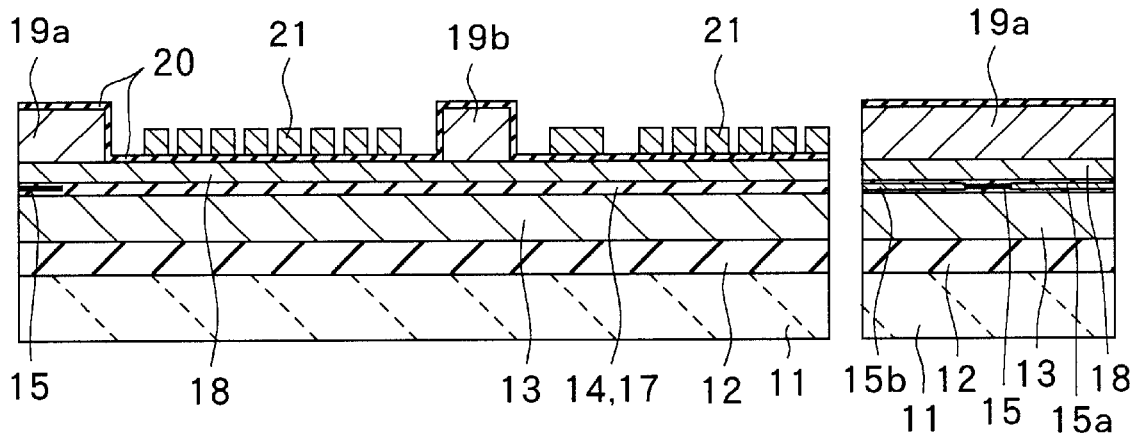
FIG. 32A and FIG. 32B are cross sectional views illustrating a manufacturing step of the thin-film magnetic head for use in description of a manufacturing method of the fourth embodiment of the invention, taken along the line perpendicular to, and parallel to, a track surface (air bearing surface), respectively.

In FIG. 32A and FIG. 32B, the steps up to the step of forming the bottom pole 18 are the same as the corresponding steps of the above-described second embodiment shown in FIG. 18A and FIG. 18B, and therefore description thereof will not be repeated. According to the method of manufacturing a thin-film magnetic head of this embodiment, after the bottom pole 18 is formed, the bottom pole tip portion 19a and the magnetic connection portion 19b are formed in thickness of about 1.5 µm to 2.0 µm on the bottom pole 18, as shown in FIG. 32A and FIG. 32B. The bottom pole tip portion 19a and the magnetic connection portion 19b may be formed of plated films of permalloy or the like, as described above, or formed of FeN, FeZrNP, CoFeN, or the like by sputtering, followed by predetermined patterning through, for example, ion milling. The insulating layer 20 having a thickness of 0.3 µm to 0.5 µm is formed of an insulating material, such as alumina, over the entire surface by sputtering or CVD.

As shown in FIG. 32A, the thin-film coil 21 for generating magnetic flux is formed of copper by, for example, electrolytic plating on the insulating layer 20 provided in the concave portion 19c between the bottom pole tip portion 19a and the magnetic connection portion 19b, and on the insulating layer 20 located at the outer peripheral portion on the right side of the magnetic connection portion 19b when viewed as FIG. 32A. The thin-film coil 21 has a thickness of, for example, 1.0 µm to 2.0 µm, and a coil pitch of 1.2 µm to 2.0 µm.

Figures 33A, 33B:
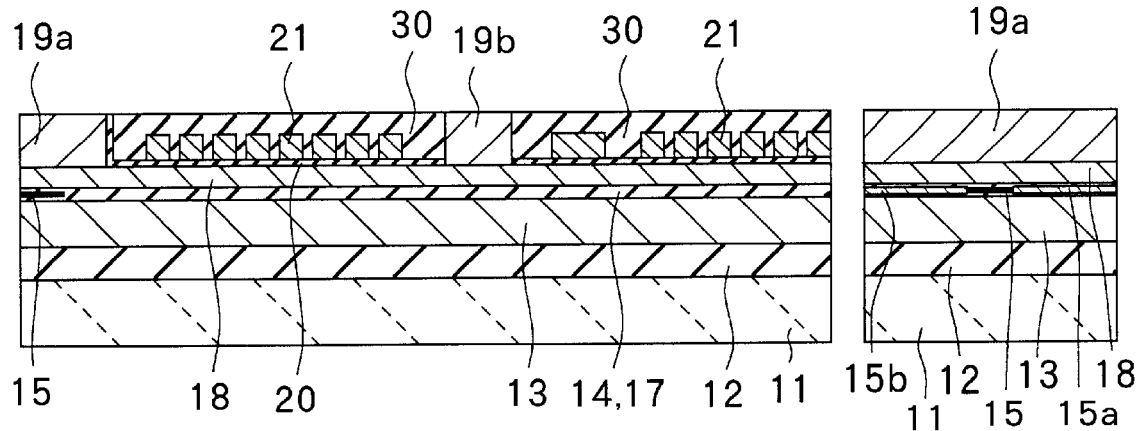
FIG. 33A and FIG. 33B are cross sectional views illustrating a step of manufacturing the thin-film magnetic head following the step shown in FIG. 32A and FIG. 32B FIG. 34A and FIG. 34B are cross sectional views illustrating a step of manufacturing the thin-film magnetic head following the step shown in FIG. 33A and FIG. 33B.

As shown in FIG. 33A, the insulating layer 30 having a thickness of 3.0 µm to 4.0 µm is formed of an insulating material, such as alumina, over the entire surface of the substrate including the thin-film coil 21 by sputtering. The surface of the insulating layer 30 is planarized by, for example, CMP until the surfaces of the bottom pole tip portion 19a and the magnetic connection portion 19b are exposed. A spin-on-glass film may be first applied on the thin-film coil 21 as a gap filling material and then the insulating layer 30 of an alumina film may be formed, followed by planarization of the surface of the insulating layer 30 by CMP.

Figures 34A, 34B:
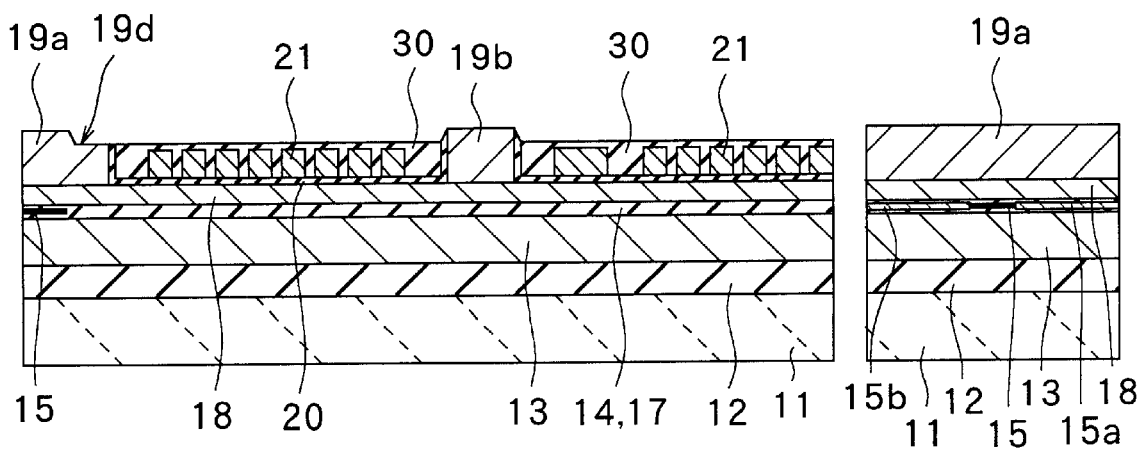

As shown in FIG. 34A, the concave portion 19d is formed on the surfaces of the bottom pole tip portion 19a and the insulating layer 30 from the throat height zero (TH0) position toward the magnetic connection portion 19b for the sake of forming the first non-magnetic body 31 and the second non-magnetic body 30a. The concave portion 19d can be formed by ion milling under an RIE method using an unillustrated mask formed through photolithography. The concave portion 19d is formed in depth of, for example, about 0.3 µm to 1.2 µm, sufficiently preventing magnetic leakage. The concave portion 19d preferably has an inner wall formed as a slope resulting from a slightly large amount of side etching to achieve flux control.

Figures 35A, 35B:
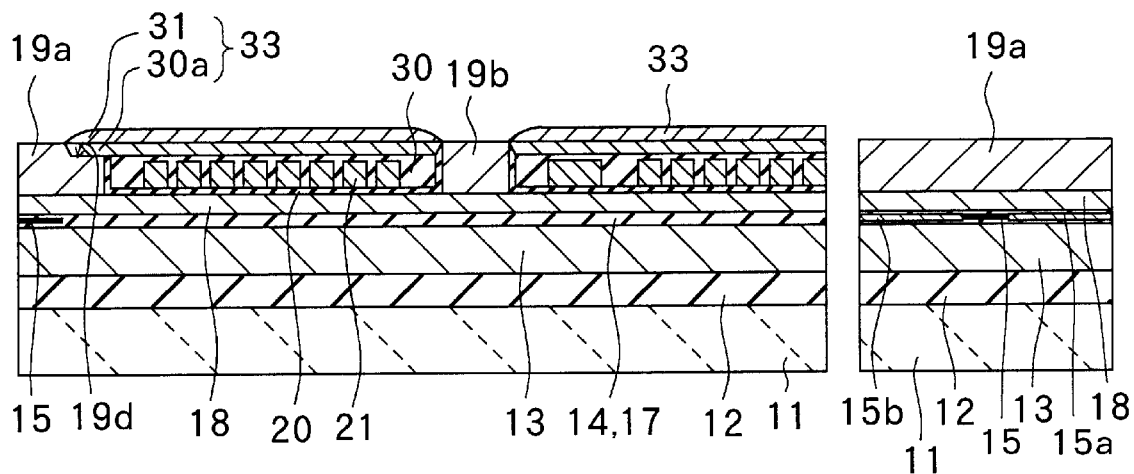
FIG. 35A and FIG. 35B are cross sectional views illustrating a step of manufacturing the thin-film magnetic head following the step shown in FIG. 34A and FIG. 34B.

As shown in FIG. 35A, the second non-magnetic body 30a and the first non-magnetic body 31 are formed filling in the concave portion 19d, to substantially complete the third non-magnetic body 33. In the thin-film magnetic head of the fourth embodiment of the invention, the first non-magnetic body 31 and the second non-magnetic body 30a correspond to the top portion located on the top pole 23 side and the bottom portion on the bottom pole 18 side of a single non-magnetic body, respectively, and are effectively formed as a single non-magnetic body composed of the first non-magnetic body 31 and the second non-magnetic body 30a formed integrally. The third non-magnetic body 33 can be formed by, for example, rotationally applying a photoresist film in thickness of 0.3 µm to 1.5 µm, followed by light exposure, development, patterning to a prescribed shape, and baking at a temperature in the range of 100° C. to 150° C. As the photoresist film is subjected to the baking process, the third non-magnetic body 33 (the first non-magnetic body 31) can be provided with the central portion having a planarized surface and the peripheral portion having a gentle slope with a gradually changed height. More specifically, the third non-magnetic body 33 has a gentle slope at least from the throat height zero (TH0) position toward the thin-film coil 21, and the apex angle formed by such a gentle slope can be reduced to the value as small as 0 degree to 30 degrees. Further, in the fourth embodiment of the invention, the throat height zero (TH0) position is effectively determined by one end of the third non-magnetic body 33 located on the track surface (air bearing surface) 100 side (corresponding to respective one ends of the first non-magnetic body 31 and the second non-magnetic body 30a). Similarly, as a non-magnetic material providing a gentle slope through a reflow at a temperature in the range of about 100° C. to 150° C., an organic spin-on-glass film or an inorganic spin-on-glass film may be practically used for forming the third non-magnetic body 33.

Figures 36A, 36B:
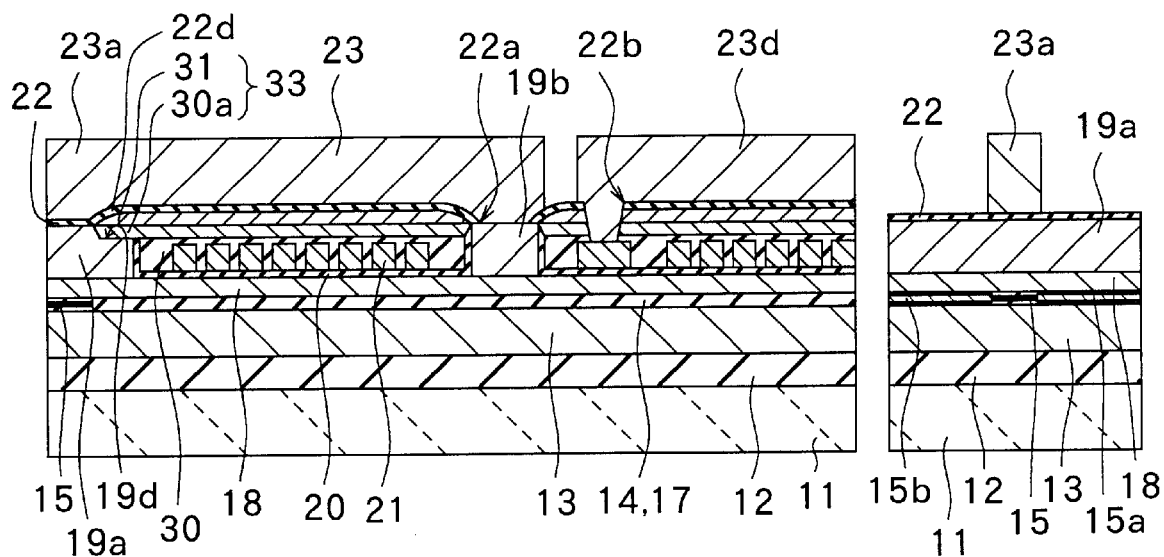
FIG. 36A and FIG. 36B are cross sectional views illustrating a step of manufacturing the thin-film magnetic head following the step shown in FIG. 35A and FIG. 35B.

As shown in FIG. 36A and FIG. 36B, the write gap layer 22 is formed on the bottom pole tip portion 19a, and the non-magnetic layer 22d is formed over the rest of the surface. The write gap layer 22 and the non-magnetic layer 22d are formed of, for example, alumina as the same layer by CVD in thickness of 0.15 µm to 0.3 µm. The write gap layer 22 and the non-magnetic layer 22d produced by the CVD method are so dense that generation of pin holes is decreased, to thereby further prevent magnetic leakage. As the material of the write gap layer 22 and the non-magnetic layer 22d, non-magnetic materials, such as aluminum nitride (AlN), silicon oxide ($SiO_2$) type, silicon nitride ($Si_3N_4$) type, tantalum (Ta), titanium-tungsten (TiW), and titanium nitride (TiN), may be practically used other than alumina. The films may not be necessarily formed by CVD, and the write gap layer 22 and the non-magnetic layer 22d may be formed by, for example, sputtering. As described above, the non-magnetic layer 22d can be provided on the third non-magnetic body 33 (the first non-magnetic body 31) as a gently sloped layer underlying the top pole 23, to thereby prevent leakage of magnetic flux between the bottom pole 18 and the top pole 23, especially in the vicinity of the: throat height zero (TH0) position. The portions of the non-magnetic layer 22d located on the magnetic connection portion 19b and on a predetermined portion of the thin-film coil 21 are then patterned, to thereby form the opening 22a for magnetically connecting the magnetic connection portion 19b and the top pole 23 to be formed in a later step, and the connection hole 22b for electrically connecting the thin-film coil 21 and the coil connection wiring 23d to be formed in a later step.

As shown in FIG. 36A and FIG. 36B, the top pole 23 and the coil connection wiring 23d are formed. The top pole 23 has a planar shape such as that shown in FIG. 31. The top pole 23 and the coil connection wiring 23d can be practically formed of permalloy (including 80 weight-% Ni and 20 weight-% Fe, or 45 weight-% Ni and 55 weight-% Fe), which is a material with high saturation magnetic flux density, by, for example, plating. For the top pole 23 and the coil connection wiring 23d, a material such as FeN, FeZrNP, CoFeN or the like formed by, for example, sputtering can be practically used, and such a magnetic film can be patterned through, for example, ion milling. Further, the top pole 23 and the coil connection wiring 23d can be formed of a composite film having multiple layers of an inorganic insulating film and a magnetic film, such as permalloy, repeatedly stacked in order to improve high frequency characteristics.

As shown in FIG. 30B, an ion milling process under an RIE method using a chlorine type gas ($Cl_2$, $CF_4$, $BCl_2$, $SF_6$, or the like) is performed with the top pole tip portion 23a as an etching mask, to thereby partially etch the write gap layer 22 and the bottom pole tip portion 19a located in the vicinity thereof by about 0.3 µm to 0.6 µm in a self-aligned manner and form a trim structure. In the thin-film magnetic head of the fourth embodiment of the invention, the write gap layer 22 is formed on, and protects, the third non-magnetic body 33, whereby the photoresist mask used for patterning the write gap layer 22 and the bottom pole tip portion 19a can be removed by dry etching, such as ashing, after such patterning.

Finally, as shown in FIG. 30A and FIG. 30B, the overcoat layer 26 of about 20 µm to 40 µm in thickness is formed of alumina by, for example, sputtering over the entire surface. Thereafter, a machining process with a slider is performed to form the track surface (air bearing surface) 100 of the reproducing head portion 1A and the recording head portion 1B, to thereby complete the thin-film magnetic head of the fourth embodiment of the invention.

According to the thin-film magnetic head and the method of manufacturing the same of the fourth embodiment of the invention described above, the top pole 23 can be formed along the gentle slope of the first non-magnetic body 31 of the third non-magnetic body 33 in the vicinity of the throat height zero (TH0) position and can be provided with a gradually changed height, and therefore magnetic volume can be efficiently converged. Further, since the second non-magnetic body 30a of the third non-magnetic body 33 facing the first non-magnetic body 31 is provided in the vicinity of the throat height zero (TH0) position, the effective thickness of the non-magnetic body can be increased, and therefore magnetic leakage between the magnetic layers, i.e. the bottom pole 18 and the top pole 23 can be prevented. Especially in patterning the top pole tip portion 23a, the write gap layer 22, and the bottom pole tip portion 19a forming the trim structure, the processing accuracy of the patterning mask for the top pole tip portion 23a can be improved because the layer on the first non-magnetic body 31 can be planarized along the gentle slope thereof, and therefore the processing accuracy of the write gap layer 22 and the bottom pole tip portion 19a formed by using the top pole tip portion 23a as a patterning mask can be improved. As a result, a narrow track width can be realized.

Further, according to the thin-film magnetic head and the method of manufacturing the same of the fourth embodiment of the invention, the first non-magnetic body 31 and the second non-magnetic body 30a are integrally formed by the same manufacturing step to form the third non-magnetic body 33, whereby the number of manufacturing steps for forming the non-magnetic body can be reduced.

Figures 37A, 37B:
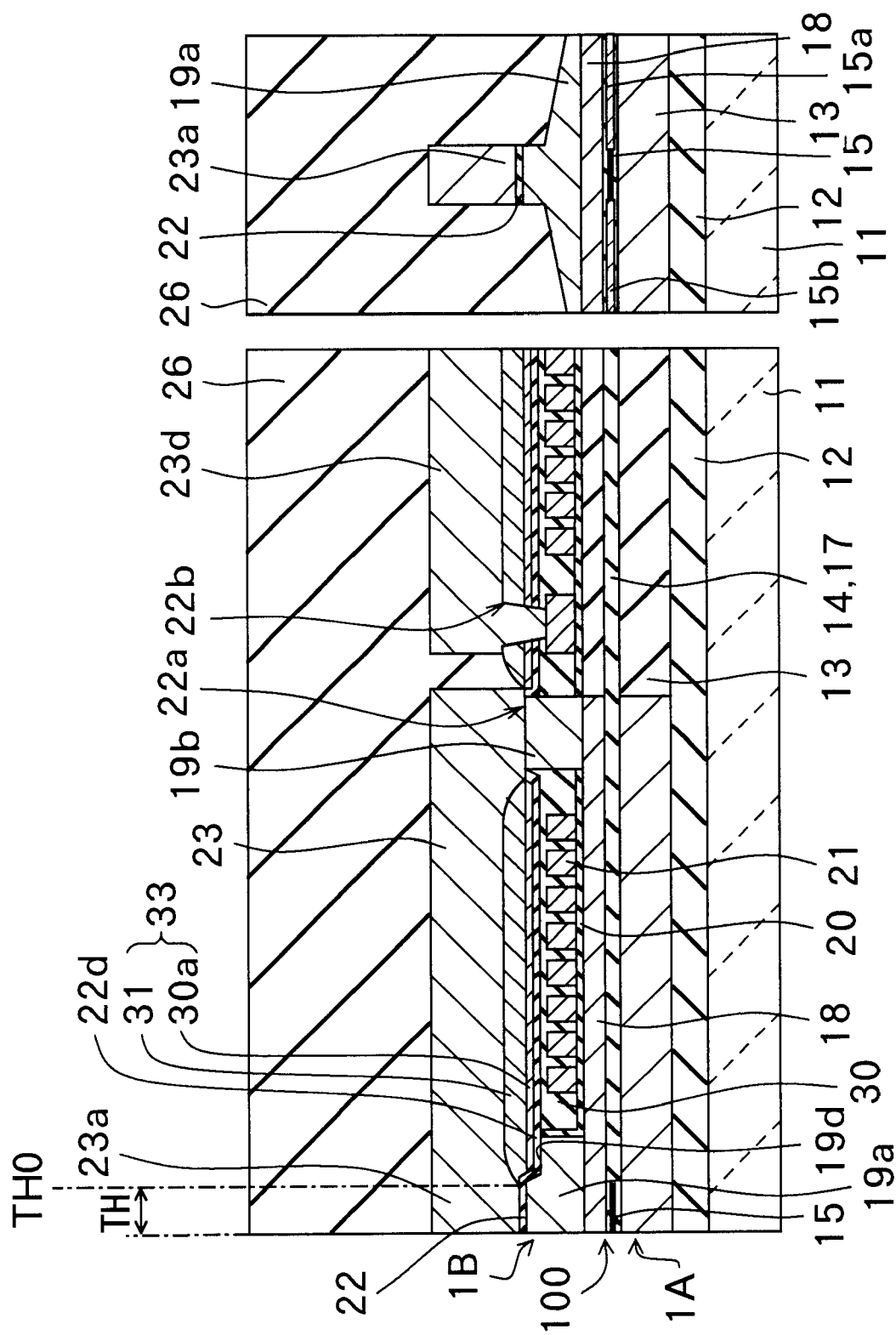
FIG. 37A and FIG. 37B are cross sectional views illustrating an important part of a thin-film magnetic head according to a variation of the fourth embodiment of the invention, taken along the line perpendicular to, and parallel to, the track surface (air bearing surface), respectively.

While the third non-magnetic body 33 is first formed in the concave portion 19d and then the non-magnetic layer 22d is formed covering the third non-magnetic body 33 as shown in FIG. 30A in the thin-film magnetic head and the method of manufacturing the same of this embodiment, the present invention is not limited to the above example. For example, as shown in FIG. 37A, the non-magnetic layer 22d may be first formed over the entire surface including the concave portion 19d, followed by formation of the third non-magnetic layer 33 on the concave region formed by the non-magnetic layer 22d. In such a case as well, the effects similar to those of the head shown in FIG. 30A and FIG. 30B can be obtained.

[Fifth Embodiment]

Figures 38A, 38B:
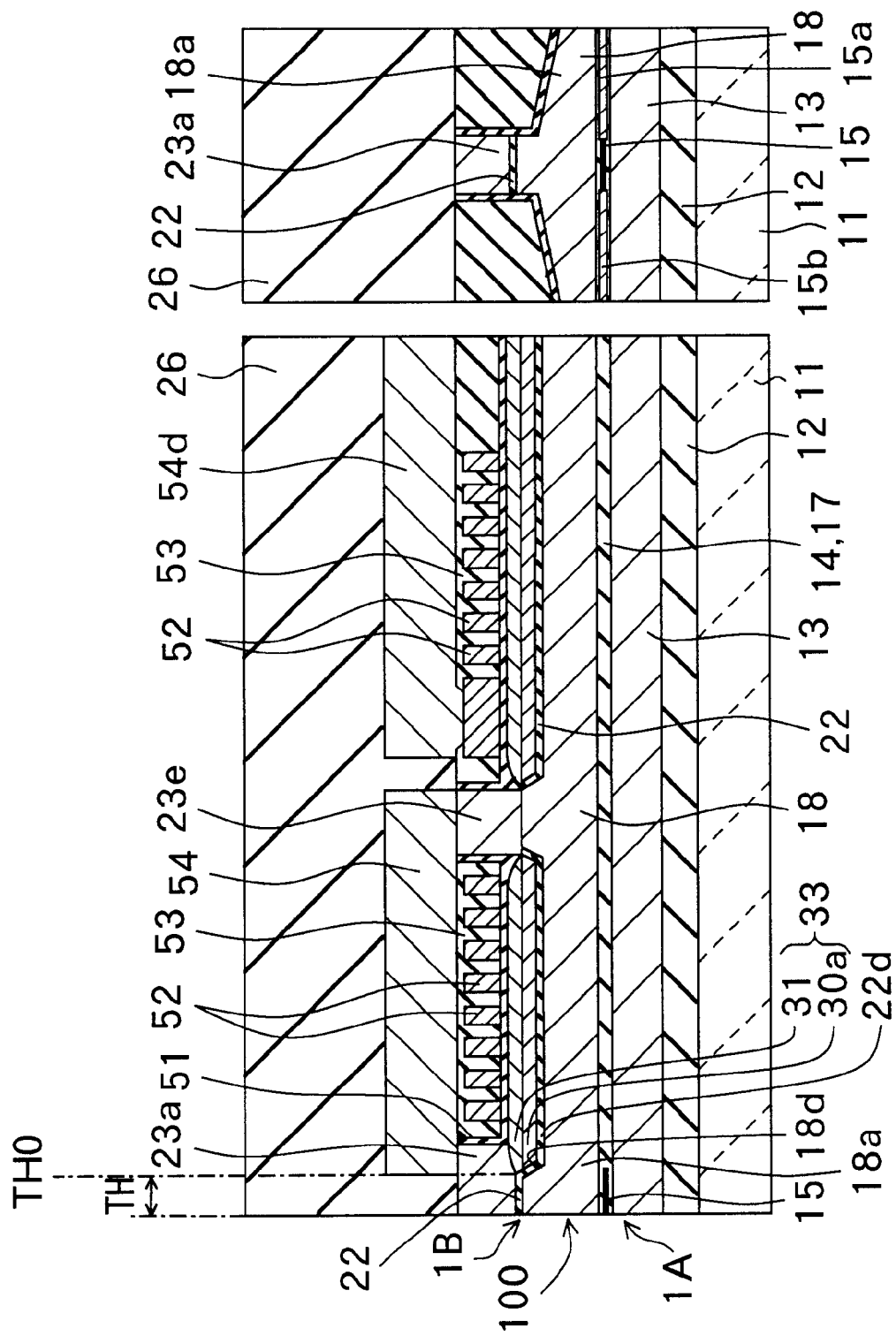
FIG. 38A and FIG. 38B are cross sectional views illustrating an important part of a thin-film magnetic head of a fifth embodiment of the present invention, taken along the line XXXVIIIA—XXXVIIIA and the line XXXVIIIB—XXXVIIIB in FIG. 39, respectively.
Figure 39:
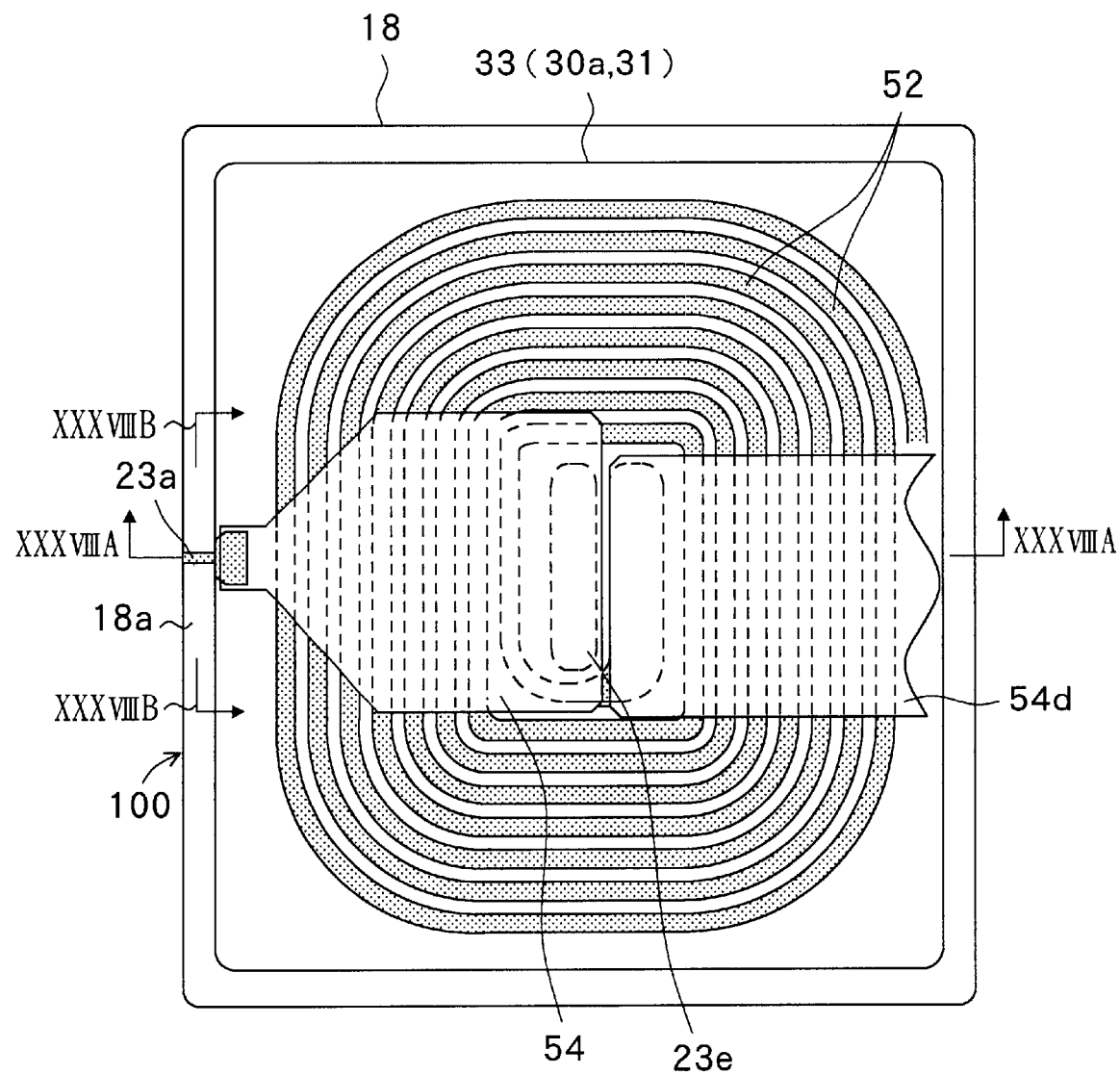
FIG. 39 is a plan view illustrating a recording head portion of the thin-film magnetic head of the fifth embodiment of the invention.

A fifth embodiment of the invention relates to an example where the thin-film magnetic heads of the third and fourth embodiments are combined. FIG. 38A and FIG. 38B are cross sectional views illustrating an important part of the thin-film magnetic head according to the fifth embodiment of the invention, and FIG. 39 is a plan view illustrating the recording head portion of the thin-film magnetic head according to the fifth embodiment of the invention. More specifically, FIG. 38A is a cross sectional view of the important part of the head taken along the line XXXVIIIA—XXXVIIIA in FIG. 39 perpendicular to the track surface (air bearing surface) 100, while FIG. 38B is a cross sectional view of the important part of the head taken along the line XXXVIIIB—XXXVIIIB parallel to the track surface (air bearing surface) 100.

As shown in FIG. 38A, FIG. 38B, and FIG. 39, in the thin-film magnetic head of the fifth embodiment of the invention, the recording head portion 1B includes a bottom magnetic layer having a bottom pole 18 and a bottom pole tip portion 18a magnetically coupled to each other, a top magnetic layer having a top pole 54 and a top pole tip portion 23a magnetically coupled to each other, and a thin-film coil 21 formed as a single layer for generating magnetic flux. The bottom pole tip portion 18a and part of the top pole tip portion 23a located adjacent to a write gap layer 22 face each other with the write gap layer 22 in between. In part of the top pole tip portion 23a, a first non-magnetic body 31 is formed. In part of the bottom pole 18, a second non-magnetic body 30a is formed. In the thin-film magnetic head of the fifth embodiment of the invention, the first non-magnetic body 31 and the second non-magnetic body 30a are integrally formed of the same non-magnetic material, forming a third non-magnetic body 33.

The first non-magnetic body 31 of the third non-magnetic body 33 is disposed on the top pole 54 side of the write gap layer 22 provided between the bottom pole tip portion 18a and the top pole tip portion 23a. The first non-magnetic body 31 is formed as the layer underlying the top pole tip portion 23a, and serves to magnetically separate the bottom pole 18 and the top pole tip portion 23a from each other. The first non-magnetic body has a wedge-shaped cross section on the track surface (air bearing surface) 100 side with the tip facing the track surface (air bearing surface) 100. The first non-magnetic body 31 has a gentle slope with its thickness gradually increasing from the throat height zero (TH0) position toward the thin-film coil 52, and the apex angle can be reduced to the value as small as being in the range of 0 degree to 30 degrees. In the fifth embodiment of the invention, one end of the first non-magnetic body 31 located on the track surface (air bearing surface) 100 side determines the throat height zero (TH0) position. The first non-magnetic body 31 can be practically formed of any of a photoresist film, an organic spin-on-glass film, and an inorganic spin-on-glass film.

The second non-magnetic body 30a is disposed on the bottom pole 18 side of the write gap layer 22 provided between the bottom pole tip portion 18a and the top pole tip portion 23a. The second non-magnetic body 30a is disposed filling in the concave portion 18d formed on the surface of the bottom pole 18 from the throat height zero (TH0) position or the vicinity thereof toward the thin-film coil 52. The concave portion 18d has such a depth as to be at least sufficient to prevent leakage of magnetic flux between the bottom pole 18 and the top pole tip portion 23a in the vicinity of the throat height zero (TH0) position.

As described above, the second non-magnetic body 30a is formed of the same non-magnetic material, such as a photoresist film, as the first non-magnetic body 31 integrally therewith as a single layer. Therefore, although the second non-magnetic body 30a also determines the throat height zero (TH0) position, no misalignment occurs between the first non-magnetic body 31 and the second non-magnetic body 30a, so that the throat height zero (TH0) position can be accurately determined. Unlike the first non-magnetic body 31 in the thin-film magnetic head of the first embodiment of the invention, the first non-magnetic body 31 is not formed as an independent non-magnetic layer but as an extended layer of the second non-magnetic body 30a, and therefore the thickness of the first non-magnetic body 31 can be made extremely small. Consequently, the apex angle can be made significantly small.

The non-magnetic layer 22d is formed between the second non-magnetic body 30a and the bottom pole 18, i.e. along the surface of the concave portion 18d provided on the surface of the bottom pole 18.

Figures 40A, 40B:
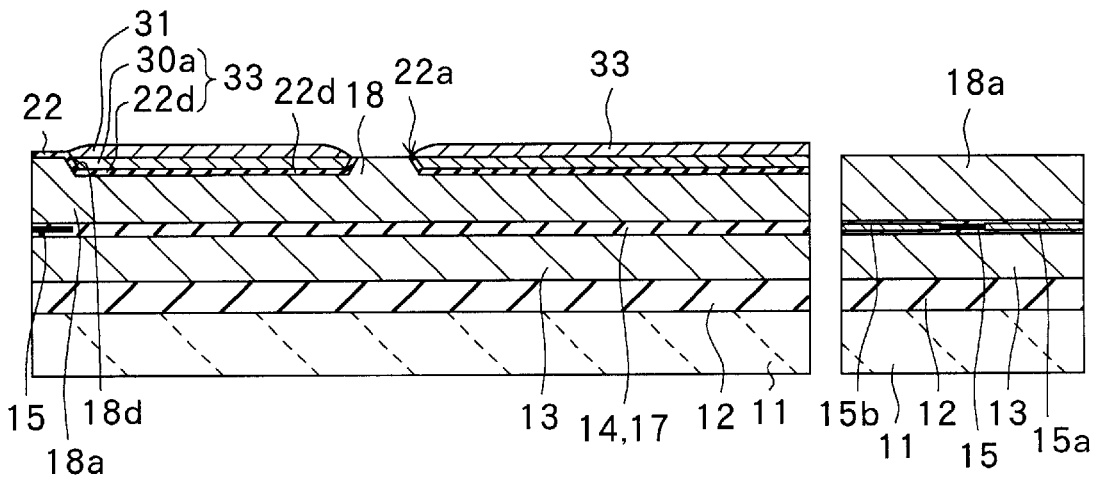
FIG. 40A and FIG. 40B are cross sectional views illustrating a manufacturing step of the thin-film magnetic head for use in description of a manufacturing method of the fifth embodiment of the invention, taken along the line perpendicular to, and parallel to, a track surface (air bearing surface), respectively.
Figures 41A, 41B:
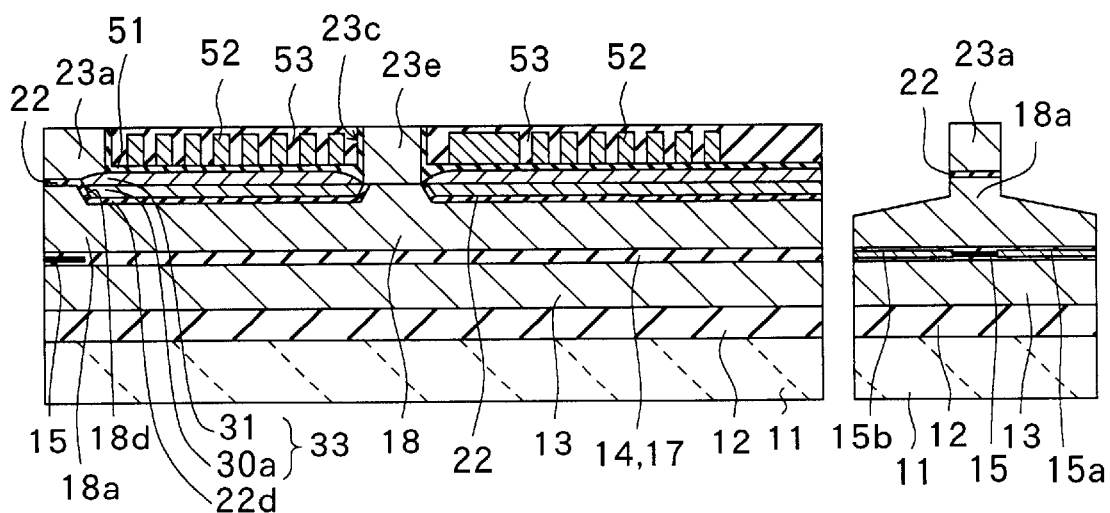
FIG. 41A and FIG. 41B are cross sectional views illustrating a step of manufacturing the thin-film magnetic head following the step shown in FIG. 40A and FIG. 40B.
Figures 45A, 45B:
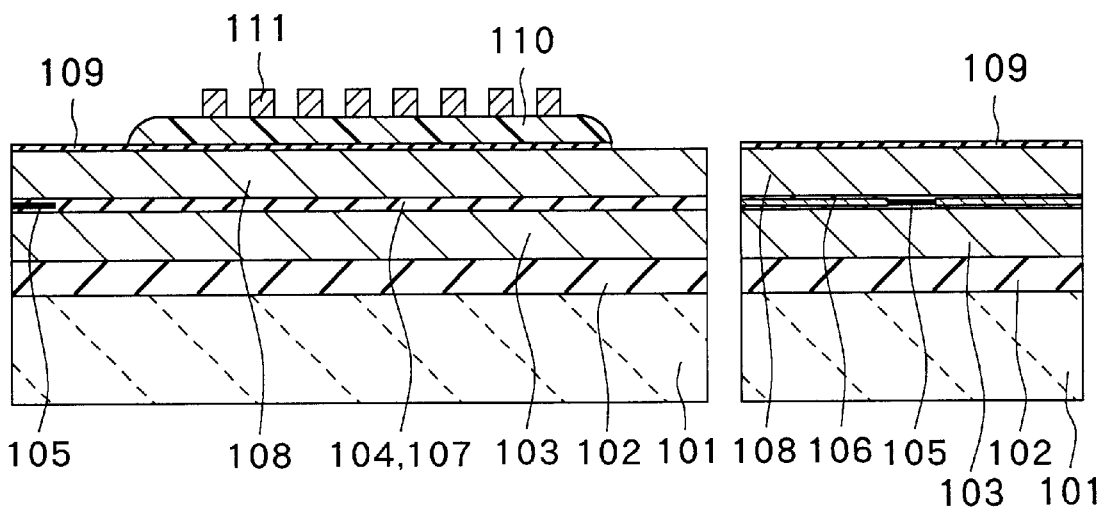
FIG. 45A and FIG. 45B are cross sectional views of a step following the step shown in FIG. 44A and FIG. 44B.
Figures 46A, 46B:
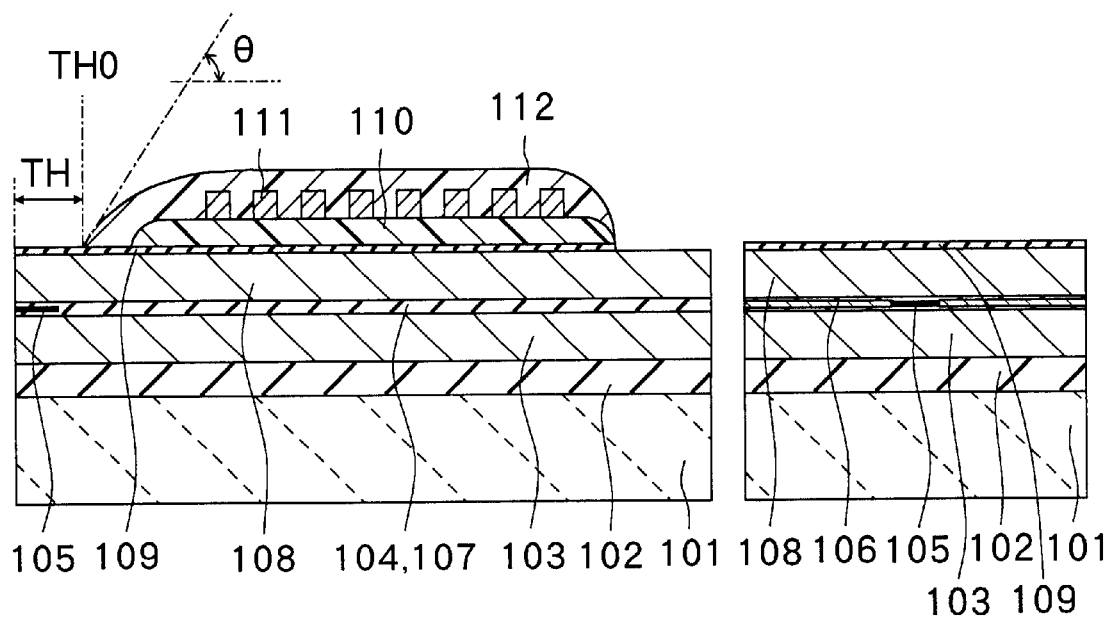
FIG. 46A and FIG. 46B are cross sectional views of a step following the step shown in FIG. 45A and FIG. 45B FIG. 47A and FIG. 47B are cross sectional views of a step following the step shown in FIG. 46A and FIG. 46B.
Figure 49:
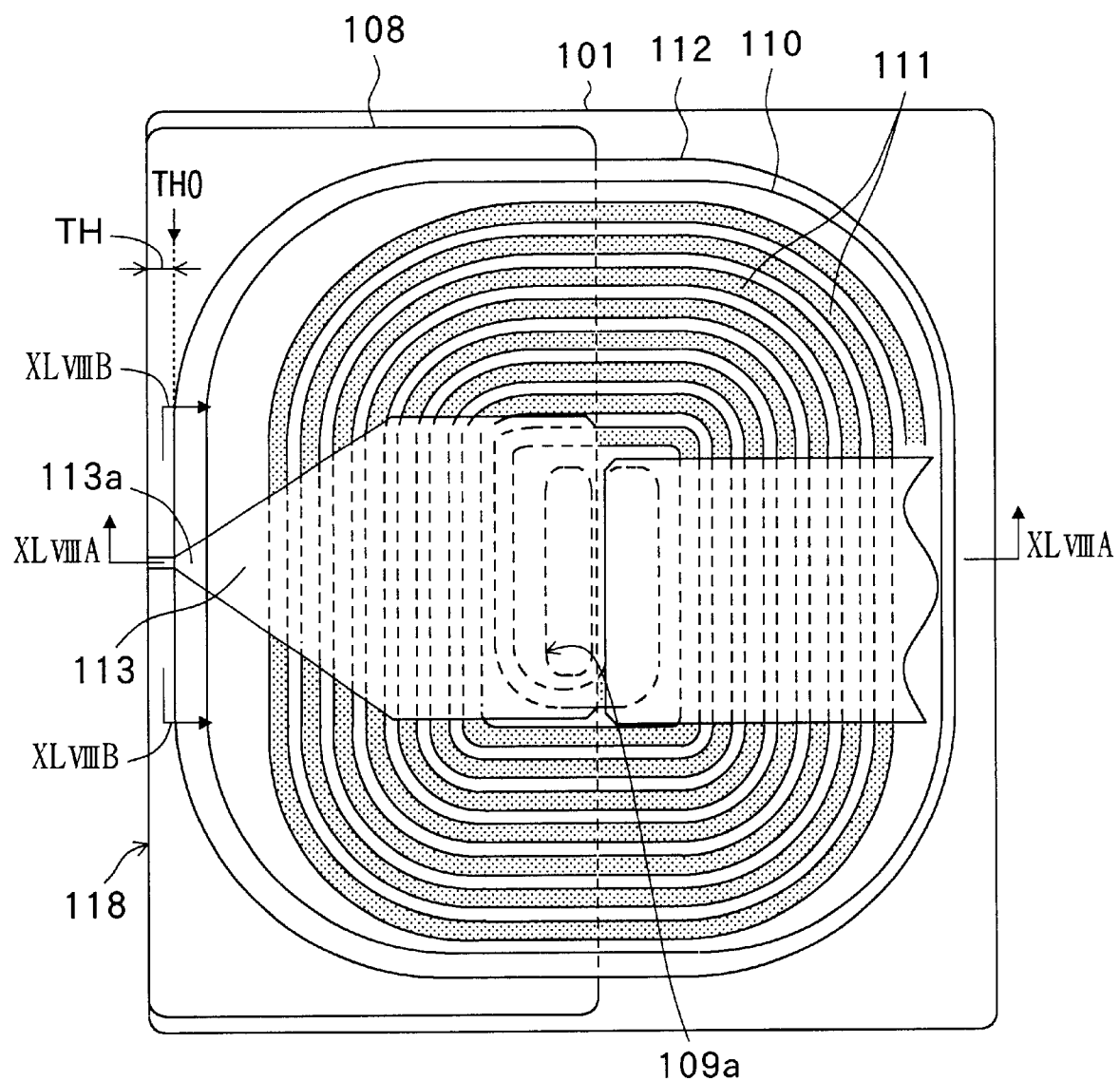
FIG. 49 is a plan view illustrating a composite thin-film magnetic head according to the related art.

A method of manufacturing a thin-film magnetic head of the fifth embodiment of the invention will next be described. FIG. 40A, FIG. 40B, FIG. 41A, and FIG. 41B are cross sectional views illustrating the steps of manufacturing the thin-film magnetic head for describing the manufacturing method. FIG. 40A and FIG. 41A are cross sectional views of the head at the manufacturing steps taken along the line perpendicular to the track surface (air bearing surface) 100, while FIG. 40B and FIG. 41B are cross sectional views of the head at the manufacturing steps taken along the line parallel to the track surface (air bearing surface) 100.

In FIG. 40A and FIG. 40B, the steps up to the step of forming the bottom pole 18 are the same as the corresponding steps of the above-described second embodiment shown in FIG. 18A and FIG. 18B, and therefore description thereof will not be repeated. According to the method of manufacturing a thin-film magnetic head of this embodiment, after the bottom pole 18 is formed, the concave portion 18d is provided for forming the third non-magnetic body (the second non-magnetic body 30a) on the surface of the bottom pole 18, as shown in FIG. 40A. The concave portion 18d is not formed either at the bottom pole tip portion 18a of the bottom pole 18 located on the track surface (air bearing surface) 100 side or at the connection portion (no reference numerals indicated) located on the other side and connecting to the top pole 54. The concave portion 18d is formed by, for example, ion milling, and has a depth of, for example, about 0.8 $\mu$m to 1.5 $\mu$m. The inner wall of the concave portion 18d is preferably formed as a slope, so as to achieve flux control.

As shown in FIG. 40A, the write gap layer 22 is formed on the bottom pole tip portion 19a, and the non-magnetic layer 22d is formed over the rest of the surface. The write gap layer 22 and the non-magnetic layer 22d are formed of, for example, alumina as the same layer by CVD in thickness of 0.15 $\mu$m to 0.3 $\mu$m. The write gap layer 22 and the non-magnetic layer 22d produced by the CVD method are so dense that generation of pin holes is decreased, to thereby further prevent magnetic leakage. As the material of the write gap layer 22 and the non-magnetic layer 22d, non-magnetic materials, such as aluminum nitride (AlN), silicon oxide ($SiO_2$) type, silicon nitride ($Si_3N_4$) type, tantalum (Ta), titanium-tungsten (TiW), and titanium nitride (TiN), may be practically used other than alumina. The films may not be necessarily formed by CVD, and may be formed by, for example, sputtering. The portion of the non-magnetic layer 22d located in a region where the magnetic connection portion 23e will be formed in a later step is then patterned, to thereby form the opening 22a for magnetically connecting the bottom pole 18 and the magnetic connection portion 23e.

As shown in FIG. 40A, the second non-magnetic body 30a and the first non-magnetic body 31 are formed on the non-magnetic layer 22d to fill in the concave portion 18d, substantially completing the third non-magnetic body 33. In the thin-film magnetic head of the fifth embodiment of the invention, the first non-magnetic body 31 and the second non-magnetic body 30a correspond to the top portion located on the top pole 54 side and the bottom portion on the bottom pole 18 side of a single non-magnetic body, respectively, and are effectively formed as a single non-magnetic body composed of the first non-magnetic body 31 and the second non-magnetic body 30a formed integrally. The third non-magnetic body 33 can be formed by, for example, rotationally applying a photoresist film in thickness of 0.3 $\mu$m to 1.5 $\mu$m, followed by light exposure, development, patterning to a prescribed shape, and baking at a temperature in the range of 100° C. to 150° C. As the photoresist film is subjected to the baking process, the third non-magnetic body 33 (the first non-magnetic body 31) can be provided with the central portion having a planarized surface and the peripheral portion having a gentle slope with gradually changed height. More specifically, the third non-magnetic body 33 has a gentle slope at least from the throat height zero (TH0) position toward the thin-film coil 52, and the apex angle formed by such a gentle slope can be reduced to the value as small as 0 degree to 30 degrees. Further, in the fifth embodiment of the invention, the throat height zero (TH0) position is effectively determined by one end of the third non-magnetic body 33 located on the track surface (air bearing surface) 100 side (corresponding to respective one ends of the first non-magnetic body 31 and the second non-magnetic body 30a). Similarly, as a non-magnetic material providing a gentle slope through a reflow at a temperature in the range of about 100° C. to 150° C., an organic spin-on-glass film or an inorganic spin-on-glass film may be practically used for forming the third non-magnetic body 33.

As shown in FIG. 41A and FIG. 41B, the top pole tip portion 23a is formed on the write gap layer 22 located on the bottom pole tip portion 18a, and on the third non-magnetic layer 33, and the magnetic connection portion 23e is formed in the opening 22a. The top pole tip portion 23a and the magnetic connection portion 23e can be practically formed of a material, such as permalloy, with high saturation magnetic flux density by, for example, plating in thickness of 2.0 μm to 4.0 μm. For the top pole tip portion 23a and the magnetic connection portion 23e, a material such as FeN, FeZrNP, CoFeN, or the like formed by sputtering can be practically used, and such a magnetic film can be patterned through, for example, ion milling. Since the top pole tip portion 23a is formed on the surface of the third non-magnetic body 33 having a gentle slope in the vicinity of the throat height zero (TH0) position, effects of light reflected from the apex angle portion can be reduced, to thereby improve processing accuracy of the photoresist mask for forming the top pole tip portion 23a. In other words, at least the processing accuracy (patterning accuracy) of the top pole tip portion 23a can be improved, whereby a track width in the order of submicrons can be achieved.

As shown in FIG. 41B, an ion milling process under an RIE method using a chlorine type gas ($Cl_2$, $CF_4$, $BCl_2$, $SF_6$, or the like) is performed with the portion of the top pole tip portion 23a with the width corresponding to the track width as an etching mask, to thereby partially etch the write gap layer 22 and the bottom pole tip portion 18a located in the vicinity thereof by about 0.3 μm to 0.6 μm in a self-aligned manner and form a trim structure. When this step is finished, the trim structure is completed.

The insulating layer 51 having a thickness of 0.3 μm to 0.5 μm is formed of an insulating material, such as alumina, over the entire surface by sputtering or CVD. The thin-film coil 52 for generating magnetic flux is formed of, for example, copper by, for example, electrolytic plating on the insulating layer 51 provided in the concave portion 23c between the top pole tip portion 23a and the magnetic connection portion 23e, and on the insulating layer 51 at the outer peripheral portion of the magnetic connection portion 23e (on the right side in FIG. 41A). The thin-film coil 52 has a thickness of, for example, 1.0 μm to 2.0 μm, and a coil pitch of 1.2 μm to 2.0 μm.

The insulating layer 53 having a thickness of 3.0 μm to 4.0 μm is formed of an insulating material, such as alumina, by sputtering over the entire surface. As shown in FIG. 41A, the surface of the insulating layer 53 is then planarized by, for example, CMP to expose the surfaces of the top pole tip portion 23a and the magnetic connection portion 23e. In the thin-film magnetic head of the fifth embodiment of the invention, a spin-on-glass film may be first applied on the thin-film coil 52 as a gap filling material and then the insulating layer 53 of an alumina film may be formed, followed by planarization of the surface of the insulating layer 53 by CMP.

As the subsequent steps are the same as those of the second embodiment shown in FIG. 24, description thereof will not be repeated.

The thin-film magnetic head and the method of manufacturing the same according to the fifth embodiment of the invention described above provide the combined effects of the thin-film magnetic heads and the methods of manufacturing the same of the third and fourth embodiments of the invention.

While the present invention has been described in the context of a plurality of preferred embodiments thereof, the invention is not limited to the above-described embodiments, and may be varied in numerous ways. For example, although a composite thin-film magnetic head including a reproducing head portion and a recording head portion is described in the above embodiments, the present invention can also be applied to a thin-film magnetic head including only a recording head portion.

As described above, according to the thin-film magnetic head of the invention or the method of manufacturing a thin-film magnetic head of the invention, a first non-magnetic body, extending from a position corresponding to a position of an end of an insulating layer located on a recording-medium-facing surface side to a predetermined position located on the recording-medium-facing surface side, is provided on one side of a write gap layer with a flat surface that includes any one of first and second surfaces being a border, and a second non-magnetic body extending substantially opposite to the first non-magnetic body is provided on the other side with the above flat surface being a border, wherein the first non-magnetic body has a wedge-shaped cross section taken along a surface perpendicular to both of the above flat surface and the recording-medium-facing surface, with its tip facing the recording-medium-facing surface side. Thus, the first non-magnetic body has a gently sloped surface having a gradually increasing thickness. Consequently, effects of light reflected from the sloped surface, which is conventionally a serious problem during a photolithography process on a steeply sloped surface, can be reduced. Therefore processing accuracy of the photolithography process on the first non-magnetic body can be improved, to thereby obtain a product in a desired shape. Further, the first and second non-magnetic bodies can suppress leakage of magnetic flux between the two magnetic layers facing each other with the write gap layer in between. As a result, magnetic flux generated by a thin-film coil can be supplied up to the recording-medium-facing surface without any loss, whereby excellent overwrite characteristics can be secured.

According to the thin-film magnetic head and the method of manufacturing a thin-film magnetic head of one aspect of the invention, the first non-magnetic body is formed by any of a photoresist film, an organic spin-on-glass film, and an inorganic spin-on-glass film, so thon the surface of the first non-magnetic body can be easily made as a gentle slope.

According to the method of manufacturing a thin-film magnetic head of another aspect of the invention, the second non-magnetic body is simultaneously formed by the step of forming the insulating layer for burying the thin-film coil, whereby the manufacturing step for forming the second non-magnetic body can be simplified.

According to the thin-film magnetic head and the method of manufacturing a thin-film magnetic head of still another aspect of the invention, the first and second non-magnetic bodies are formed integrally by the same step, whereby the manufacturing step for forming the first and second non-magnetic bodies can be simplified.

Obviously many modifications and variations of the present invention are possible in the light of the above teachings. It is therefore to be understood that within the scope of the appended claims the invention may be practiced otherwise than as specifically described.

What is claimed is:

1. A thin-film magnetic head, comprising:
   a first insulating layer as a write gap layer;
   a non-magnetic body provided adjacent to a surface of the first insulating layer in an area close to an air-bearing surface that faces a recording medium and having a wedge-shaped cross section that is taken along a surface perpendicular to both a surface along which the first insulating layer extends and the air-bearing surface, the wedge-shaped cross section directing its tip to the air-bearing surface;
   a bottom magnetic layer and a top magnetic layer facing each other on a side close to the air-bearing surface, sandwiching the first insulating layer therebetween and magnetically coupled to each other on a side far from the air-bearing surface, the bottom magnetic layer including:

a bottom pole provided so as to be exposed to the air-bearing surface and to face the first insulating layer;

a bottom pole tip portion provided in an area between the bottom pole and the first insulating layer on the side close to the air-bearing surface, the bottom pole tip portion being exposed to the air-bearing surface and adjacent to both the bottom pole and the first insulating layer; and a bottom magnetic connection portion provided adjacent to the bottom pole in the area between the bottom pole and the first insulating layer on the side far from the air-bearing surface, and the top magnetic layer including:

a top pole provided so as to be recessed from the air-bearing surface and to face the first insulating layer;

a top pole tip portion provided in an area between the top pole and the first insulating layer on the side close to the air-bearing surface, the top pole tip portion being exposed to the air-bearing surface and adjacent to both the top pole and the first insulating layer, the top pole tip portion facing the bottom pole tip portion sandwiching the first insulating layer therebetween and extending over the non-magnetic body; and a top magnetic connection portion provided so as to magnetically couple the top pole to the bottom magnetic connection portion;

a first thin-film coil buried with a second insulating layer in an area enclosed by the first insulating layer and the bottom magnetic layer; and a second thin-film coil buried with a third insulating layer in an area enclosed by the first insulating layer, the non-magnetic body and the top magnetic layer, wherein the top pole tip portion and the third insulating layer constitute a flat plane and the top pole is provided on the flat plane and a concave portion is provided close to the second insulating layer in the bottom pole tip portion and a part of the second insulating layer is buried in the concave portion adjacent to the first insulating layer.

2. A thin-film magnetic head according to claim 1, wherein the non-magnetic body is formed of either a photoresist, an organic spin-on-glass, or an inorganic spin-on-glass.

3. A thin-film magnetic head according to claim 1, wherein the second insulating layer is formed of either a photoresist, an organic spin-on-glass, an inorganic spin-on-glass, a silicon oxide, a silicon nitride, or an aluminum oxide.

4. A thin-film magnetic head according to claim 1, wherein the non-magnetic body and the second insulating layer are separately formed in different steps.

5. A method of manufacturing a thin-film magnetic head, comprising the steps of:

forming a first insulating layer as a write gap layer;

forming a non-magnetic body in an area close to an air-bearing surface that faces a recording medium in a manner that the non-magnetic body is provided adjacent to a surface of the first insulating layer and has a wedge-shaped cross section that is taken along a surface perpendicular to both a surface along which the first insulating layer extends and the air-bearing surface, the wedge-shaped cross section directing its tip to the air-bearing surface;

forming a bottom magnetic layer and a top magnetic layer so as to face each other on a side close to the air-bearing surface, sandwiching the first insulating layer therebetween and to be magnetically coupled to each other on a side far from the air-bearing surface, the bottom magnetic layer including:

a bottom pole provided so as to be exposed to the air-bearing surface and to face the first insulating layer;

a bottom pole tip portion provided in an area between the bottom pole and the first insulating layer on the side close to the air-bearing surface, the bottom pole tip portion being exposed to the air-bearing surface and adjacent to both the bottom pole and the first insulting layer; and a bottom magnetic connection portion provided adjacent to the bottom pole in the area between the bottom pole and the first insulating layer on the side far from the air-bearing surface, and the top magnetic layer including:

a top pole provided so as to be recessed from the air-bearing surface and to face the first insulating layer;

a top pole tip portion provided in an area between the top pole and the first insulting layer on the side close to the air-bearing surface, the top pole tip portion being exposed to the air-bearing surface and adjacent to both the top pole and the first insulating layer, the top pole tip portion facing the bottom pole tip portion sandwiching the first insulating layer therebetween and extending over the non-magnetic body; and a top magnetic connection portion provided so as to magnetically couple the top pole to the bottom magnetic connection portion;

burying a first thin-film coil with a second insulating layer in an area enclosed by the first insulating layer and the bottom magnetic layer; and burying a second thin-film coil with a third insulating layer in an area enclosed by the first insulating layer, the non-magnetic body and the top magnetic layer, wherein the top pole tip portion and the third insulating layer constitute a flat plane and the top pole is formed on the flat plane and a concave portion is provided close to the second insulating layer in the bottom pole tip portion and a part of the second insulating layer is buried in the concave portion adjacent to the first insulating layer.

6. A method of manufacturing a thin-film magnetic head according to claim 5, wherein the non-magnetic body is formed of either a photoresist, an organic spin-on-glass, or an inorganic spin-on-glass.

7. A method of manufacturing a thin-film magnetic head according to claim 5, wherein the second insulating layer is formed of either a photoresist, an organic spin-on-glass, an inorganic spin-on-glass, a silicon oxide, a silicon nitride, or an aluminum oxide.

8. A method of manufacturing a thin-film magnetic head according to claim 5, wherein the non-magnetic body and the second insulating layer are separately formed in different steps.

* * * * *